(12) United States Patent
Fleck et al.

(10) Patent No.: US 12,518,331 B2
(45) Date of Patent: Jan. 6, 2026

(54) DOCUMENT FRAUD PREVENTION SERVER AND SYSTEM

(71) Applicant: VERITABLE DATA SOLUTIONS, INC, Granada Hills, CA (US)

(72) Inventors: David L. Fleck, La Quinta, CA (US); Allan Martia, Woodland Hills, CA (US)

(73) Assignee: VERITABLE DATA SOLUTIONS, INC, Granada Hills, CA (US)

( * ) Notice: Subject to any disclaimer, the term of this patent is extended or adjusted under 35 U.S.C. 154(b) by 539 days.

(21) Appl. No.: 17/581,649

(22) Filed: Jan. 21, 2022

(65) Prior Publication Data

US 2022/0230263 A1    Jul. 21, 2022

Related U.S. Application Data

(60) Provisional application No. 63/140,200, filed on Jan. 21, 2021.

(51) Int. Cl.
| | |
|---|---|
| G06Q 50/26 | (2024.01) |
| G06F 9/451 | (2018.01) |
| H04L 9/00 | (2022.01) |
| H04L 9/32 | (2006.01) |

(52) U.S. Cl.
CPC .......... G06Q 50/265 (2013.01); G06F 9/451 (2018.02); H04L 9/3239 (2013.01); *G06Q 2220/00* (2013.01); *H04L 9/50* (2022.05)

(58) Field of Classification Search
CPC .. G06Q 50/265; G06Q 2220/00; G06F 9/451; H04L 9/3239; H04L 9/50
See application file for complete search history.

(56) References Cited

U.S. PATENT DOCUMENTS

| | | | |
|---|---|---|---|
| 9,378,386 B1* | 6/2016 | Saylor | G06F 21/6209 |
| 9,922,332 B2 | 3/2018 | Sant'Anselmo | |
| 2008/0028220 A1 | 1/2008 | Wyssen | |
| 2013/0219504 A1* | 8/2013 | Mosier | G06F 21/1063 |
| | | | 726/26 |
| 2015/0089358 A1* | 3/2015 | Li | G06F 3/0485 |
| | | | 715/273 |

(Continued)

FOREIGN PATENT DOCUMENTS

| | | |
|---|---|---|
| CN | 107358551 A | 11/2017 |
| CN | 110163569 A | 8/2019 |

*Primary Examiner* — Patrick McAtee
*Assistant Examiner* — Vincent I Idiake
(74) *Attorney, Agent, or Firm* — Greenberg Traurig, LLP

(57) ABSTRACT

Systems and methods described herein are directed to identity and document verification using blockchain technology. In some embodiments, the system is able to capture images of identification information as well as documents such as legal documents and titles. In some embodiments, the system generates a non-fungible token in the form of a unique hash code and associates the unique hash code with each image uploaded. In some embodiments, the system includes instructions to add the unique has code to physical documents before images are taken. In some embodiments, the system automatically associates the unique hash code to each image in a transaction, adds the images to a block on the blockchain, and enables a user to enter the unique hash code to access the images and/or verification information on the block.

16 Claims, 69 Drawing Sheets

(56) References Cited

U.S. PATENT DOCUMENTS

| | | | |
|---|---|---|---|
| 2018/0068173 A1* | 3/2018 | Kolleri | G06Q 10/10 |
| 2019/0251527 A1 | 8/2019 | Surdak | |
| 2019/0332921 A1* | 10/2019 | Rodriguez | H04L 9/0643 |
| 2020/0042685 A1* | 2/2020 | Tussy | G06V 40/50 |
| 2020/0058023 A1 | 2/2020 | Travizano et al. | |
| 2021/0089640 A1* | 3/2021 | DeRosa-Grund | G06F 18/25 |
| 2022/0138179 A1* | 5/2022 | Stone | G06F 16/2379 |
| | | | 707/703 |
| 2023/0274576 A1* | 8/2023 | Mizuno | G06T 7/90 |
| | | | 382/118 |

* cited by examiner

DOCUMENT FRAUD PREVENTION SERVER AND SYSTEM

CROSS REFERENCE TO RELATED APPLICATIONS

This application claims the benefit of and priority to U.S. Provisional Patent Application No. 63/140,200, filed Jan. 21, 2021, the entire contents of which are incorporated by reference herein.

BACKGROUND

Con artists have no difficulty obtaining high quality fake identification documents or creating credible forged documents on basic home computers. Fraudulent conduct causes title insurance carriers to lose more than $200M per year to title fraud. Historically, there are 3 main methods for home title theft: (1) dupe the notary using fake identification (ID) and con artistry; (2) skip the notary by forging required documents; and/or (3) unduly influence a signer by force or trickery. Primary victims are elderly homeowners. Notaries are expected to be gatekeepers against title fraud, ID theft & forgery. However, current technology limits a notary's ability to verify identities accurately and prevent forged documents, and only a tiny fraction of law enforcement investigates fraud.

Criminals can purchase high quality fake identification cards ("IDs") that can't be detected by the naked eye, which means notaries cannot effectively verify identities. Fraudsters can use inexpensive desktop computers to produce undetectable forged documents, and they can buy fake notary stamps, both of which make the current notary stamp almost meaningless as evidence of authenticity. There is currently no way to know if a paper document is authentic or fake using conventional methods.

Therefore, there is a need for an effective method for notaries to confirm identities and to prevent the forgery of documents while notarizing signatures in-person at remote locations.

SUMMARY

In some embodiments, the server and system described herein includes a computer implemented system (e.g., a smartphone application or other computer program) that enables notaries to help prevent identity fraud (e.g., home title fraud as just one non-limiting example). In some embodiments, one or more supporting software platforms described herein use conventional algorithms to execute one or more computer implemented configurations. In some embodiments, one or more supporting software platforms described herein use proprietary algorithms to execute one or more computer implemented configurations. Whether conventional or proprietary algorithms are used to implement one or more configurations, those of ordinary skill would understand how to create algorithms to execute one or more computer implemented configurations described herein. Therefore, such detail related to various coding techniques for implementing the configurations described herein are not needed to make and use the invention and/or define the metes and bounds of the invention.

In some embodiments, the system includes blockchain and identification (ID) verification software configured to ensure the authenticity of notarized documents (e.g., paper documents). In some embodiments, the system is configured to upload one or more analog documents as one or more digital documents within a blockchain technology. In some embodiments, the system is configured to enable a user to verify and/or mark as verified the authenticity of the one or more analog documents before they are uploaded as one or more digital documents. In some embodiments, the system is configured to enable notaries to ensure the authenticity of notarized documents from a remote location. In some embodiments, the system is configured to enable the authentication of any document, such as notary documents, construction documents, and identification papers, as non-limiting examples.

In some embodiments, the system includes a proprietary blockchain platform. In some embodiments, the system includes a subscription based and/or transaction-based (multiple or single payment due at time of service) payment system. In some embodiments, the system is configured to enable a user to enroll in a subscription service. In some embodiments, the system is configured to enable a user to send and/or receive currency. In some embodiments, the system includes an enterprise-level UX/UI. In some embodiments, the system is configured to enable a user to enroll in a profit-sharing program for users/customers.

In some embodiments, the system includes ID software configured to detect fake IDs. In some embodiments, the system to scan government-issued IDs, and the App is configured to tell the user (e.g., notary) whether the IDs are authentic or fake. In some embodiments, the system is configured to enable a user to verify that both the authentic signers and the authentic notaries are present, rather than imposters with fake IDs, stamps or documents. In some embodiments, the system includes blockchain software configured to prevent forgeries and/or preserve one or more transactions as evidence of verification and/or authenticity.

In some embodiments, the system includes a complete fraud solution configured to reduce the number of insurance claims from loses. In some embodiments, the system includes technology insurance configured to reduce the size of payouts. In some embodiments, the system includes cutting-edge blockchain security.

In some embodiments, the system includes a permission-based blockchain ("system blockchain"). In some embodiments, the system is configured to enable a notary to register one or more credentials on the system's blockchain. In some embodiments, when a notary registers (e.g., via a system application ("App")), a unique, notary non-fungible token ("notary NFT"; e.g., 64-digit) is generated on the system's blockchain. In some embodiments, the notary NFT is configured to identify a block of data on the blockchain about the notary that includes one or more of the following information: name (e.g., first, middle, last, title, etc.); address (e.g., email, physical, etc.); notary commission number(s); state(s) in which the notary is commissioned; business address for each commission; image of the notary's face; image of an impression of the notary's official seal; and confirmation that the authenticity of the notary's government-issued identification document (e.g., driver's license, passport, etc.) was verified.

In some embodiments, the system is configured to gather information about notarial transactions including metadata associated with the digital collection of the information and stores it on the blockchain, so end-viewers of the documents (i.e., the Recorder's Office, title agents, lawyers & property owners, reviewers, etc.) can confirm that they are authentic. In some embodiments, the information includes one or more of signer identification (ID) confirmation, true signer was present confirmation, true notary was present confirmation, picture of signer, date, time, location, image of signature pates, and unique hash code visible on document.

In some embodiments, the system includes an e-journal. In some embodiments, when a notary (user) uses the system e-journal, the system is configured to generate a unique, transaction non-fungible token (transaction NFT; e.g., 64-digit) on the system's blockchain. In some embodiments, this transaction NFT is configured to identify a block of data about the notary that includes one or more the following information: notary NFT; property NFT (if real estate-related notarization); customer's ("signer") name (e.g., first, middle, last, title, etc.); signer's address (e.g., email, physical, etc.); signer's phone number; confirmation that the authenticity of the signer government-issued identification document (i.e., driver's license or passport) was verified; confirmation that the notary personally knows the signer and no government-issued identification document is required; confirmation that the authenticity of two witnesses' government-issued identification documents were verified and no government-issued identification document is required from the signer; image (e.g., photo, video, etc.) of the signer's face.

In addition, in some embodiments, the transaction NFT is configured to identify a block of data about the notary that includes confirmation of one or more the following information: The notary has received satisfactory evidence of identity from the Signer; The Signer does not appear to the notary to be mentally incapable of understanding the document they are signing; The Signer does not appear to the notary to be acting under coercion or undue influence; The notary has no reason to believe the document will be used for unlawful purposes; The document to be signed does not contain any blanks; The document to be signed is not postdated; and The Signer has signed and dated all appropriate pages.

In some embodiments, the transaction NFT information includes one or more of: digital image of the signer's signature; image of an impression of the signer's thumbprint; commission number and seal that the notary used for the transaction; a unique hash code that identifies the notary transaction NFT; confirmation that the unique hash code (e.g., 7-digit) was written on the document to be signed; confirmation that the notary signed and stamped the document to be signed; type of document; document name; unique identifying number on the document (i.e., assessor's parcel number or lot number); image of the page(s) with signatures and notary seals; image of all pages of the document (optional); date; time; location; confirmation that the metadata associated with the capturing device (e.g., time, date, gps location, etc.) is accurate; confirmation the address determined by GPS is accurate; corrected address if the GPS address was not accurate; type of notarization (i.e., acknowledgment or jurat); amount of notary fee; and whether the fee was collected.

In some embodiments, the system includes an e-journal. In some embodiments, when a notary uses the e-journal for a real estate transaction, the system is configured to generate a unique, property non-fungible token ("property NFT"; e.g., 64-digit) i on the system's permission-based blockchain. In some embodiments, the property NFT is configured to identify a "block" of data about the property that includes one or more of the following information: notary NFT; transaction NFT; and construction NFT. In some embodiments, the construction NFT is configured to enable an engineer (or other quality inspector) to generate an inspection NFT. In some embodiments, the inspection NFT is configured to enable an inspector (e.g., engineer) to capture one or more conventional inspection documents using the App in a manner described herein. In some embodiments, the inspection NFT is configured to capture any of the information described previously.

Currently, when a title company, county recorder's office, county assessor, lawyer or court of law receives a paper document, they have no way of knowing if it is authentic or fake. However, in some embodiments, if the document was notarized by a notary who uses the system, a viewer of that document can use a system portal (e.g., web portal) to confirm its authenticity on the system's permission-based blockchain. In some embodiments, on the notarized document, a reviewer will find the unique hash code that links the document to the notary transaction NFT. In some embodiments, the system is configured to enable a user to type the unique hash code into the portal. In some embodiments, once the system verifies the unique hash code, the system is configured to grant the reviewer access to information about the document that includes one or more of the following as well as any information described herein: image of the page(s) with signatures, notary seals and unique hash code that identifies the NFT; image of all pages of the document (optional); date, time and location of the notarization; notary's name; notary's business address; image of the notary's face; signer's name; image of the signer's face; confirmation that the signer's identity was verified by a (e.g., one of three) lawful method; confirmation that the true signer was present; and confirmation that the true notary was present. In some embodiments, the system is configured to enable a reviewer to use any of the information described herein to confirm the authenticity of the paper document.

In some embodiments, the system is configured to enable one or more of property owners, title companies, county recorders, county assessors, lawyers, and other reviewers to search the system's blockchain via the portal for any property. In some embodiments, the system is configured to enable a reviewer to search by one or more of address, assessor's parcel number, and by the unique hash code (e.g., 7-digit) that a notary wrote on the document during a notarization. In some embodiments, the system is configured to enable a reviewer to gain chronological access to all the NFTs connected to a transaction and/or property along with any public data aggregated under each NFT.

Some embodiments include system for recording document transactions comprising one or more of: a blockchain, a camera, a computer network, a graphical user interface (GUI), an identification verification platform, a unique hash code generator, and one or more computers comprising one or more processors and one or more non-transitory computer readable media, the one or more non-transitory computer readable media comprising instructions stored thereon that when executed by the one or more processors configured the one or more computers to implement one or more steps. In some embodiments, the one or more steps include steps to: generate, by the one or more processors, the GUI; implement, by the one or more processors, the identification verification platform; display, on the GUI, one or more inputs for the identification verification platform; generate, by the unique hash code generator, a unique hash code configured to identify an identification document on the blockchain; receive, by the one or more processors, an image of the identification document from the camera; associate, by the one or more processors, the unique hash code with the image; and add, by the one or more processors, the image to a string of a plurality of unique hash codes on the blockchain. In some embodiments, the system is configured to enable a user to view the image on the blockchain by entering the unique hash code into an input on the GUI.

In some embodiments, the identification verification platform is configured to receive one or more images of one or more identification documents. In some embodiments, the system is configured to receive one or more manual entries of identification data associated with the one or more identification documents. In some embodiments, the system is configured to associate the unique hash code with the one or more images and/or the one or more manual entries.

In some embodiments, the system is configured to enable the user to modify and/or manually input identification data associated with the one or more identification documents into one or more manual inputs on the GUI. In some embodiments, the one or more manual inputs comprise one or more of first name, last name, email, and address. In some embodiments, the system is configured to verify an authenticity of the identification document. In some embodiments, the system is configured to record document authenticity verification metadata associated with a document authenticity verification. In some embodiments, the system is configured to associate the unique hash code with the document authenticity verification metadata.

Some embodiments include a system for recording notary transactions comprising one or more of: a blockchain, a camera, a computer network, a graphical user interface (GUI), an identification verification platform, a document verification platform, a unique hash code generator, and one or more computers comprising one or more processors and one or more non-transitory computer readable media, the one or more non-transitory computer readable media comprising instructions stored thereon that when executed by the one or more processors configured the one or more computers to implement one or more steps. In some embodiments, the one or more steps include instructions to: generate, by the one or more processors, the graphical user interface (GUI); implement, by the one or more processors, the identification verification platform; implement, by the one or more processors, the document verification platform; display, on the GUI, one or more inputs for the identification verification platform and/or the document verification platform on the GUI; generate, by the unique hash code generator, a unique hash code configured to identify a collection of one or more documents on the blockchain; receive, by the one or more processors, one or more images of the one or more documents from the camera; associate, by the one or more processors, the unique hash code with the one or more images; and add, by the one or more processors, the one or more images to a string of a plurality of unique hash codes on the blockchain.

In some embodiments, the system is configured to enable a user to view the one or more images on the blockchain by entering the unique hash code into an input on the GUI. In some embodiments, the one or more documents comprise an identification document. In some embodiments, the one or more documents comprise a physical document that requires a signature. In some embodiments, the system is configured to instruct the user to add the unique hash code to one or more physical document faces. In some embodiments, the system is configured to recognize and/or verify the unique hash code added to the physical document faces from analysis of the one or more images by the one or more processors.

In some embodiments, the identification verification platform is configured to receive one or more document images of one or more identification documents. In some embodiments, the system is configured to receive one or more manual entries of identification data associated with the one or more identification documents. In some embodiments, the system is configured to associate the unique hash code with the one or more images and/or with the one or more manual entries. In some embodiments, the document verification platform is configured to enable the user to capture one or more party images of the parties associated with the one or more documents.

In some embodiments, the system is configured to capture metadata associated with at least one images of the one or more documents uploaded to the system. In some embodiments, the metadata includes one or more of: time, date, and/or location. In some embodiments, the system is configured to associate the metadata with the unique hash code.

Some embodiments include a system for attaching documents to a blockchain comprising one or more computers comprising one or more processors and one or more non-transitory computer readable media, the one or more non-transitory computer readable media comprising instructions stored thereon that when executed by the one or more processors configured the one or more computers to generate one or more displays comprising various functionality. As used herein, a recitation of functionality associated with at least one display means that the functionality can be displayed on the same display as other functionality associated with at least one display, or the functionality can be be on a separate display as other functionality associated with at least one display.

In some embodiments, the system is configured to generate, by the one or more processors, a graphical user interface. In some embodiments, at least one display of the graphical user interface includes options for uploading one or more identification documents. In some embodiments, at least one display of the graphical user interface includes options for uploading one or more physical documents. In some embodiments, at least one display comprises inputs to enable a user to capture images of the one or more identification documents and/or the one or more physical documents. In some embodiments, at least one display of the graphical user interface includes a unique hash code configured to identify the one or more identification documents and/or the one or more physical documents on a blockchain. In some embodiments, at least one display of the graphical user interface includes instructions for a user to add the unique hash code to a face of the one or more physical documents before uploading. In some embodiments, the system is configured to add the one or more identification documents and/or the one or more physical documents to the blockchain.

In some embodiments, at least one display of the graphical user interface is configured to enable the user to capture one or more images of parties involved in a transaction associated with the one or more identification documents and/or the one or more physical documents. In some embodiments, at least one display of the graphical user interface is configured to enable the user to select a document type for upload.

In some embodiments, at least one display of the graphical user interface is configured to enable the user to enter a unique hash code and/or confirm a unique hash code for the document. In some embodiments, at least one display of the graphical user interface is configured to enable the user to view the one or more identification documents and/or the one or more physical documents upon entry of the unique hash code into a display input.

In some embodiments, at least one display of the graphical user interface is configured to enable the user to capture location data. In some embodiments, the location data comprises an address where the uploading takes place. In some embodiments, the location data includes global positioning system (GPS) data.

BRIEF DESCRIPTION OF DRAWINGS

FIGS. 23-52 are illustrative flowcharts for an onboarding, Verify ID Only, Lock-A-Doc, and Veri-Lock, process according to some embodiments.

FIG. 23 shows steps for an onboarding process and associated information displayed during the onboarding process that includes entering personal information according to some embodiments.

FIG. 24 illustrates additional steps for an onboarding process and associated information displayed during the onboarding process according to some embodiments.

FIG. 25 shows steps for an onboarding process and associated information displayed during the onboarding process that includes uploading an identification document according to some embodiments.

FIG. 26 illustrates steps for an onboarding process and associated information displayed during the onboarding process that includes uploading the back of a driver's license and system verification of document authenticity according to some embodiments.

FIG. 27 illustrates steps for an onboarding process and associated information displayed during the onboarding process that includes uploading an image of the user according to some embodiments.

FIG. 28 depicts steps for an onboarding process and associated information displayed during the onboarding process that includes adding notary license details according to some embodiments.

FIG. 29 shows steps for an onboarding process and associated information displayed during the onboarding process that includes adding a notary stamp according to some embodiments.

FIG. 30 depicts steps for an onboarding process and associated information displayed during the onboarding process that includes affirming information is correct according to some embodiments.

FIG. 31 illustrates steps for an onboarding process and associated information displayed during the onboarding process that includes verification and creation of an account including account details according to some embodiments.

FIG. 32 shows steps for the identification verification platform (verify ID only platform) and associated information displayed during system execution that includes selecting a type of document for verification according to some embodiments.

FIG. 33 depicts steps for the identification verification platform and associated information displayed during system execution that includes uploading a user's identification document according to some embodiments.

FIG. 34 illustrates steps for the identification verification platform and associated information displayed during system execution that includes the system verifying the authenticity of the identification document according to some embodiments.

FIG. 35 depicts steps for the identification verification platform and associated information displayed during system execution that includes a display configured to enable a user to input identification information manually according to some embodiments.

FIG. 36 shows steps for the document verification platform (lock-a-doc platform) and associated information displayed during system execution that includes links to system programs according to some embodiments.

FIG. 37 illustrates steps for the document verification platform and associated information displayed during system execution that includes document detail entry according to some embodiments.

FIG. 38 illustrates steps for the document verification platform and associated information displayed during system execution that includes unique hash code generation according to some embodiments.

FIG. 39 illustrates steps for the document verification platform and associated information displayed during system execution that includes uploading photographs of parties involved according to some embodiments.

FIG. 40 illustrates steps for the document verification platform and associated information displayed during system execution that includes confirming location and capturing location metadata according to some embodiments.

FIG. 41 illustrates steps for the document verification platform and associated information displayed during system execution that includes displaying a map and address of the user's current location according to some embodiments.

FIG. 42 illustrates steps for the combination identification verification and document verification platform (veri-lock platform) and associated information displayed during system execution that includes sharing the document according to some embodiments.

FIG. 43 illustrates steps for the veri-lock platform and associated information displayed during system execution that includes inputs for executing one or more aspects of the system according to some embodiments.

FIG. 44 illustrates steps for the veri-lock platform and associated information displayed during system execution that includes selecting a type of identifying document according to some embodiments.

FIG. 45 illustrates steps for the veri-lock platform and associated information displayed during system execution that includes capturing and uploading an image of the identifying document according to some embodiments.

FIG. 46 illustrates steps for the veri-lock platform and associated information displayed during system execution that includes verifying identifying document authenticity according to some embodiments.

FIG. 47 illustrates steps for the veri-lock platform and associated information displayed during system execution that includes capturing an image of the user (e.g., notary, signer) according to some embodiments.

FIG. 48 illustrates steps for the veri-lock platform and associated information displayed during system execution that includes adding a seal to the document collection according to some embodiments.

FIG. 49 illustrates steps for the veri-lock platform and associated information displayed during system execution that includes the system generating a unique hash code according to some embodiments.

FIG. 50 illustrates steps for the veri-lock platform and associated information displayed during system execution that includes adding document images according to some embodiments.

FIG. 51 illustrates steps for the veri-lock platform and associated information displayed during system execution that includes adding multiple documents according to some embodiments.

FIG. 52 illustrates steps for the veri-lock platform and associated information displayed during system execution that includes adding location data including an address and location on a map and/or capturing location metadata according to some embodiments.

DETAILED DESCRIPTION

Figure 1:
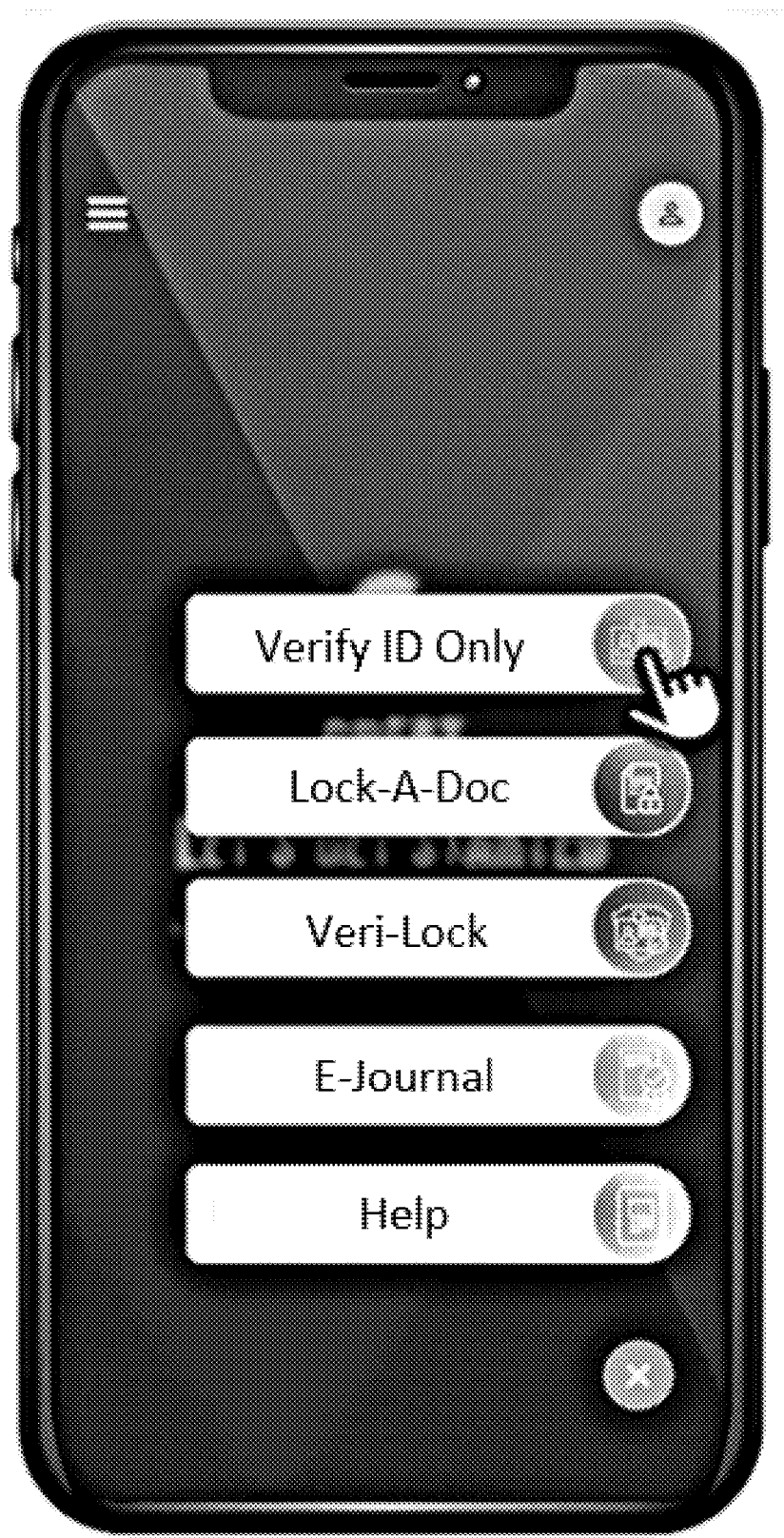
FIG. 1 illustrates a system graphical user interface (GUI) with a user selecting a verify ID only platform according to some embodiments.

In some embodiments, the best mode for implementing the systems and methods described herein is set forth in the detailed description. It is understood that the application is not limited to example embodiments, but that instead some embodiments are set forth to satisfy the best mode requirement. Each embodiment describes a portion of the whole system and features from some embodiments are readily combinable with features from some other embodiments. Therefore, discussions of features in conjunction with a particular discipline or embodiment do not limit the combination of those features with any other embodiment described in detail herein.

In addition, while the detailed description is limited to implementations of one or more portions of the system implemented into an embodiments that includes a "Verify ID Only; Lock-A-Doc; Veri-Lock; E-Journal; and Help" platforms, the system is not limited to such an arrangement, and it is understood that one or more features that comprise the system are readily integrated and/or is integrated into any system platform, and that any configuration from a platform may be used in conjunction with a configurations from another platform when defining the metes and bounds of the system. In addition to the implementations of the system described according to some embodiments herein, the system can be configured for documentation associated with, as non-limiting examples, notaries, engineers, architects, voting, and/or any or all property transactions including home, car, and personal property.

In some embodiments, the system's target market includes title insurance carriers and/or notaries as a best mode. In some embodiments, the system's target market includes notary signing agents who handle mortgage closings.

In some embodiments, the system includes a subscription model. In some embodiments, the system is configured to enable notaries to purchase a monthly subscription. In some embodiments, the system is configured to enable insurance carriers to pay a fee for each real estate transaction in which the system is used. In some embodiments, the system is configured to determine and share revenue with notaries implementing the subscription model.

In some embodiments, the system includes a transaction-based model. In some embodiments, the transaction-based model is configured to enable collection from a title company per real estate closing. In some embodiments, the system is configured to provide financial incentives for title companies.

In some embodiments, the system is configured to provide secure document verification for one or more of: notaries, E&O insurance for notaries, e-journals, engineers, consumer applications (software apps), title companies, Remote Online Notarization (RON), voting, architects, E&O insurance for architects, signature guaranty, credit card transactions, and web-based real estate history reports.

In some embodiments, the system is configured to enable (brokering) the sale of identity data and geolocation data from the signer of a notarized document to a title insurance company or government agency. In some embodiments, the notary public is present at the signing and validates the identity and location of the signer using one or more system configurations described herein.

In some embodiments, the system includes a network of notaries that use the system to create blockchain records of notarial transactions. In some embodiments, the system's blockchain verification comprises the use of only computers owned by notaries. In some embodiments, the system's blockchain comprises the use of one or more public and/or notary computers to solve the system blockchain. In some embodiments, the blockchain comprises conventional blockchain algorithms and/or coding. In some embodiments, the blockchain comprises proprietary blockchain algorithms and/or coding. In some embodiments, system is configured to enable blockchain records of notarial transactions can be viewed by other users. In some embodiments, the system includes a consumer App configured to enable the user of a notary's services and/or to verify their own identity on their own smartphone.

In some embodiments, the system includes an immutable digital record of analog data authenticated by an authorized user such as a notary. Some embodiments of the system are configured to create a digital record of the signing of paper documents. In some embodiments, the user does not necessarily create the document. Some embodiments of the system are configured to capture metadata associated with the signing transaction. In some embodiments, the system is configured to use the captured metadata to verify one or more of identity of the notary and image, identity of the signer and signature image, date, time, location, unique hash code (e.g., 7-digit), and/or a document image. All of this metadata is then stored on the system blockchain in some embodiments. In some embodiments, the metadata is organized and/or stored in a searchable relational database, with varying levels of permissioned access.

Prior art systems make no attempt to ensure that the originally scanned document itself is authentic, which some embodiments of the system are configured to do by verifying the identity of the signer and capturing an image of the signer at the date, time and location of the signing. In some embodiments, the system is configured to enable subsequent viewers of the documents to confirm that the document they are viewing is identical to the one that the signer signed at the moment it was signed by the signer.

In some embodiments, the system comprises one or more platforms that include one or more configurations as described herein. In some embodiments, the system includes one or more of an identification verification platform (verify ID only platform), a document verification platform (lock-a-doc platform), a combination identification verification and document verification platform (veri-lock platform), a signature entry platform (e-journal platform), and a help platform. In some embodiments, the system comprises one or more computers comprising one or more processors and one or more non-transitory computer readable media. In some embodiments, the non-transitory computer readable media comprises instructions stored thereon that when executed by the one or more processors cause the one or more computers to implement one or more configurations that include one or more computer implemented steps described herein.

FIG. 1 illustrates a system graphical user interface (GUI) with a user selecting an identification verification platform (verify ID only platform) according to some embodiments. In some embodiments, the system GUI supports the enablement for one or more system configurations described herein. The accompanying figures depict one or more features of GUI, and the content displayed in the figures and descriptions thereof also are also at least part of aspects of the system according to some embodiments.

Figure 2:
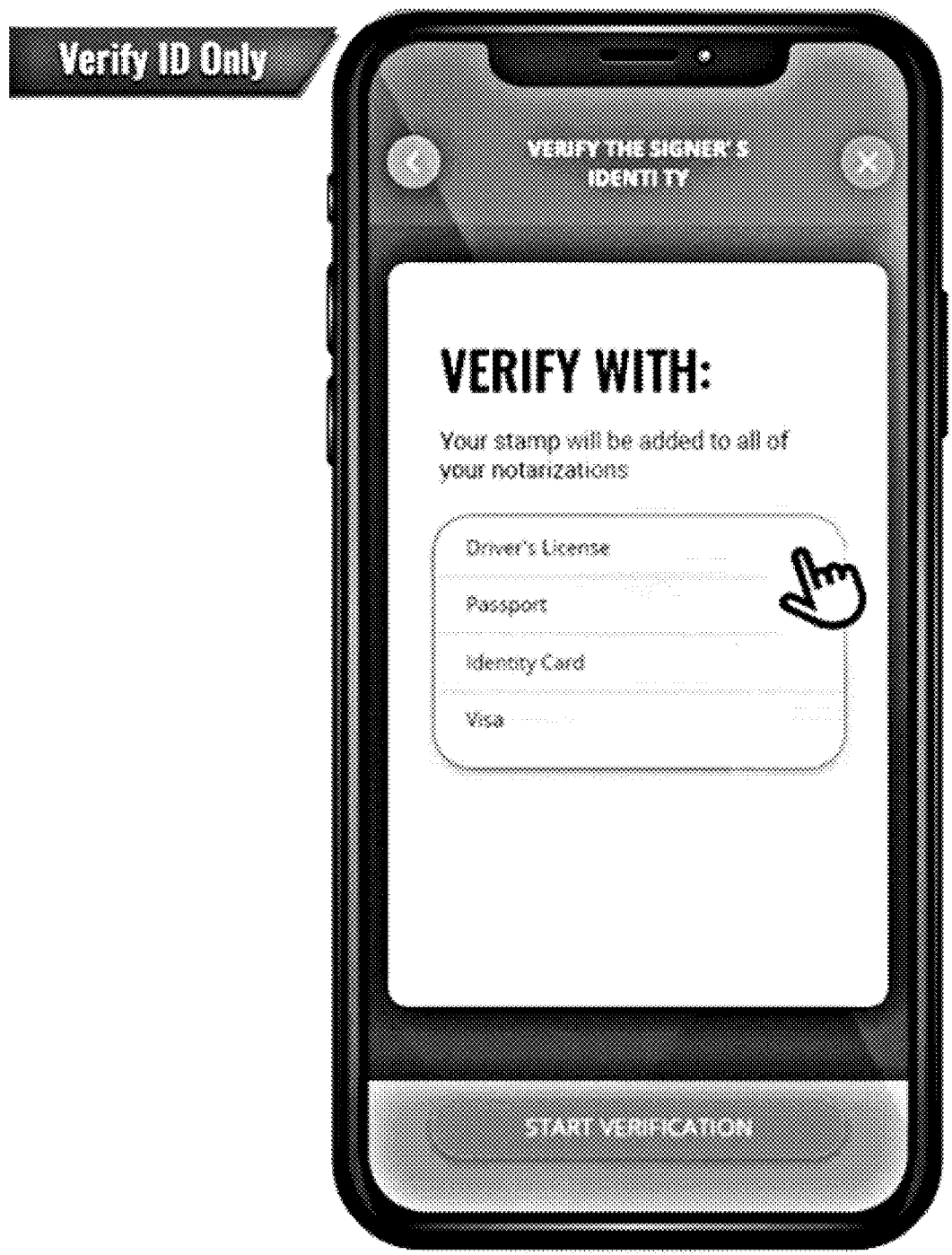
FIG. 2 depicts a system GUI including options for verification according to some embodiments.

FIG. 2 depicts a system GUI including options for identification verification according to some embodiments. In some embodiments, the identification verification platform is configured to capture and/or upload one or more identification documents. In some embodiments, the system is configured to upload on or more of a driver's license, a passport, an identification card, and/or a credit card, as non-limiting examples.

Figure 3:
FIG. 3 shows a system enabled process for verifying ID authenticity and/or uploading ID information for storage on the system blockchain according to some embodiments.

FIG. 3 shows a system enabled process for verifying ID authenticity and/or uploading ID information for storage on the system blockchain according to some embodiments. In some embodiments, the identification document is a driver's license. In some embodiments, the system is configured to capture an image (e.g., picture, video, gif. etc.) of a driver's license using one or more conventional cameras. In some embodiments, the system is configured to enable the user to capture an image of multiple sides and/or angles of the identification document. In some embodiments, the system is configured to identify and/or collect text from the image for input into corresponding fields. In some embodiments, the system is configured to enable a user to modify and/or manually input information into corresponding fields, such as the first name, last name, email, and address entries as shown in FIG. 3 as non-limiting examples.

Figure 4:
FIG. 4 illustrates a system GUI with a user selecting a lock-a-doc platform according to some embodiments.

FIG. 4 illustrates a system GUI with a user selecting a document verification platform (lock-a-doc platform) according to some embodiments. In some embodiments, the document verification platform is configured to link to and/or implement one or more of a scan documents program, a photograph parties program, a confirm location program, and a send links program.

Figure 5:
FIG. 5 shows a system GUI displaying on or more links to one or more lock-a-doc steps as well as a scanning document verification page according to some embodiments.

FIG. 5 shows a system GUI displaying on or more links to one or more system implemented steps as well as a scanning document verification page according to some embodiments. As shown in FIG. 5, in some embodiments, the scan documents program comprises one or more document verification steps. In some embodiments, the document verification steps include instructions to display and enable verification of one or more of: all physical documents are signed by the parties involved; photos are taken with a steady hand; images are not blurry; and entire document is captured within view.

Figure 6:
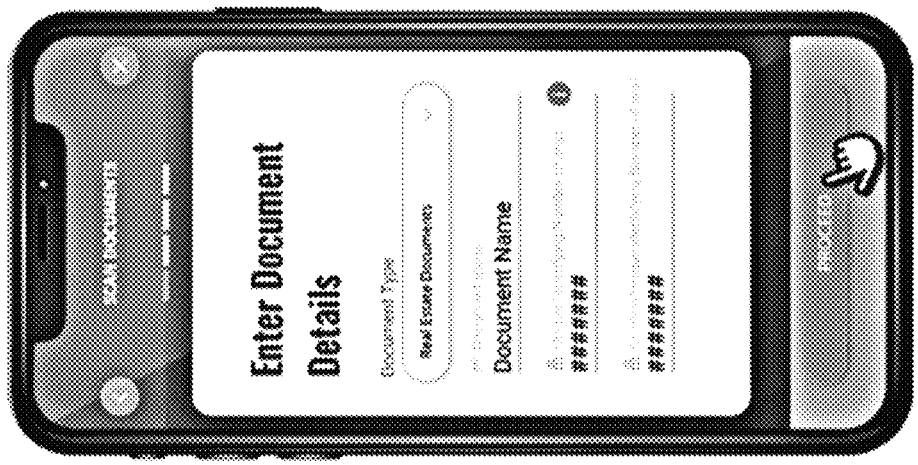
FIG. 6 shows system GUIs for capturing document details according to some embodiments.
Figure 6:
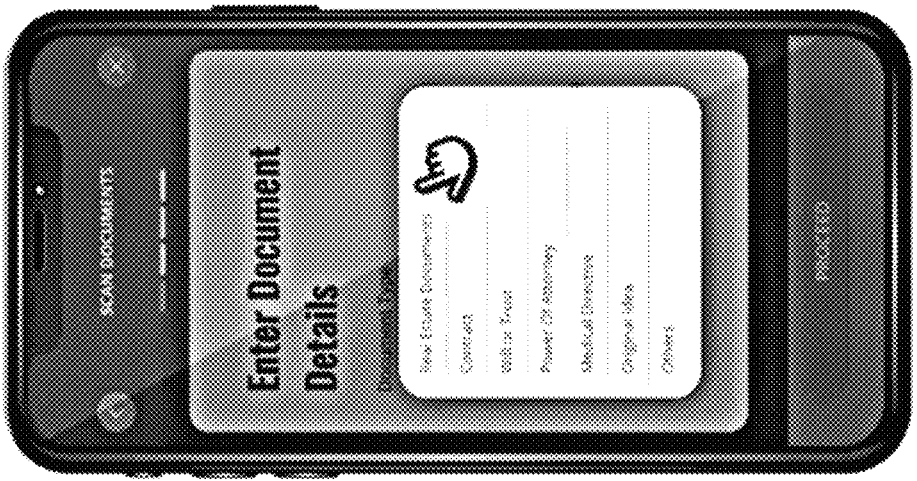
Figure 6:
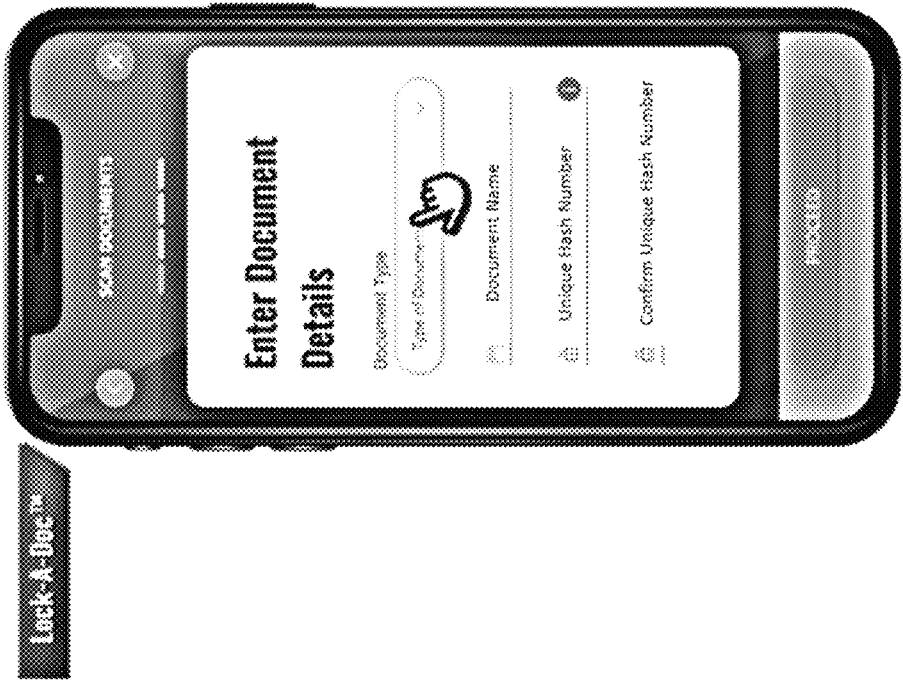

FIG. 6 shows system GUIs for capturing document details according to some embodiments. In some embodiments, the system is configured to generate an enter document details display on the GUI. In some embodiments, the system is configured to enable a user to select a document type to upload from the GUI. In some embodiments, a type of document to upload can include one or more of: a real estate document, a contract, a will or trust; a power of attorney; and a medical directive as non-limiting examples. In some embodiments, the system is configured to enable a user to customize the select a document type menu on the GUI to include one or more document types. In some embodiments, the enter document details display is configured to enable a user to enter a unique hash code and/or confirm a unique hash code for the document. In some embodiments, the system is configured to group documents by a unique hash code for storage in a block of the system's block chain. In some embodiments, if a unique has code has not been generated for the transaction, the system is configured to generate the unique hash code as further described with respect to FIG. 7.

Figure 7:
FIG. 7 depicts a system GUI displaying instructions for obtaining and recording a unique hash code according to some embodiments.

FIG. 7 depicts a system GUI displaying instructions for obtaining and recording a unique hash code according to some embodiments. In some embodiments, the system is configured to generate a unique hash code for a particular transaction. In some embodiments, the system is configured to display the unique hash code on the GUI. In some embodiments, the system includes a step of a user physically writing the unique has code on the document that is to be uploaded to the system block chain. In some embodiments, the system is configured to display one or more inputs on the GUI that enables a user to capture an image of the document with the unique hash code written on it. In some embodiments, the system is configured to extract the written unique hash code from the scanned document and compare the extracted text to the generated document to ensure accuracy before uploading the document to the system's blockchain.

Figure 8:
FIG. 8 depicts a system GUI displaying instructions for obtaining and recording party details according to some embodiments.
Figure 8:
Figure 8:

FIG. 8 depicts a system GUI displaying instructions for obtaining and recording party details according to some embodiments. In some embodiments, the system is configured to generate a display including one or more inputs that enable the user to capture one or more images of the parties associated with the one or more documents. In some embodiments, the system is configured to generate a display with inputs to associate one or more manually entered party details with the one or more images and/or the one or more documents.

Figure 9:
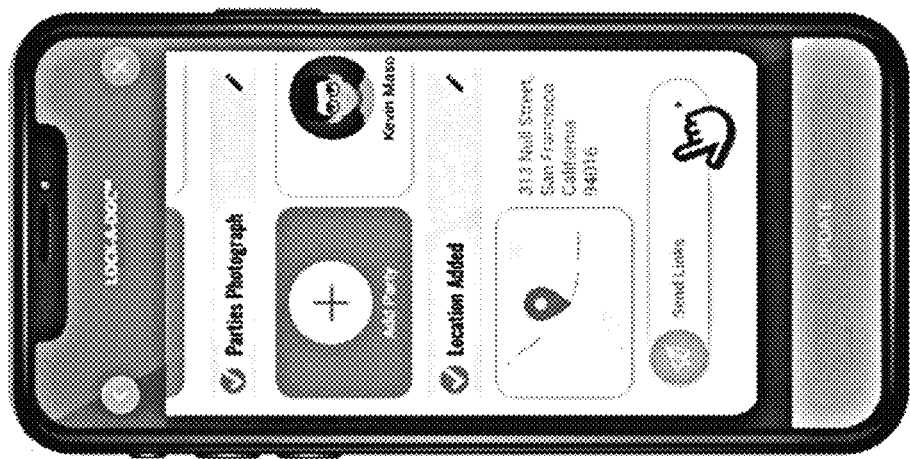
FIG. 9 illustrates a system GUI capturing metadata about the transaction's location including global position system (GPS) as well as the ability to capture manually entered data about the transaction's location according to some embodiments.
Figure 9:
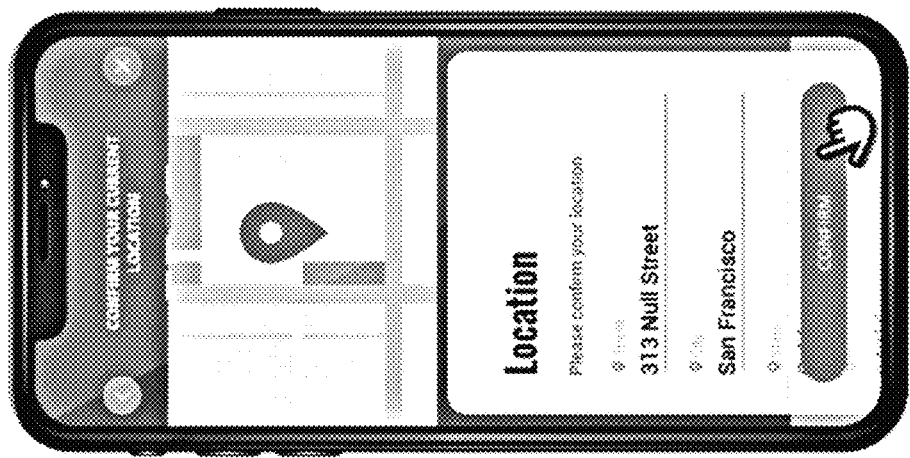
Figure 9:

FIG. 9 illustrates a system GUI capturing metadata about the transaction's location including global position system (GPS) data according to some embodiments. In some embodiments, the system is configured to generate a confirm location input on the GUI. In some embodiments, the system is configured to generate a confirm location input on the GUI only during one or more transactions associated with the document upload. In some embodiments, the system is configured to cancel a document verification session if the time before an image and/or metadata is received by the system exceeds a pre-determined time from when the unique hash value was generated. In some embodiments, the confirm location input includes a manual input configured to enable a user to manually enter one or more location attributes. In some embodiments, the system is configured generate a link to one or more transaction items on the GUI as shown in FIG. 9.

Figure 10:
FIG. 10 shows a system GUI for verifying a signer's (customer, user) identity according to some embodiments.

FIG. 10 shows a system GUI for a combination identification verification and document verification platform (veri-lock platform) for verifying the signer's (customer) identity and recording documents according to some embodiments. In some embodiments, the system is configured to generate a display comprising one or more of: a verify signer input; a sign documents input; an add your seal input; a lock documents input; and a confirm location input. In some embodiments, the verify signer input is configured to cause the system to generate a display comprising one or more inputs for verifying a person's identity. In some embodiments, the identity verification inputs comprise inputs to select one or more of: government-issued identification; signer is personally known; and verify identity using credible witness(es). FIG. 10 shows a selection of the government-issued identification option leading to the upload process previously described with respect to FIG. 3. In some embodiments, the system is configured to confirm the authenticity of the identification using one or more of proprietary systems and/or third-party conventional systems.

Figure 11:
FIG. 11 depicts a system GUI for capturing an image of the signing party according to some embodiments.

FIG. 11 depicts a system GUI for capturing an image of the signing party according to some embodiments. In some embodiments, the system is configured to display a prompt for and one or more inputs for capturing an image of the people involved in a transaction. In some embodiments, the system is configured to generate a display with one or more inputs for manually collecting identifying information for each party involved as previously described. In some embodiments, the system is configured to generate a display that includes one or more of: sign documents; add your seal; lock documents; and confirm location as non-limiting examples.

Figure 12:
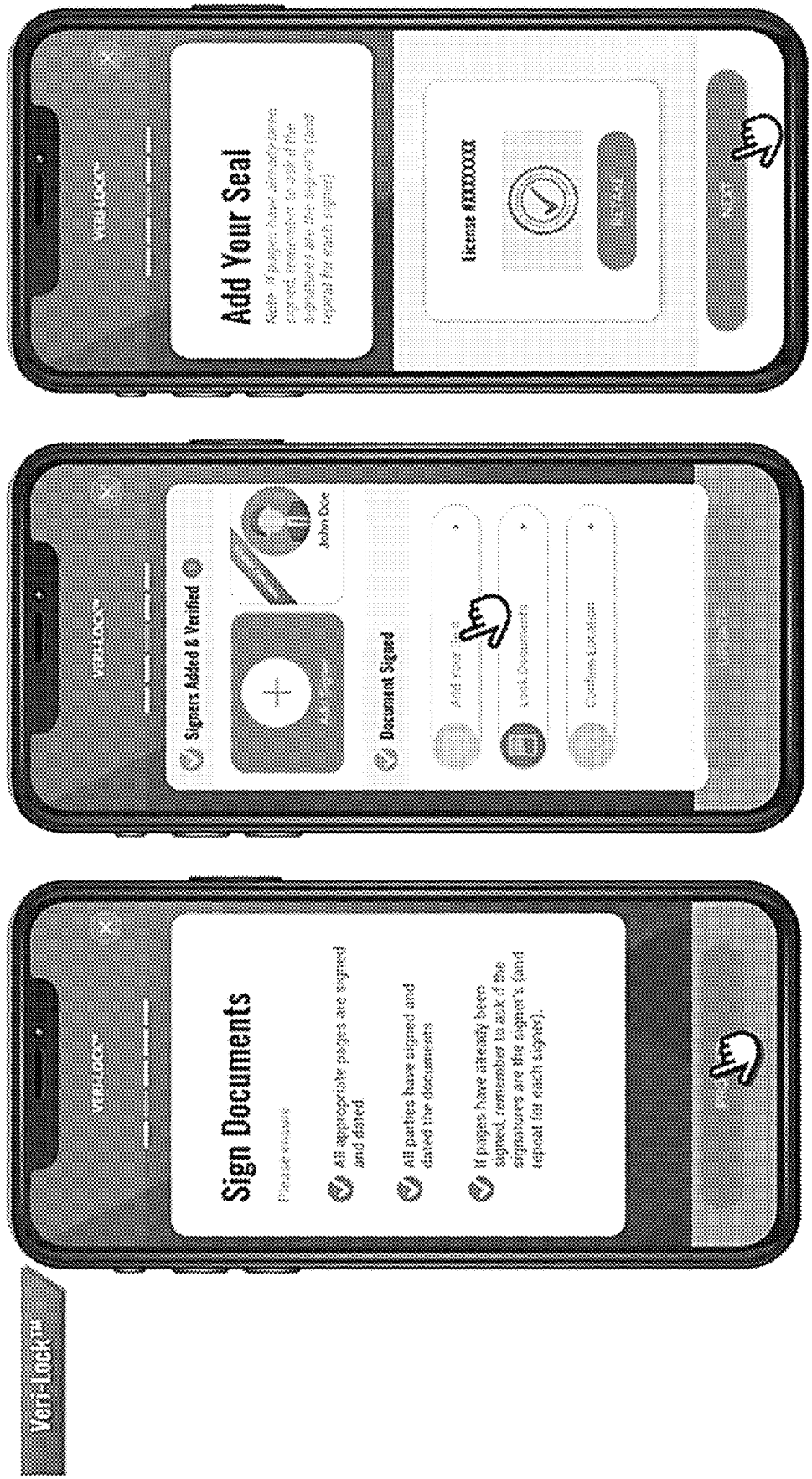
FIG. 12 shows a system GUI for adding a seal (e.g., notary seal) to the signed documents according to some embodiments.

FIG. 12 shows a system GUI for adding a seal (e.g., notary seal) to the signed documents according to some embodiments. In some embodiments, the system is configured to generate a display that includes one or more verification inputs to ensure all documents are signed correctly. In some embodiments, the system is configured to prevent a seal from being added to the transaction and/or one or more transaction documents unless confirmation that all documents are correct is received. In some embodiments, the system is configured to attach a digital seal to the document upon selection of the add your seal input.

Figure 13:
FIG. 13 shows a system GUI and the generation of a unique hash code for the transaction according to some embodiments.

FIG. 13 shows a system GUI and the generation of a unique hash code for the transaction according to some embodiments. In some embodiments, the generation of the unique hash code is the same as described with respect to FIG. 7 and will not be repeated in the interest of being concise. In some embodiments, the seal includes the unique has code.

Figure 14:
FIG. 14 illustrates a system GUI for locking the documents according to some embodiments.

FIG. 14 illustrates a system GUI for locking the documents according to some embodiments. In some embodiments, selection of the lock documents input on the GUI is configured to generate an enter document details screen which has been described previously with respect to FIG. 6 and FIG. 7. In some embodiments, the system is configured to enable a user to upload an image of the document after selecting a document type.

Figure 15:
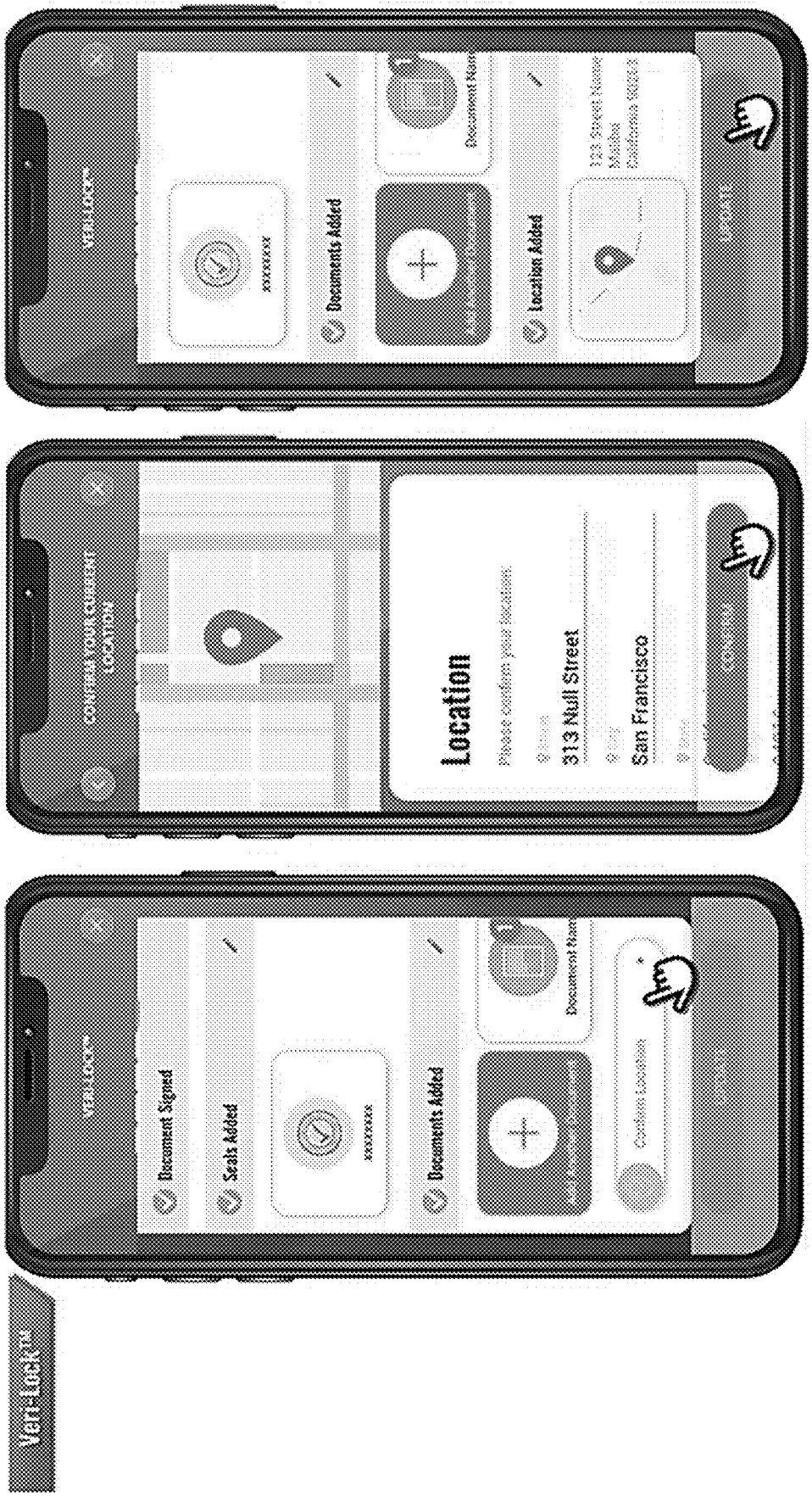
FIG. 15 depicts a system GUI implementing capturing location metadata (e.g., GPS data) and manually entered location data according to some embodiments.

FIG. 15 depicts a system GUI implementing capturing location metadata (e.g., GPS data) and manually entered location data according to some embodiments. In some embodiments, the process for capturing location metadata has been described previously with respect to FIG. 9. In some embodiments, in addition to location, the system is configured to record metadata such as time, date, IP address, and/or any other conventional metadata associated with a computer system.

Figure 16:
FIG. 16 depicts a system GUI enabling the selection of the E-Journal platform according to some embodiments.

FIG. 16 depicts a system GUI enabling the selection of a signature entry platform (e-journal platform) according to some embodiments.

Figure 17:
FIG. 17 shows a system GUI enabling the selection of a verify signer's program according to some embodiments.

FIG. 17 shows a system GUI enabling the selection of a verify signer's program according to some embodiments. In some embodiments, the system is configured to generate one or more inputs on the display comprising one or more of: verify signer(s), sign documents, signature and thumbprints, add your seal, add documents, confirm location, and complete journal, as non-limiting examples. In some embodiments, the selection of the verify signer(s) input is configured to cause the system to display a selection of options for verifying identity as previously described including government-issued identification, signer is known to me personally, and verify identity using credible witness(es) as non-limiting examples. In some embodiments, the system is configured to generate a display enabling upload of one or more images of the identification as previously described.

Figure 18:
FIG. 18 shows a system GUI enabling selection of a sign documents program according to some embodiments.

FIG. 18 shows a system GUI enabling selection of one or more sign documents program according to some embodiments. In some embodiments, selection of the sign documents input is configured to implement one or more signed document programs. In some embodiments, the signed document programs are configured to display one or more inputs for acknowledging liabilities. In some embodiments, the one or more signed document programs are configured to display inputs for confirming one or more document review steps. In some embodiments, the one or more signed document programs are configured to display inputs for confirming one or more documents are signed.

Figure 19:
FIG. 19 shows a system GUI enabling selection of a signature and/or thumbprint(s) entry program according to some embodiments.

FIG. 19 shows a system GUI enabling selection of a signature and/or thumbprint(s) entry program according to some embodiments. In some embodiments, the system is configured to generate a party selection list upon selection of a signature and/or thumbprint(s) entry program. In some embodiments, the system is configured to generate a signature input display upon selection of the party. In some embodiments, the system is configured to enable a user to manually draw their signature on the user device input display (e.g., touchscreen). In some embodiments, the system is configured to capture an image of the user's signature. In some embodiments, the system is configured to generate a thumbprint input display. In some embodiments, the system is configured to capture a party's thumbprint by scanning the user input device. In some embodiments, the system is configured to capture an image of an impression of the user's thumbprint. In some embodiments, the system is configured to convert the image of the signature and or thumbprint to electronic form. In some embodiments, the system is configured to compare the signature and/or thumbprint to an external database to ensure authenticity by one or more of proprietary and/or third-party conventional systems.

Figure 20:
FIG. 20 shows a system GUI enabling selection of an add seal program according to some embodiments.

FIG. 20 shows a system GUI enabling selection of an add seal program according to some embodiments. In some embodiments, the steps for adding a seal comprise one or more of same steps as outlined above with respect to FIG. 12 and will not be repeated in the interest of being concise.

Figure 21:
FIG. 21 shows a system GUI enabling selection of an add documents program according to some embodiments.

FIG. 21 shows a system GUI enabling selection of an add documents program according to some embodiments. In some embodiments, the steps for adding a document include one or more of the same steps as described above with respect to FIG. 6 and FIG. 7. In some embodiments, the order of the steps may vary but includes capturing an image with the unique hash code on the document.

Figure 22:
FIG. 22 shows a system GUI enabling selection of a confirm location program as well as a complete journal program that includes a fee collection program according to some embodiments.

FIG. 22 shows a system GUI enabling selection of a confirm location program as well as a complete journal program that includes a fee collection program according to some embodiments. In some embodiments, the confirm location include one or more of the same steps recited with respect to FIG. 9. In some embodiments, the system is configured to display inputs for completing an e-journal entry. In some embodiments, the completion inputs include one or more of acknowledgment, affidavit, certification, copy, declaration, deposition, jurat, marriage, oath/affirmation, official witnesses, protest, signature, verification, and other as non-limiting examples. In some embodiments, the system is configured to collect fees for the transition. In some embodiments, the system is configured to generate the appropriate fee for each type of transition and/or display the fee on the GUI.

FIGS. 23-52 are illustrative flowcharts for an onboarding, Verify ID Only, Lock-A-Doc, and Veri-Lock, process according to some embodiments. The illustrative flowcharts comprise an order of one or more execution steps, as well as content displayed on the GUI for one or more steps, that form part of the system and may be readily incorporated into any description of the metes and bound of the system. In some embodiments, the steps may be executed in a different order, so the order shown is for illustrative purposes only and is not meant to be limiting. It is understood that the following illustrative flowcharts are supplemental and readily incorporable into that which has been previously described.

Figure 23:
Figure 23:
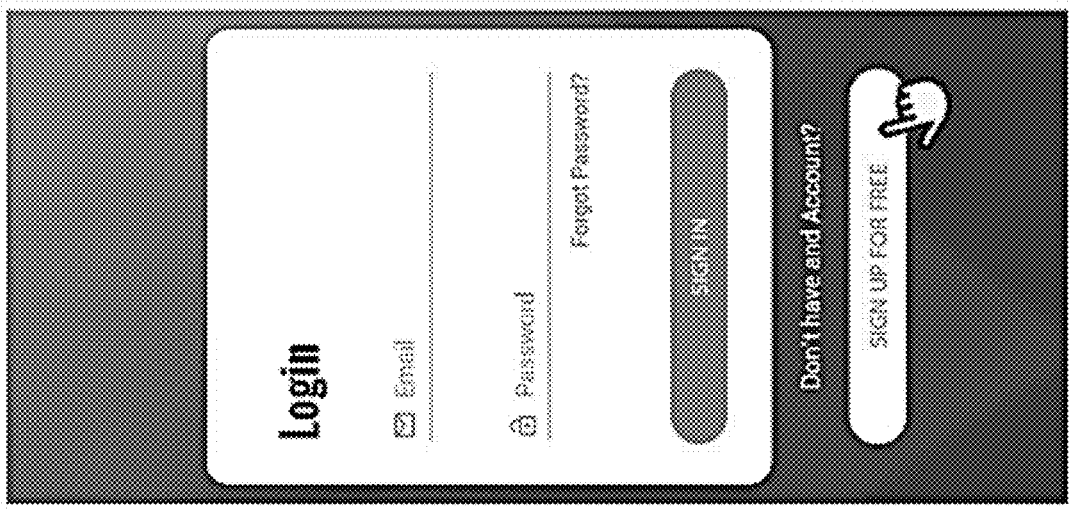
Figure 23:
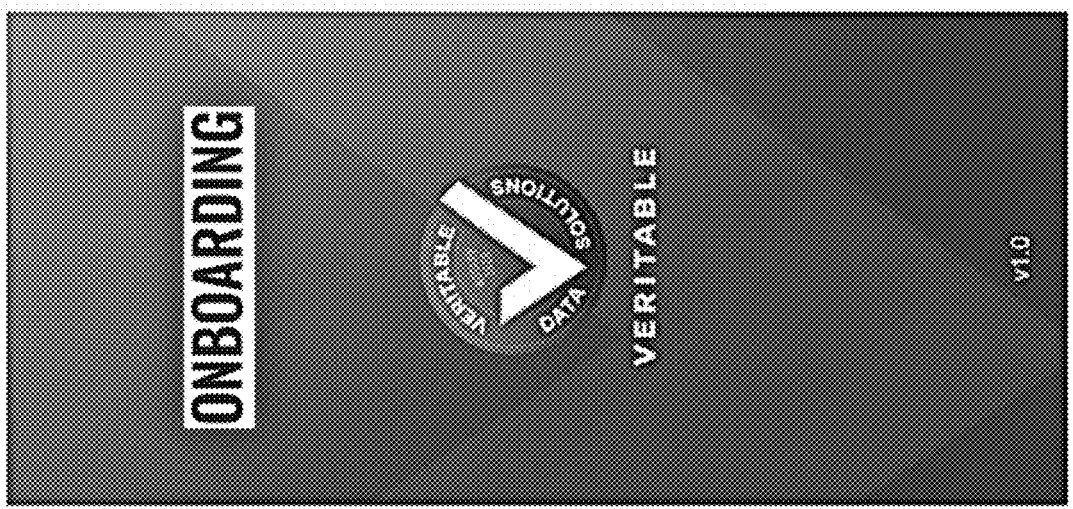
Figure 24:
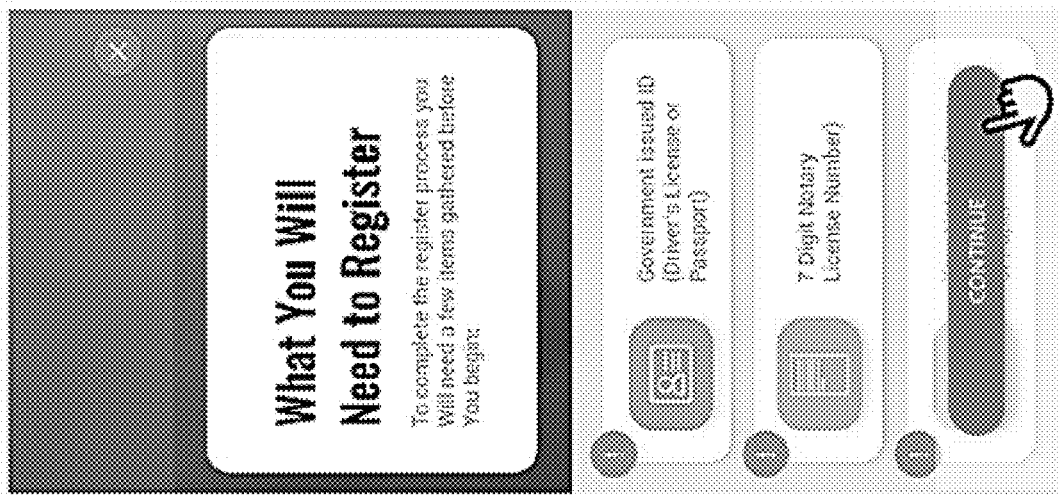
Figure 24:
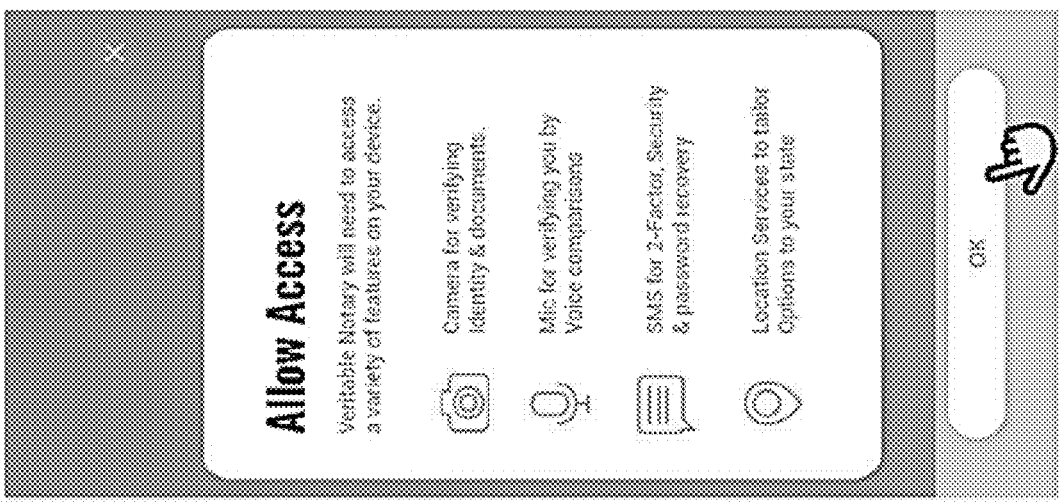
Figure 24:
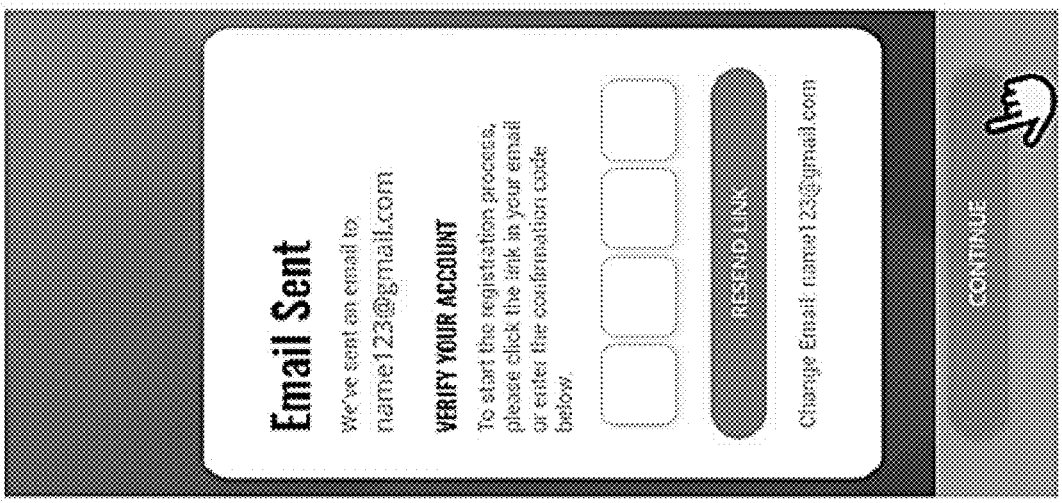
Figure 25:
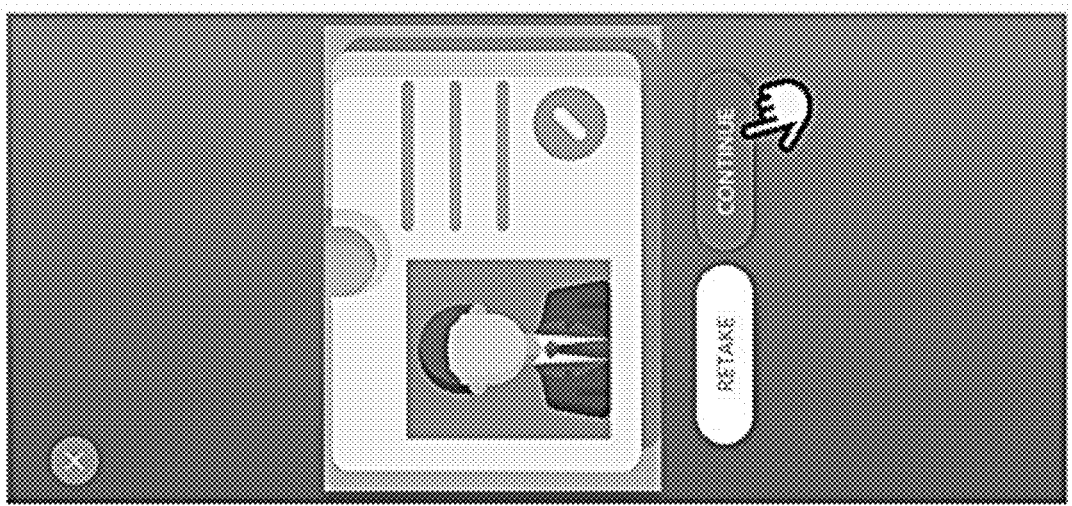
Figure 25:
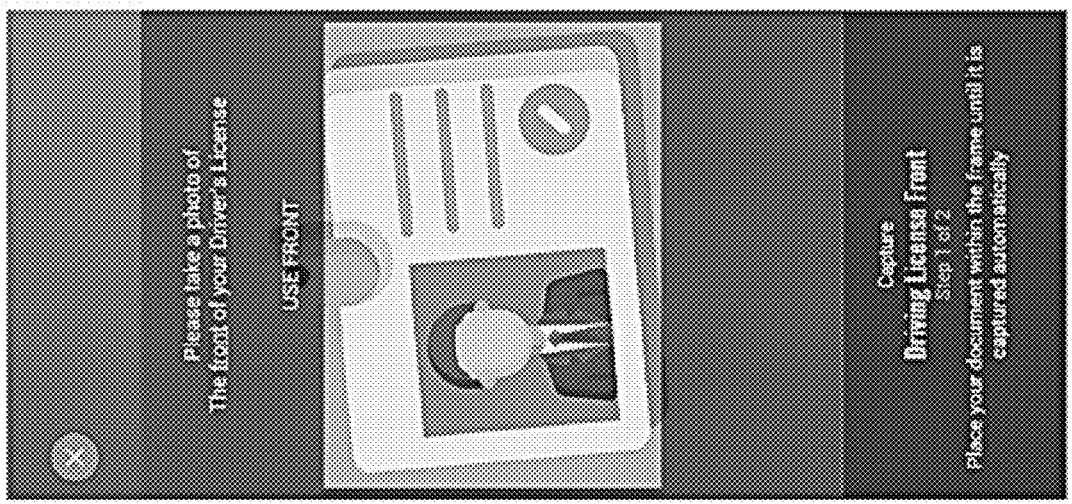
Figure 25:
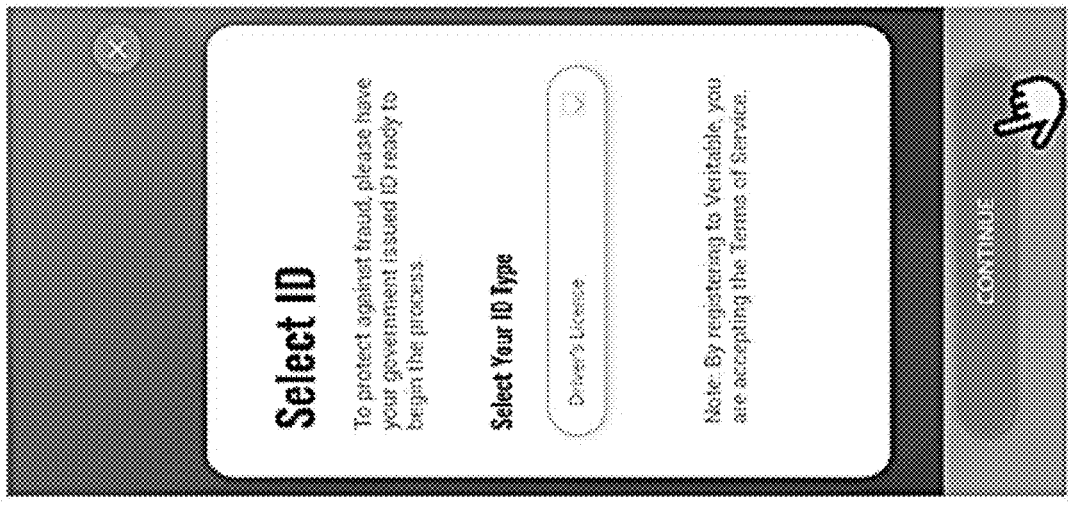
Figure 26:
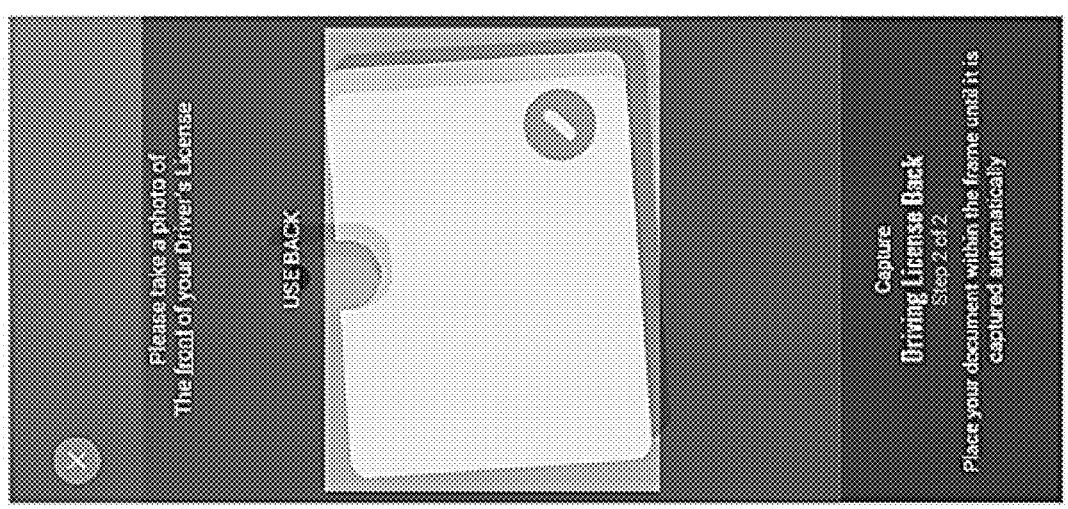
Figure 26:
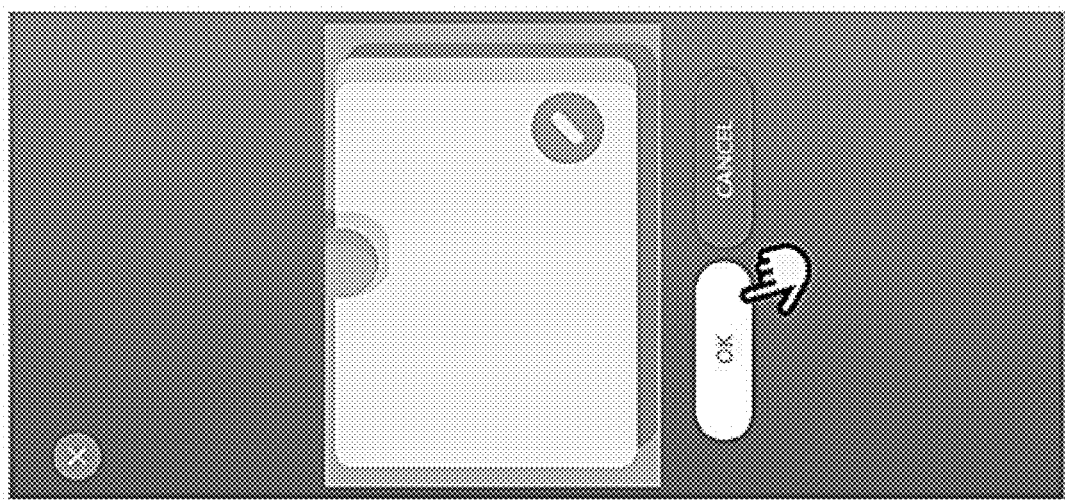
Figure 26:
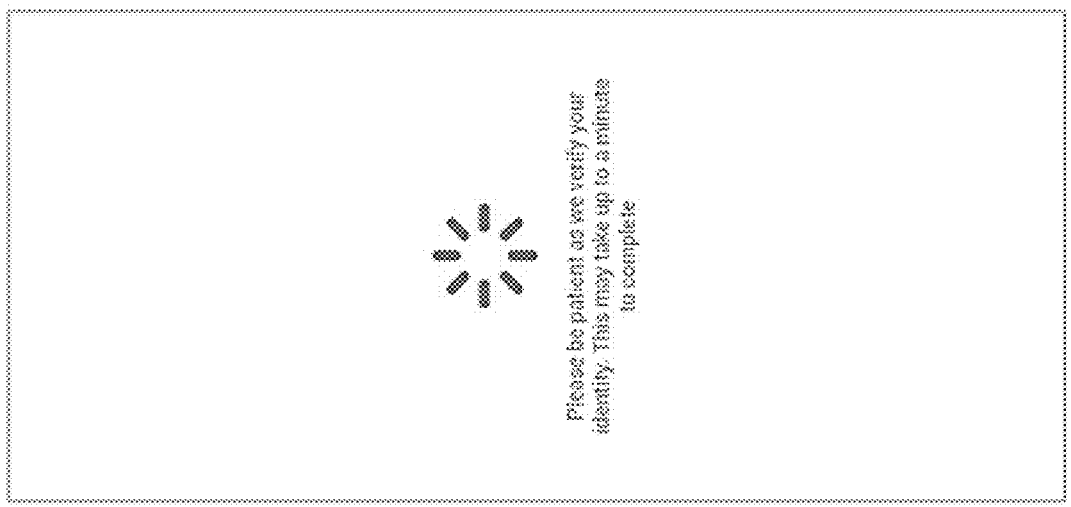
Figure 27:
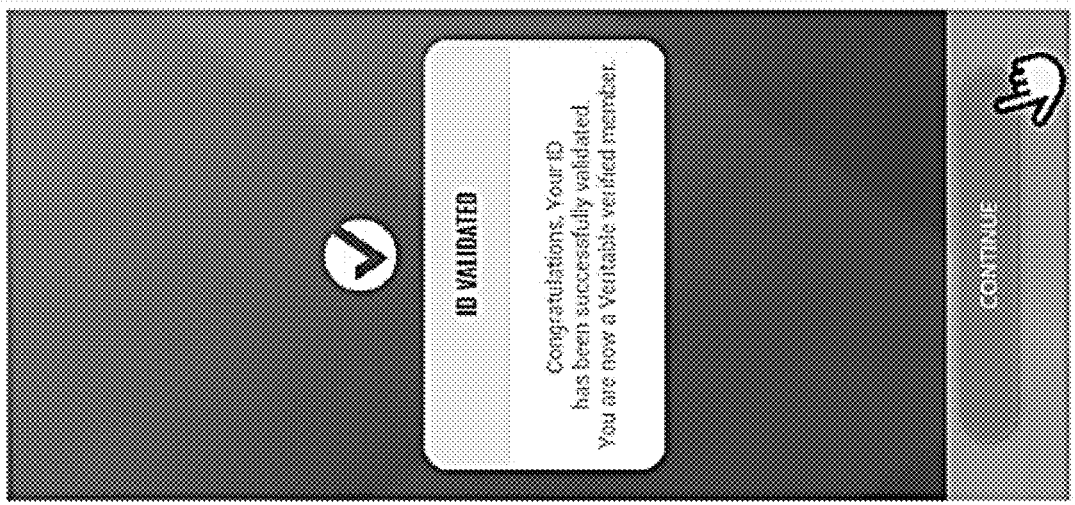
Figure 27:
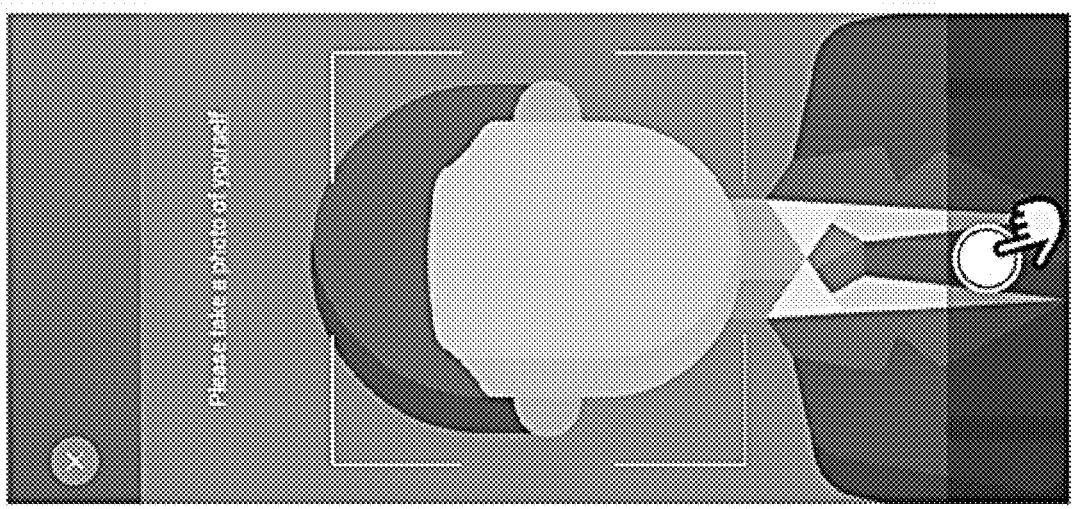
Figure 27:
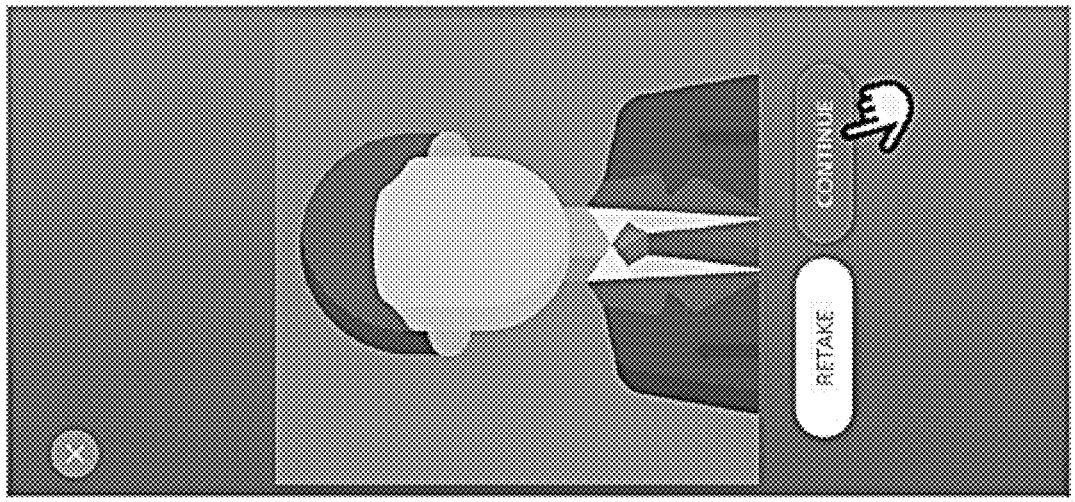
Figure 28:
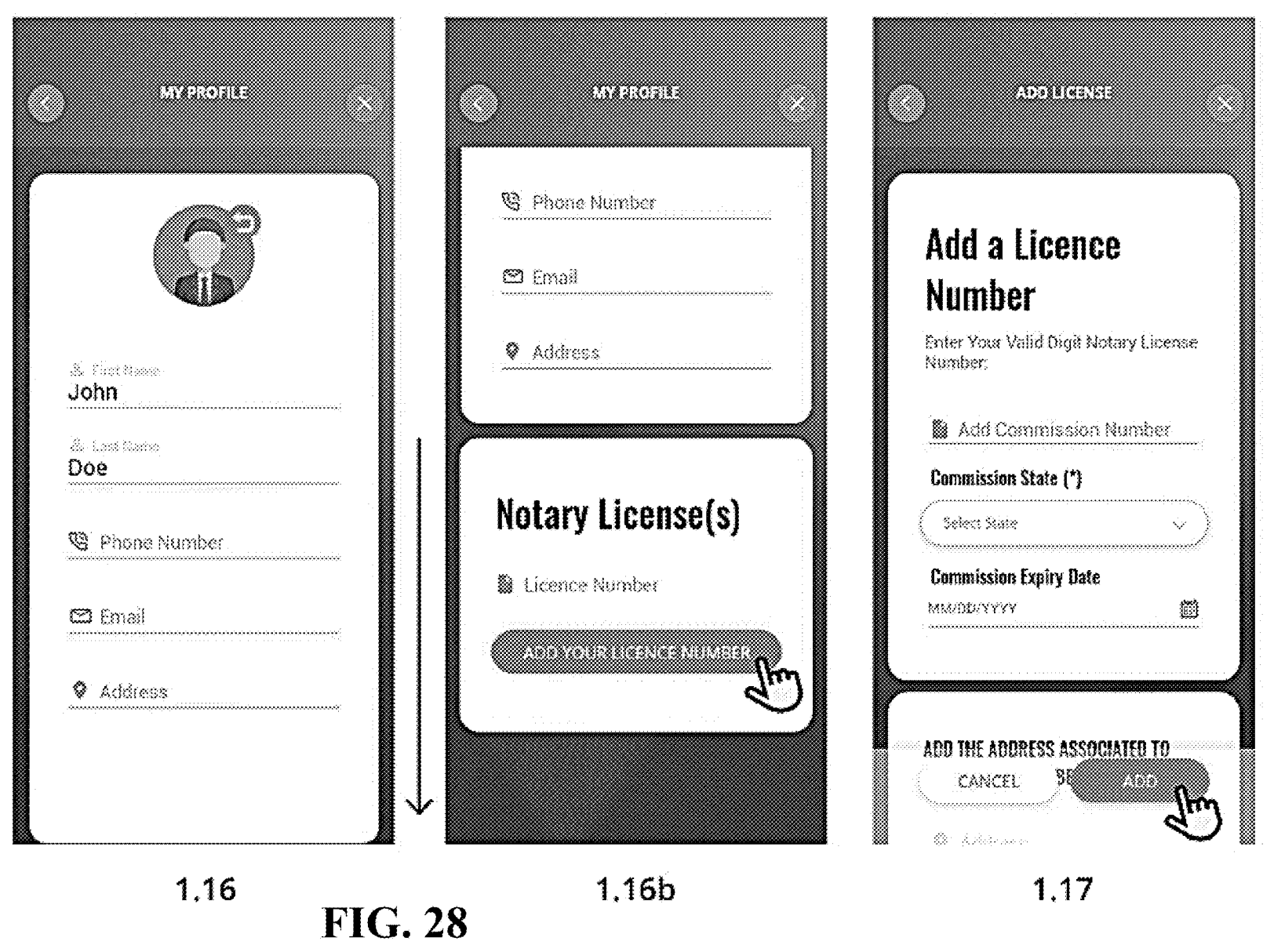
Figure 29:
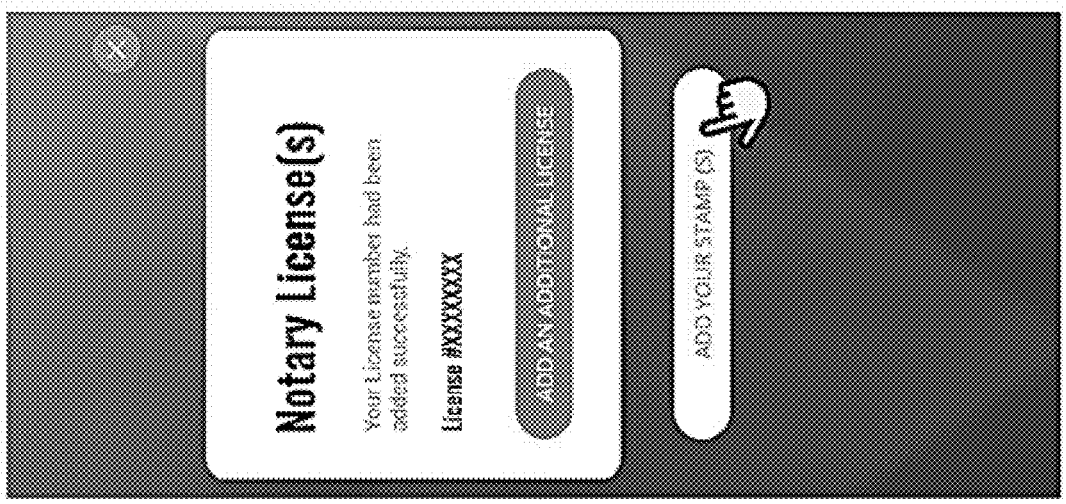
Figure 29:
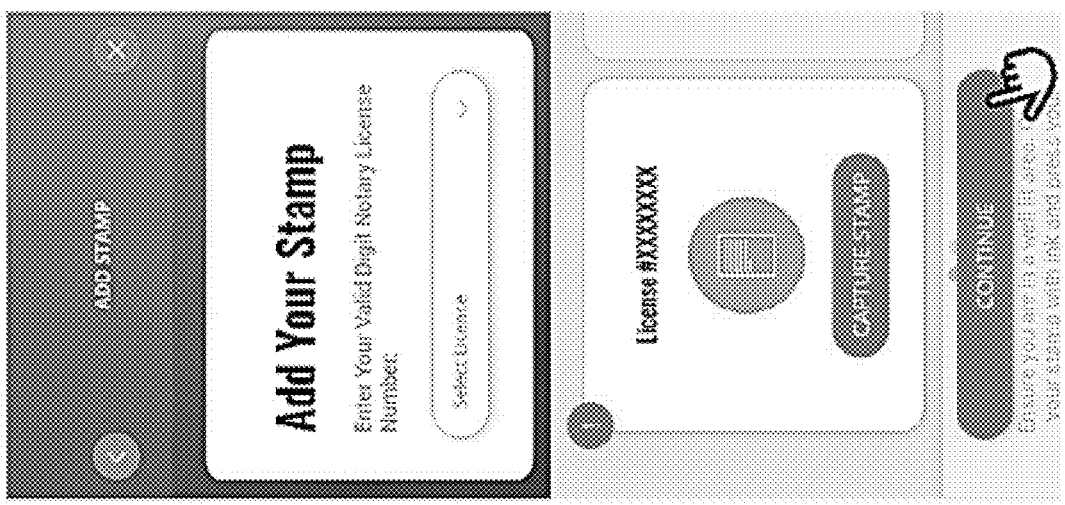
Figure 29:
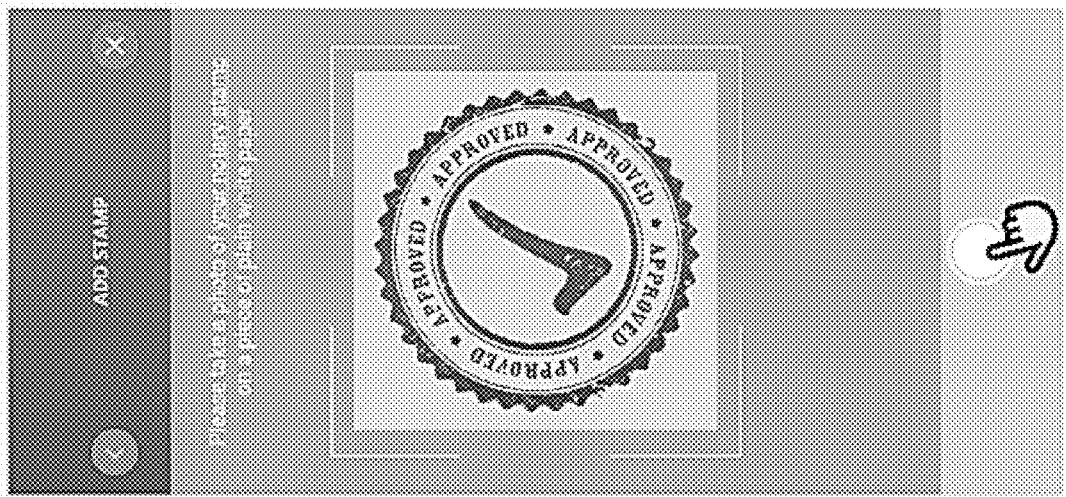
Figure 30:
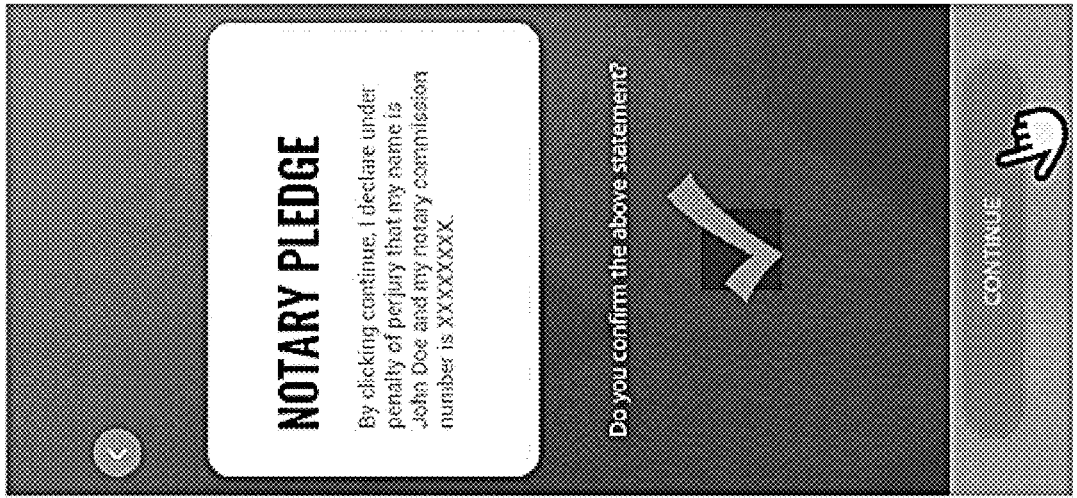
Figure 30:
Figure 30:
Figure 31:
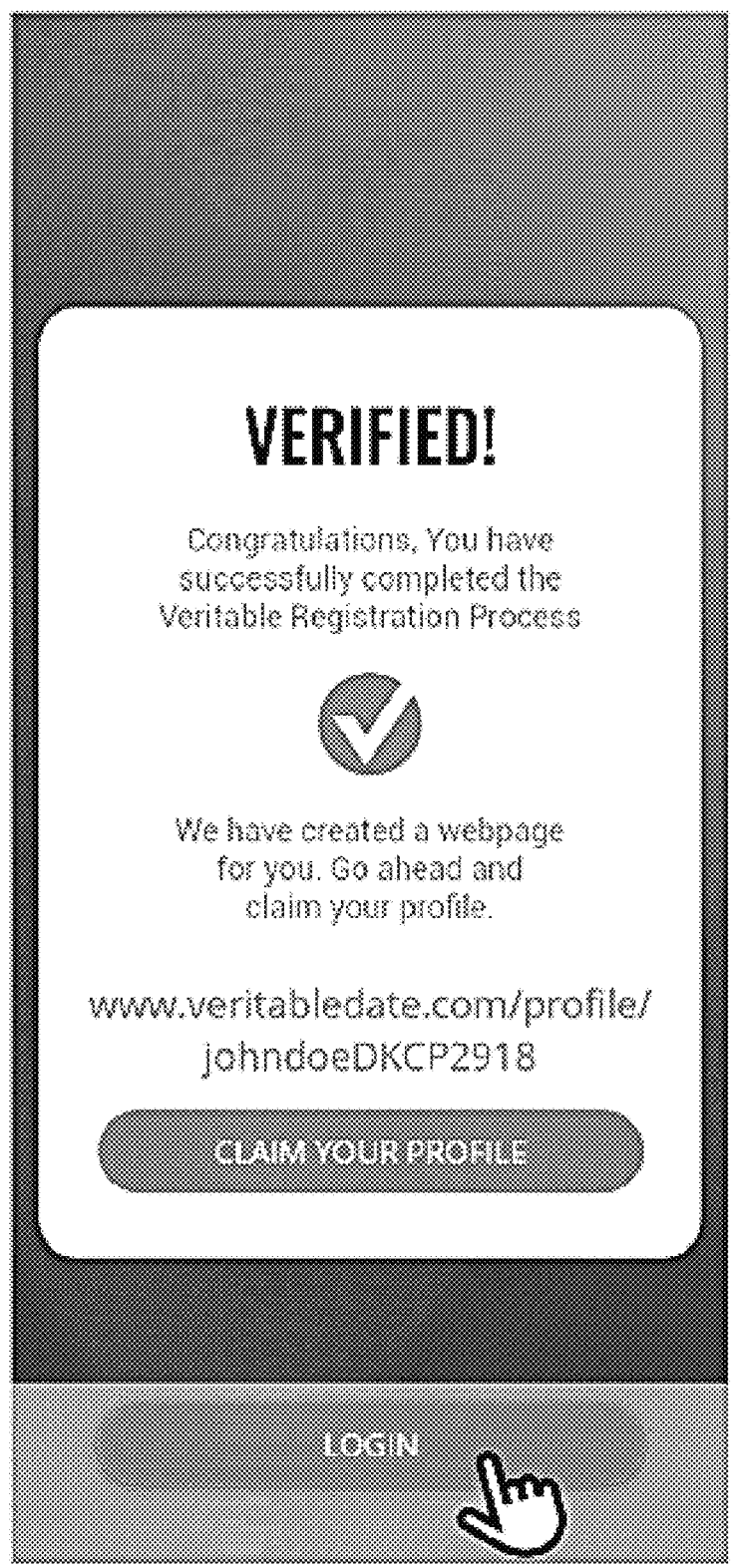

FIG. 23 shows steps for an onboarding process and associated information displayed during the onboarding process that includes entering personal information according to some embodiments. In some embodiments, the onboarding process configured to enable a notary to enter credentials including personal information and identifying documents into the system. FIG. 24 illustrates additional steps for an onboarding process and associated information displayed during the onboarding process according to some embodiments. FIG. 25 shows steps for an onboarding process and associated information displayed during the onboarding process that includes uploading an identification document according to some embodiments. FIG. 26 illustrates steps for an onboarding process and associated information displayed during the onboarding process that includes uploading the back of a driver's license and system verification of document authenticity according to some embodiments. FIG. 27 illustrates steps for an onboarding process and associated information displayed during the onboarding process that includes uploading an image of the user (e.g., notary) according to some embodiments. FIG. 28 depicts steps for an onboarding process and associated information displayed during the onboarding process that includes adding notary license details according to some embodiments. FIG. 29 shows steps for an onboarding process and associated information displayed during the onboarding process that includes adding a notary stamp according to some embodiments. FIG. 30 depicts steps for an onboarding process and associated information displayed during the onboarding process that includes affirming information is correct according to some embodiments. FIG. 31 illustrates steps for an onboarding process and associated information displayed during the onboarding process that includes verification and creation of an account including account details according to some embodiments.

Figure 32:
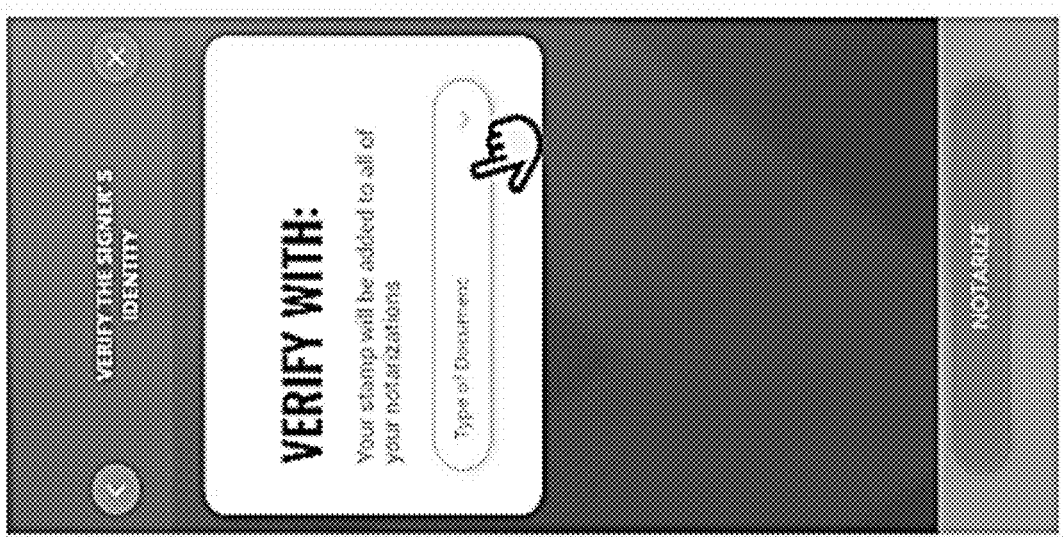
Figure 32:
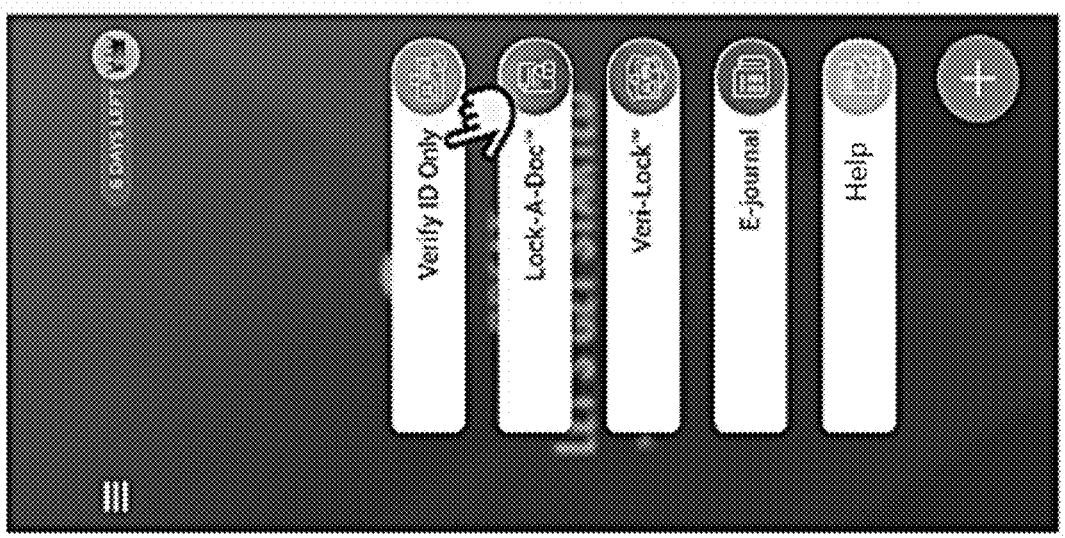
Figure 32:
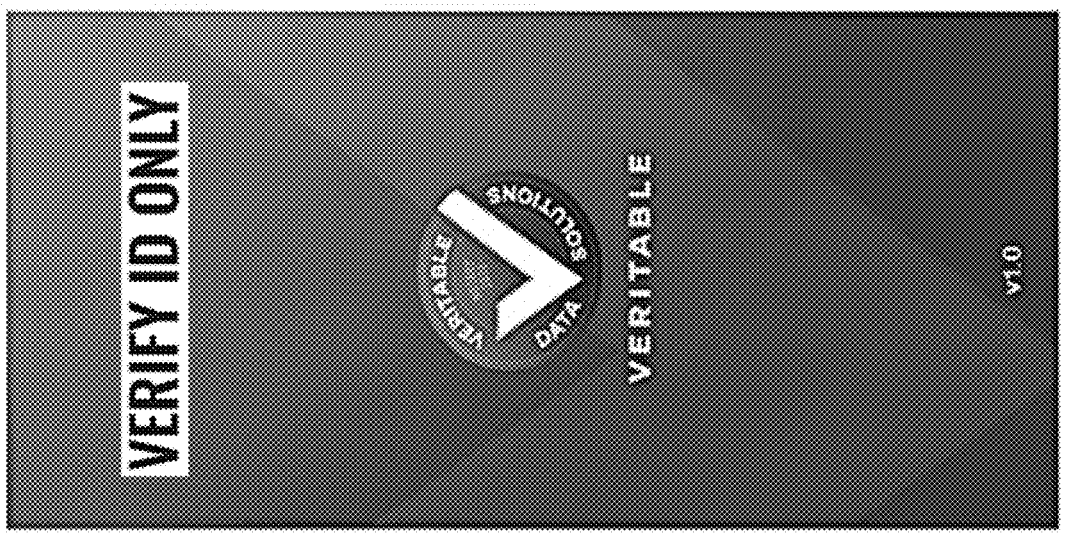
Figure 33:
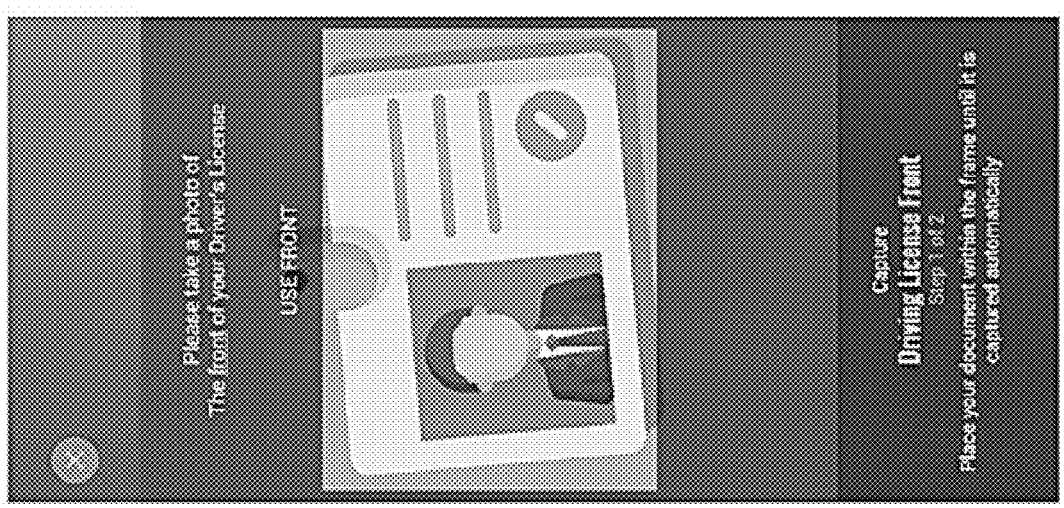
Figure 33:
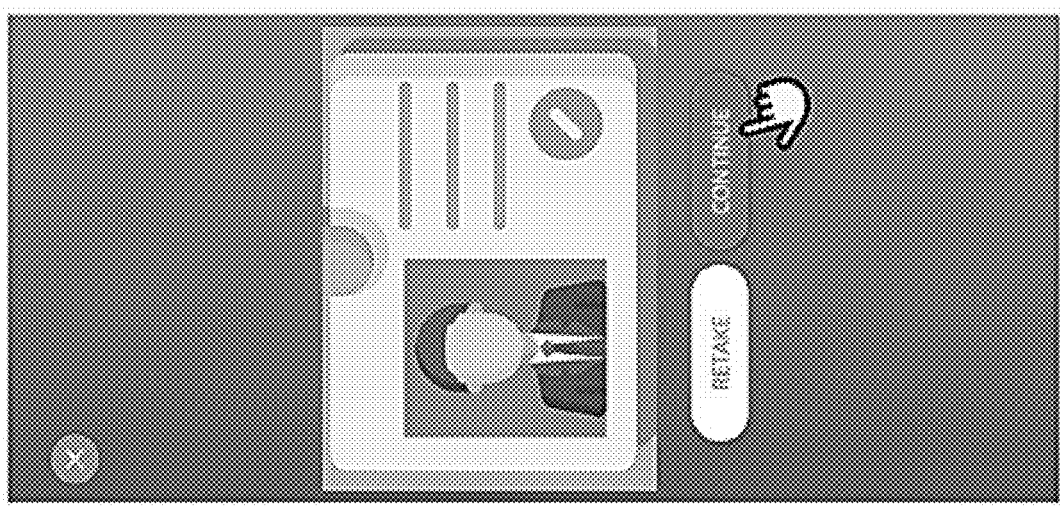
Figure 33:
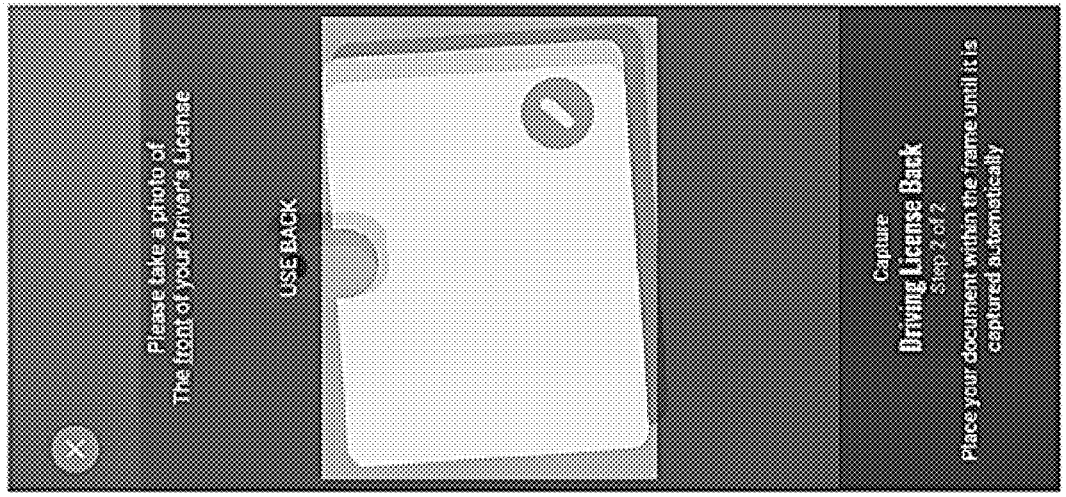
Figure 34:
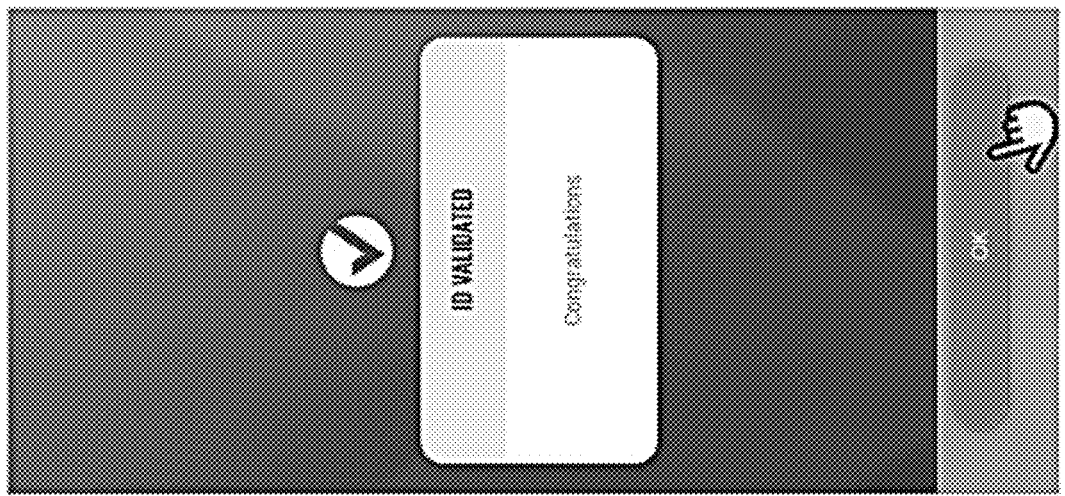
Figure 34:
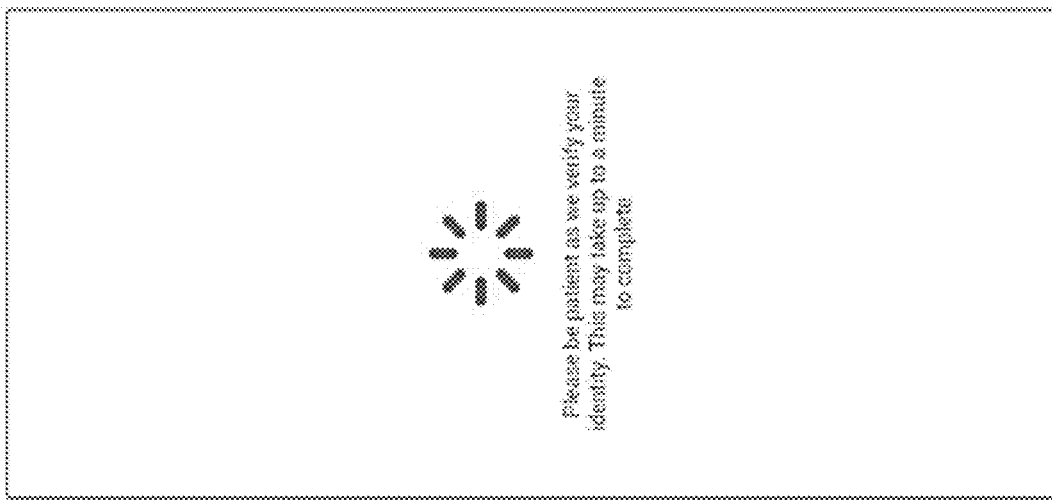
Figure 34:
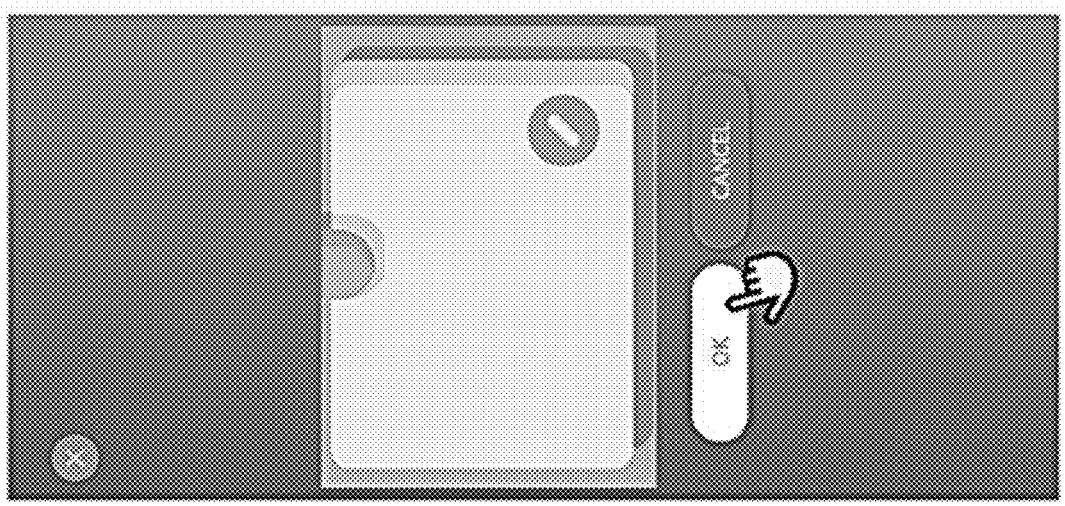
Figure 35:
Figure 35:
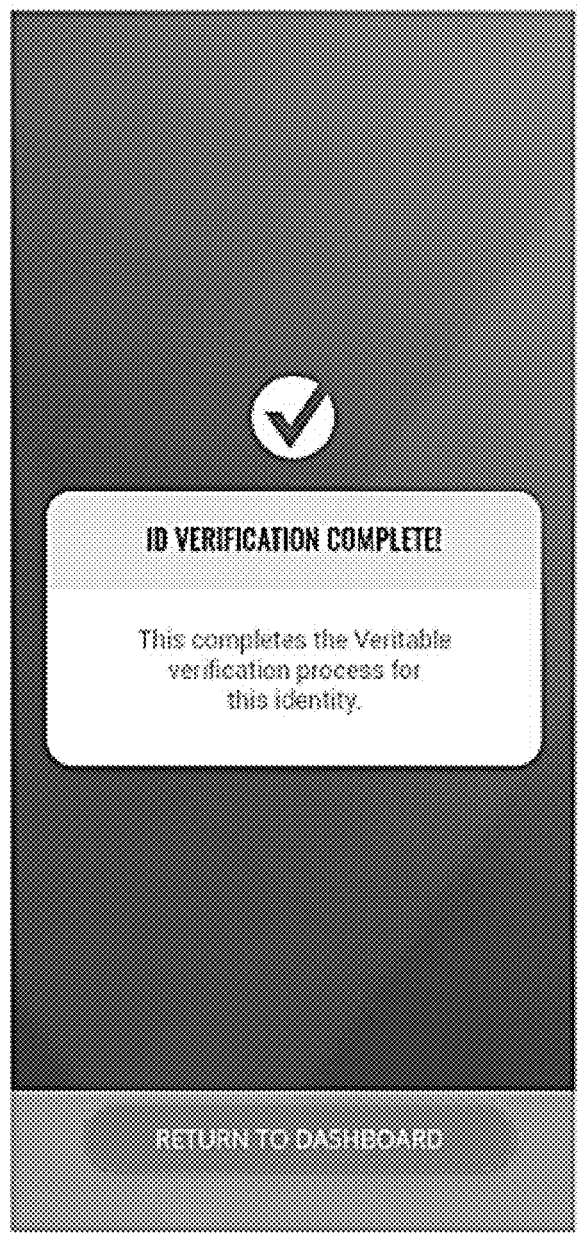

FIG. 32 shows steps for the identification verification platform (verify ID only platform) and associated information displayed during system execution that includes that includes selecting a type of document for verification according to some embodiments. FIG. 33 depicts steps for the identification verification platform and associated information displayed during system execution that includes uploading a user's identification document according to some embodiments. FIG. 34 illustrates steps for the identification verification platform and associated information displayed during system execution that includes the system verifying the authenticity of the identification document according to some embodiments. FIG. 35 depicts steps for the identification verification platform and associated information displayed during system execution that includes a display configured to enable a user to input identification information manually according to some embodiments.

Figure 36:
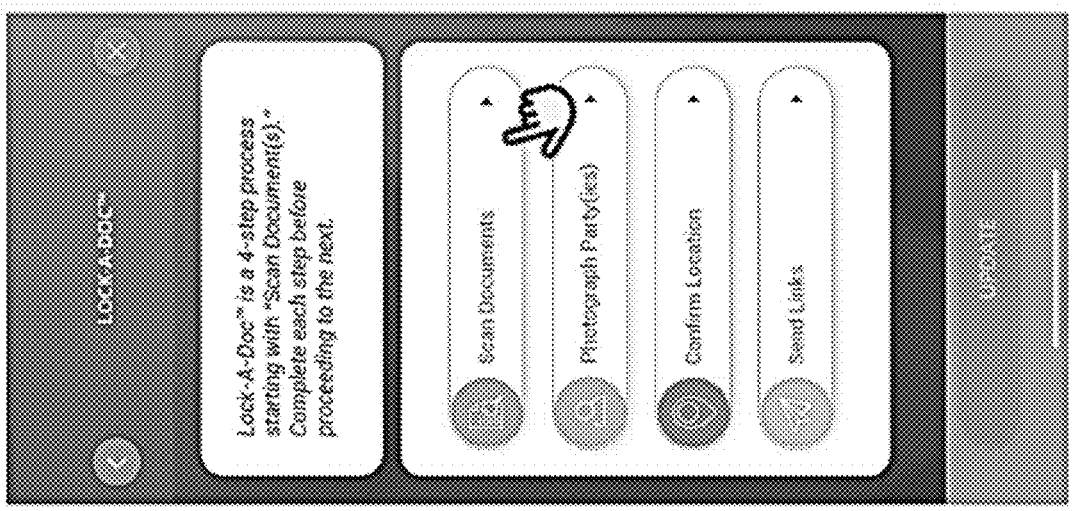
Figure 36:
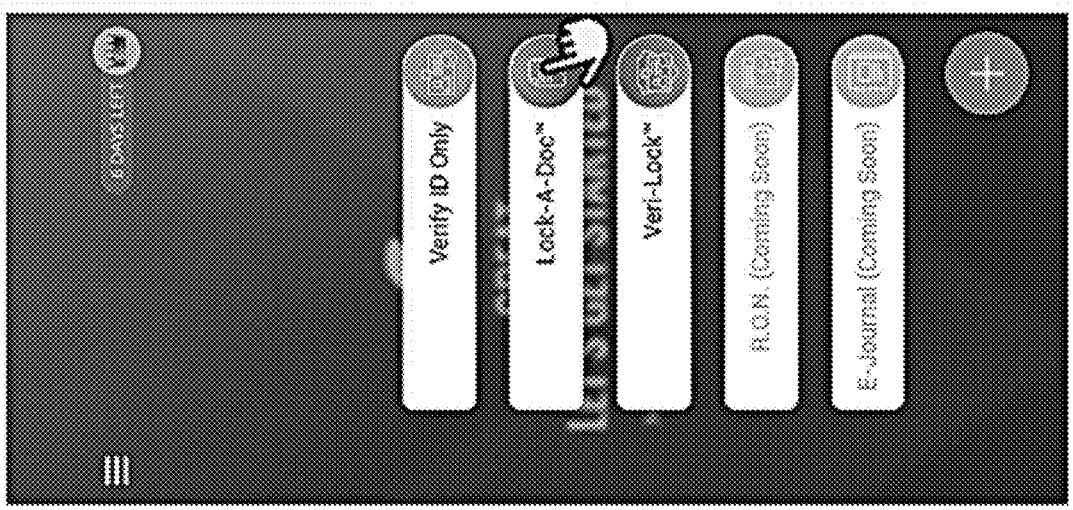
Figure 36:
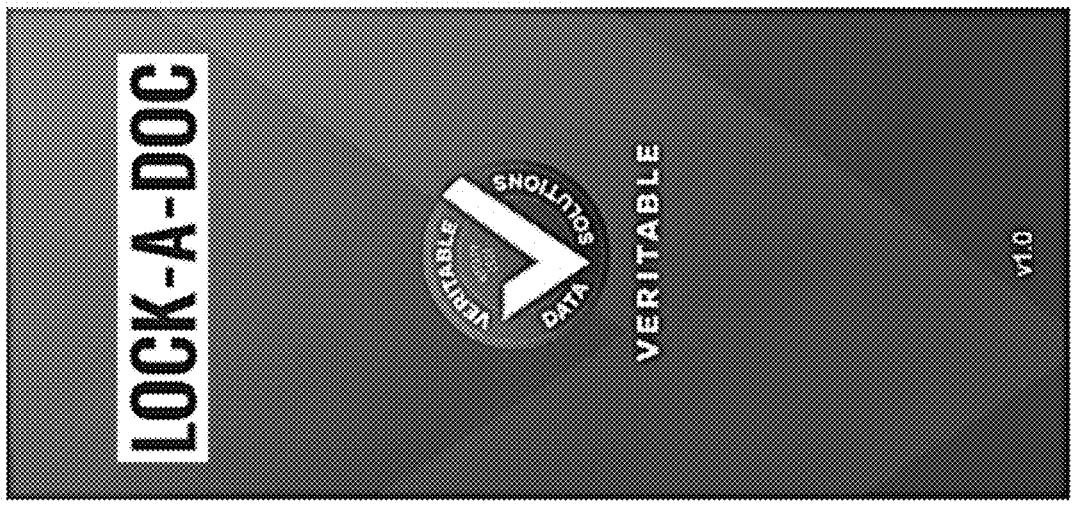
Figure 37:
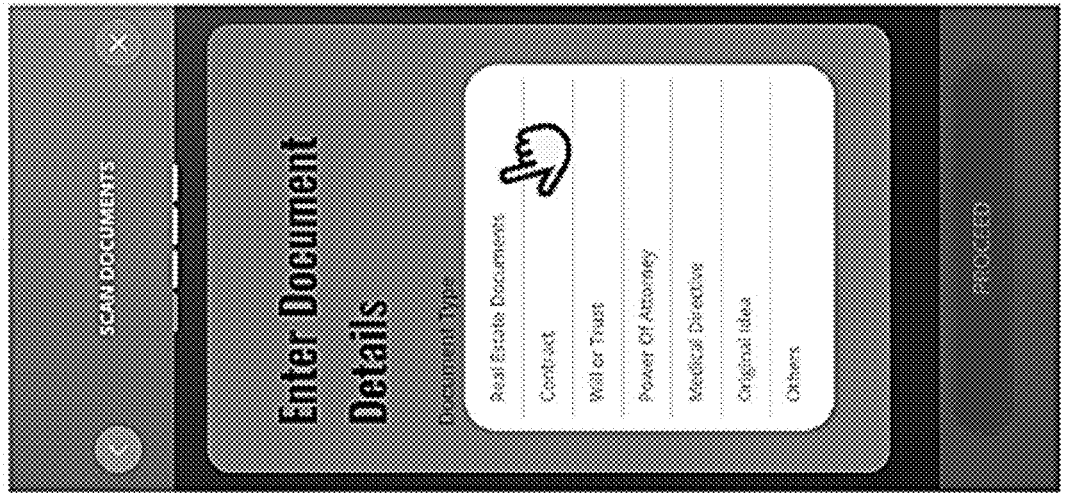
Figure 37:
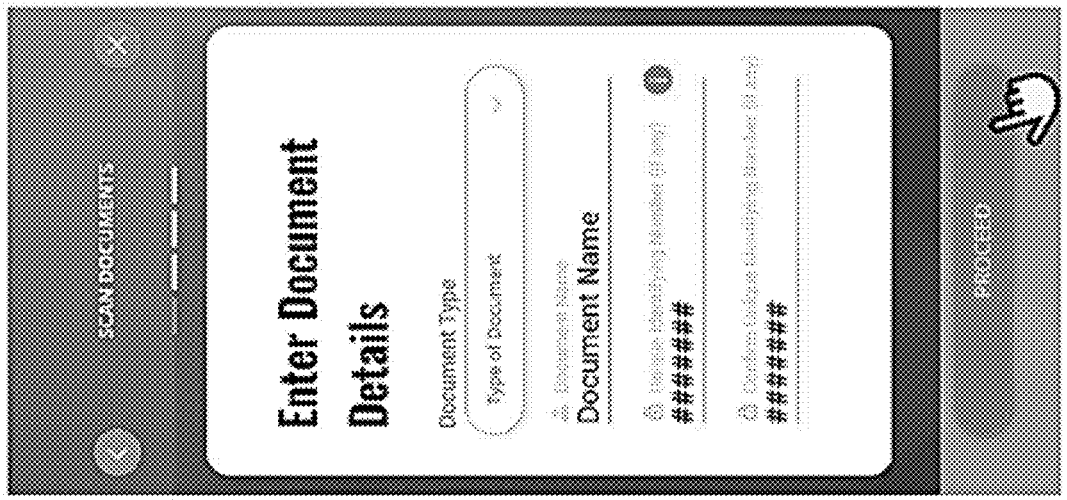
Figure 37:
Figure 38:
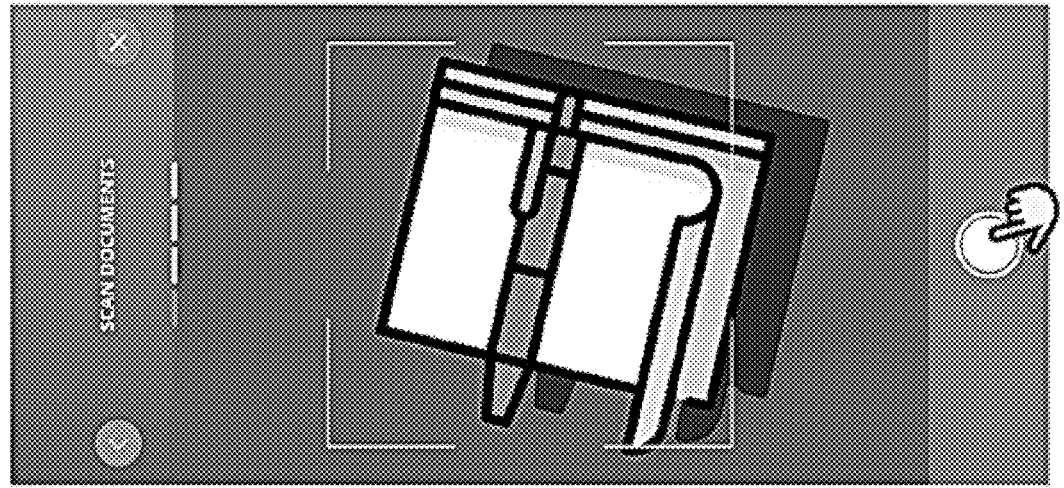
Figure 38:
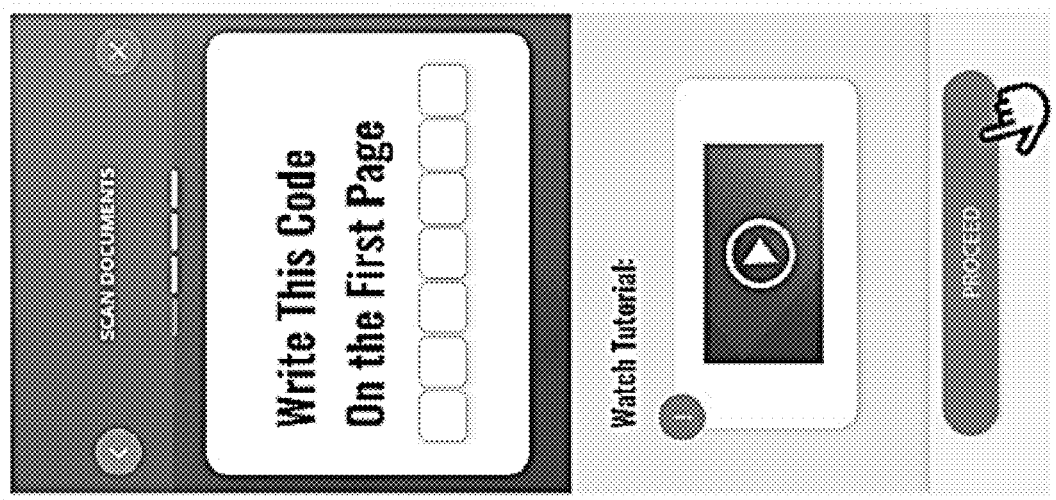
Figure 38:
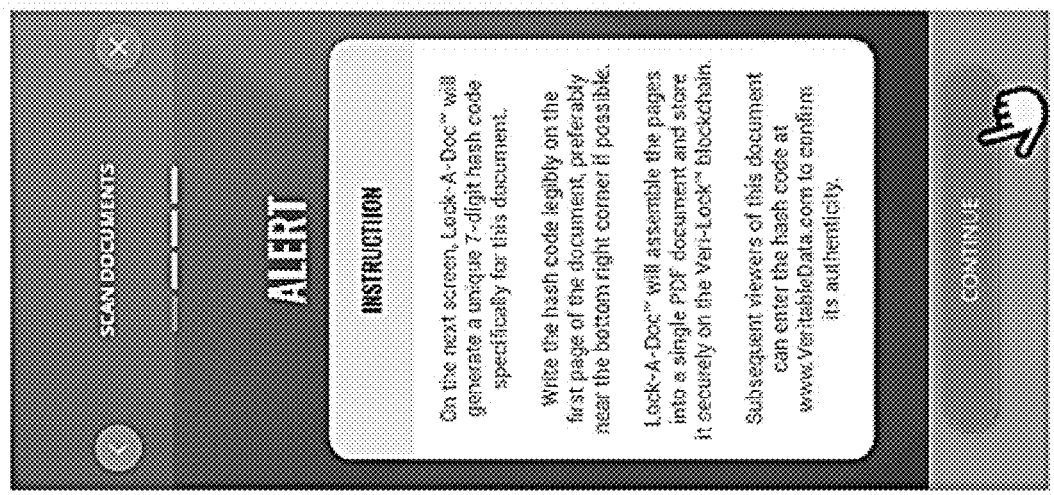
Figure 39:
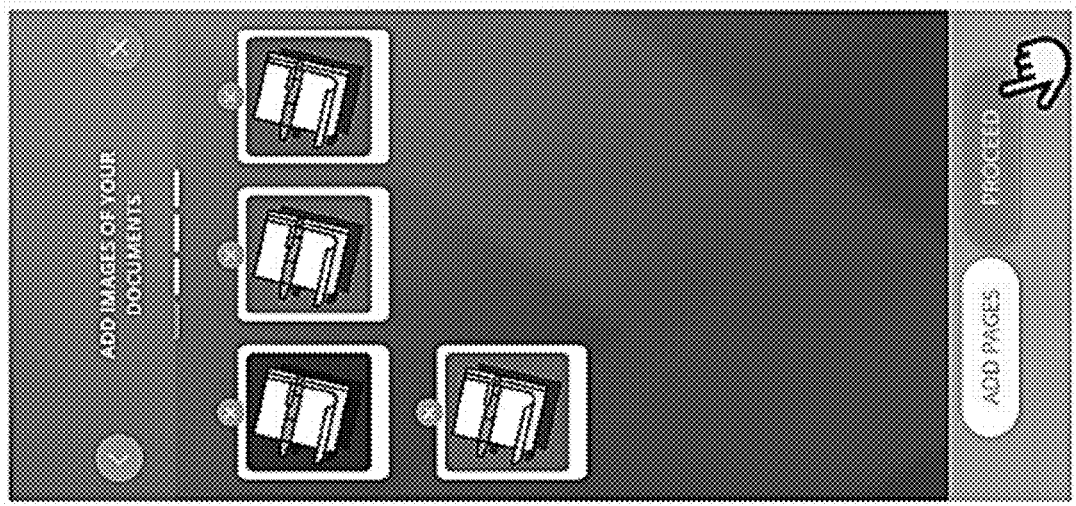
Figure 39:
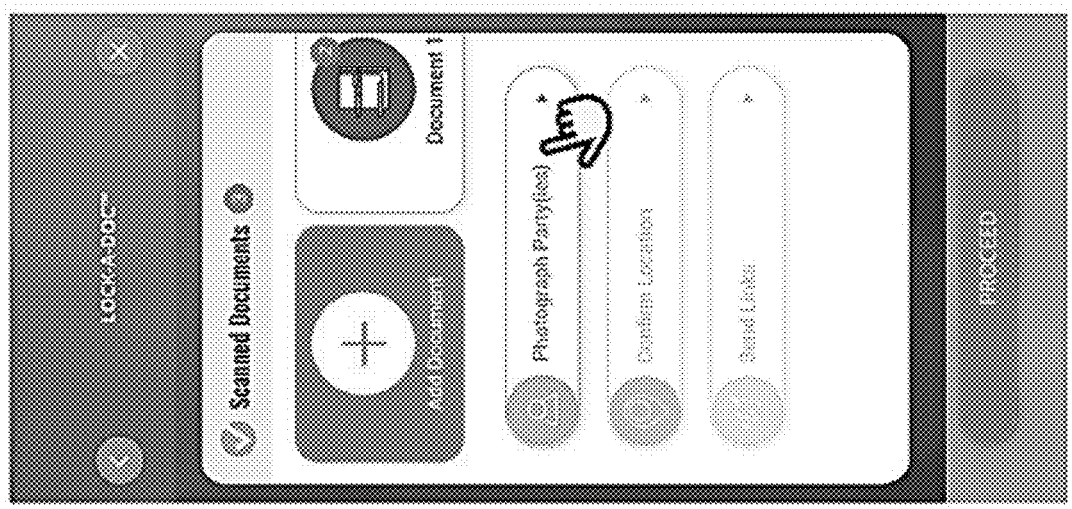
Figure 39:
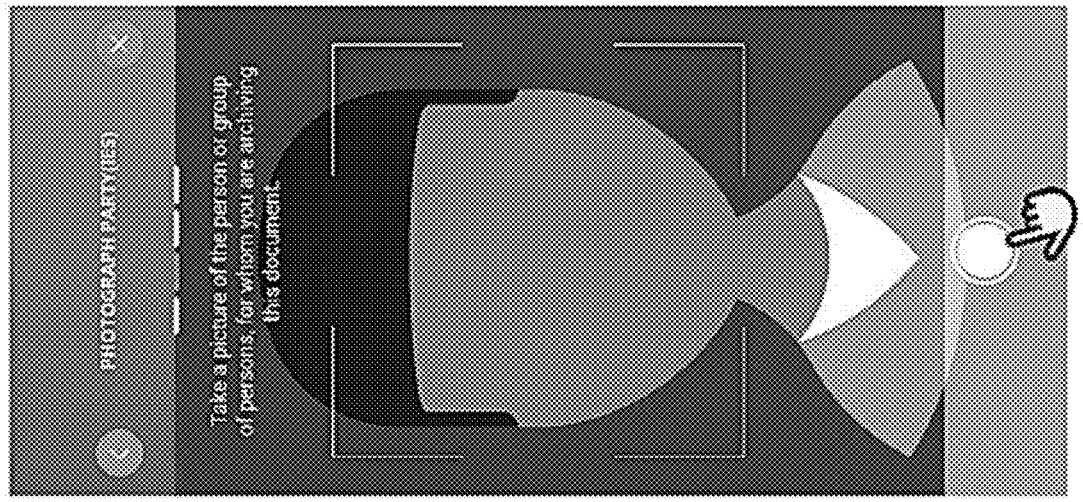
Figure 40:
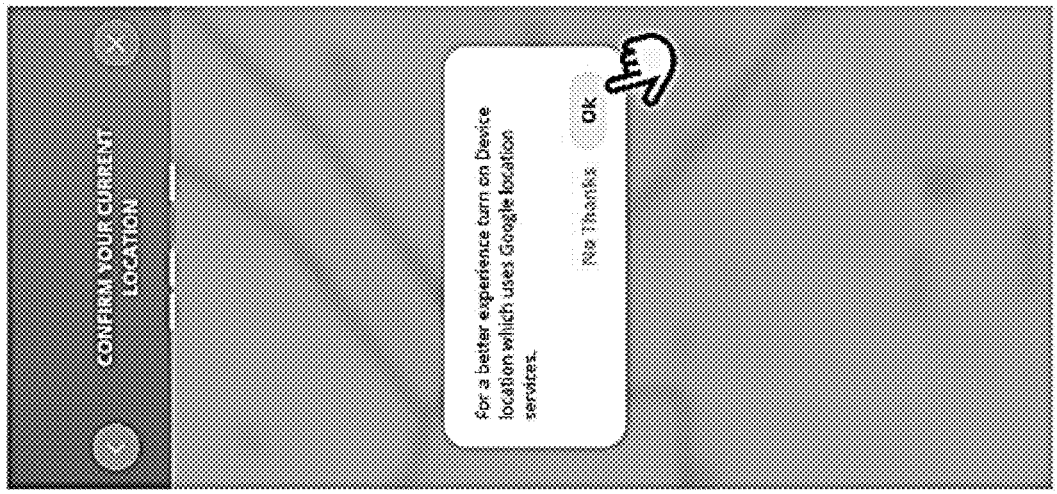
Figure 40:
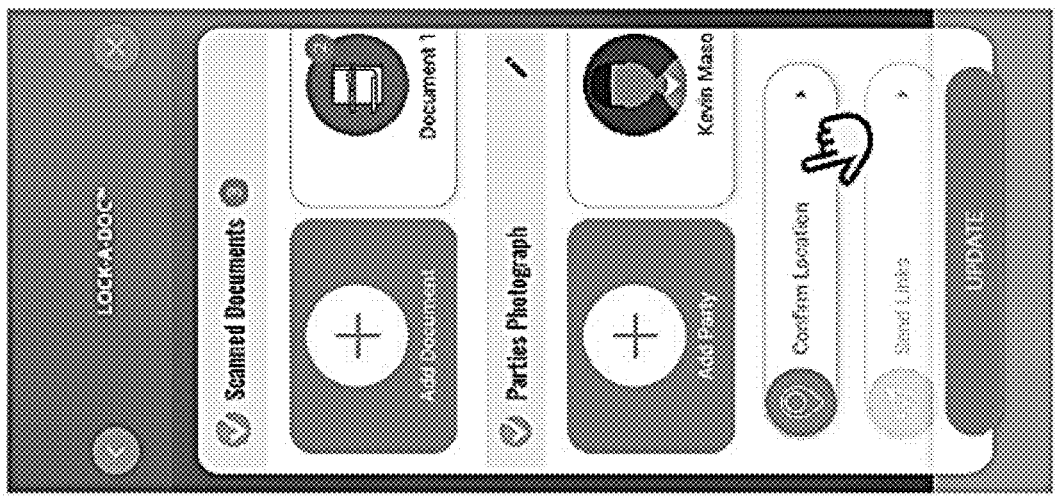
Figure 40:
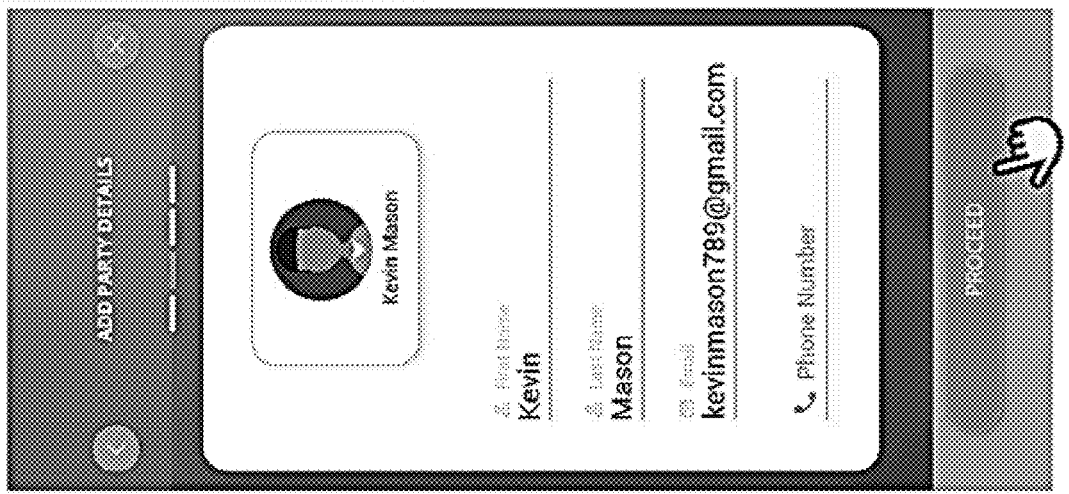
Figure 41:
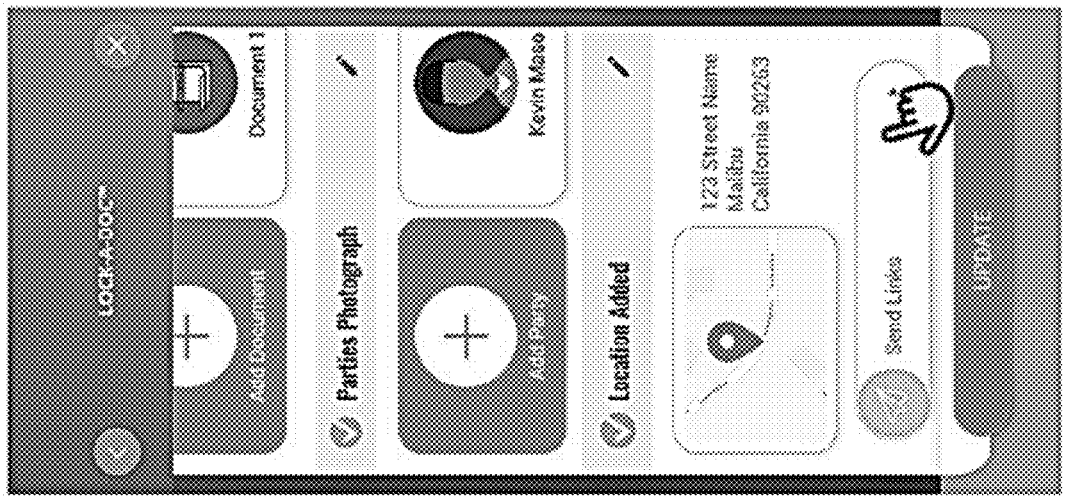
Figure 41:
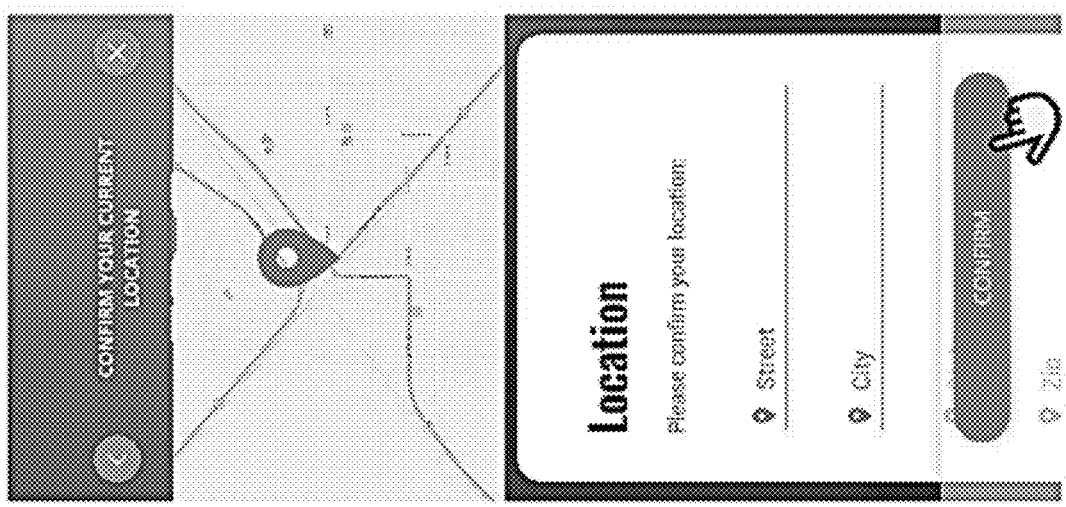
Figure 41:
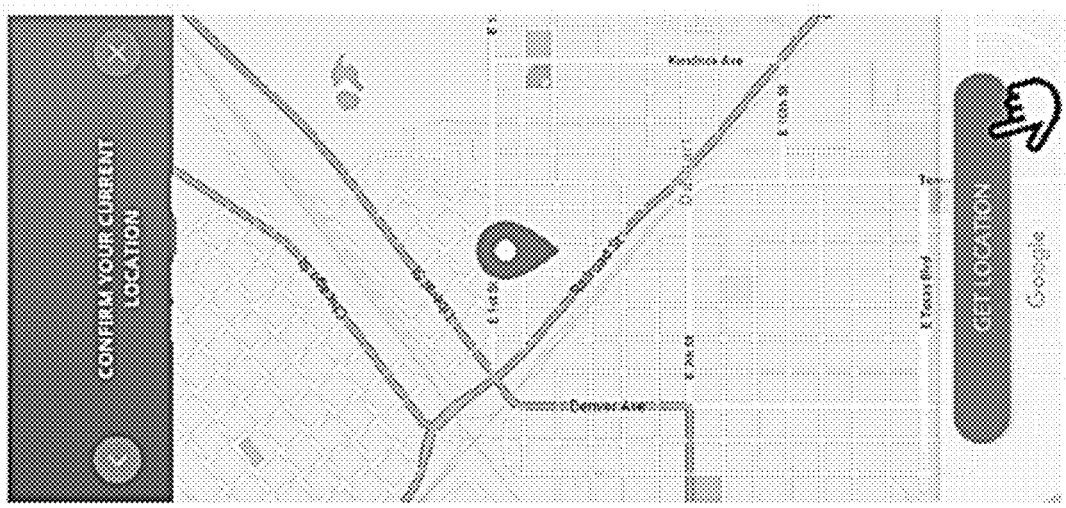
Figure 42:
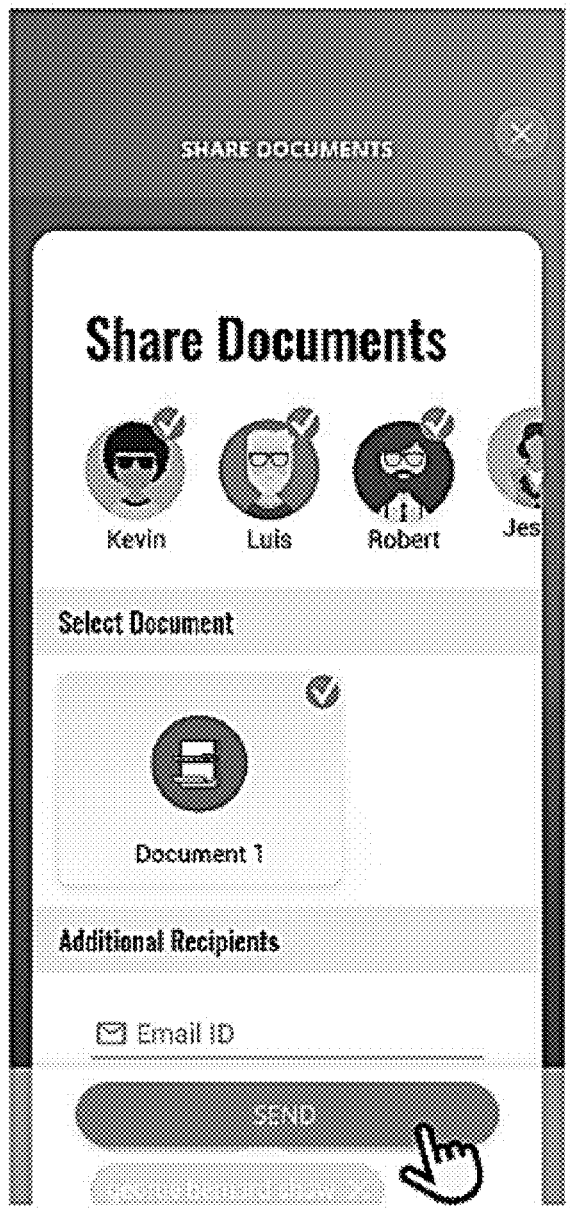
Figure 42:
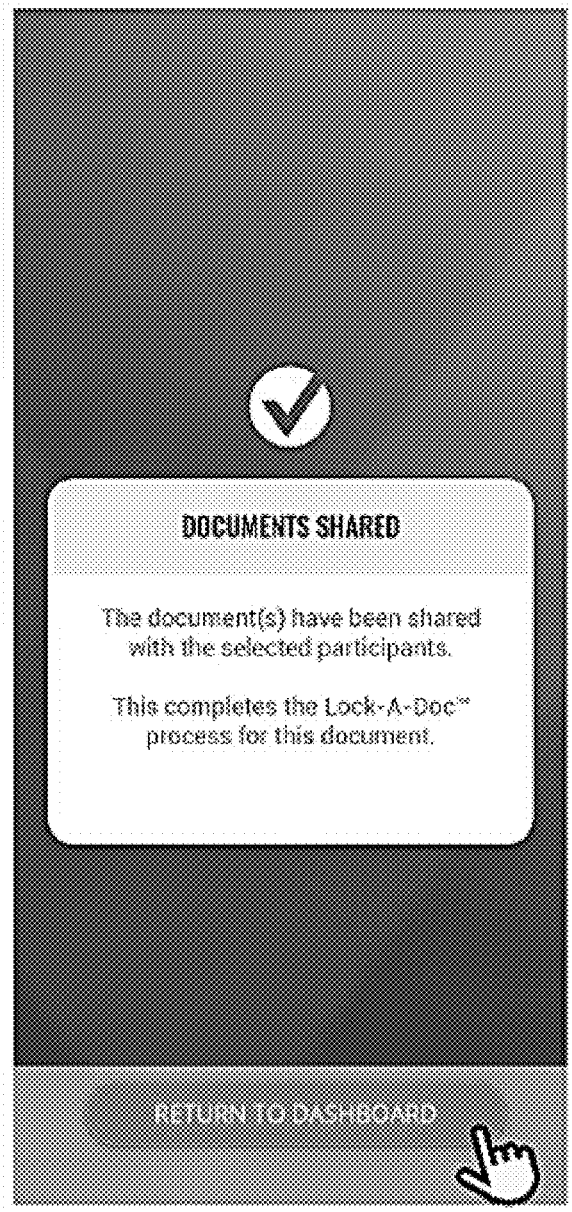

FIG. 36 shows steps for the document verification platform (lock-a-doc platform) and associated information displayed during system execution that includes links to system programs according to some embodiments. FIG. 37 illustrates steps for the document verification platform and associated information displayed during system execution that includes document detail entry according to some embodiments. FIG. 38 illustrates steps for the document verification platform and associated information displayed during system execution that includes unique hash code generation according to some embodiments. FIG. 39 shows steps for the document verification platform and associated information displayed during system execution that includes uploading photographs of parties involved according to some embodiments. FIG. 40 depicts steps for the document verification platform and associated information displayed during system execution that includes confirming location and capturing location metadata according to some embodiments. FIG. 41 shows steps for the document verification platform and associated information displayed during system execution that includes displaying a map and address of the user's current location according to some embodiments. FIG. 42 illustrates steps for the combination identification verification and document verification platform (veri-lock platform) and associated information displayed during system execution that includes sharing the document according to some embodiments.

Figure 43:
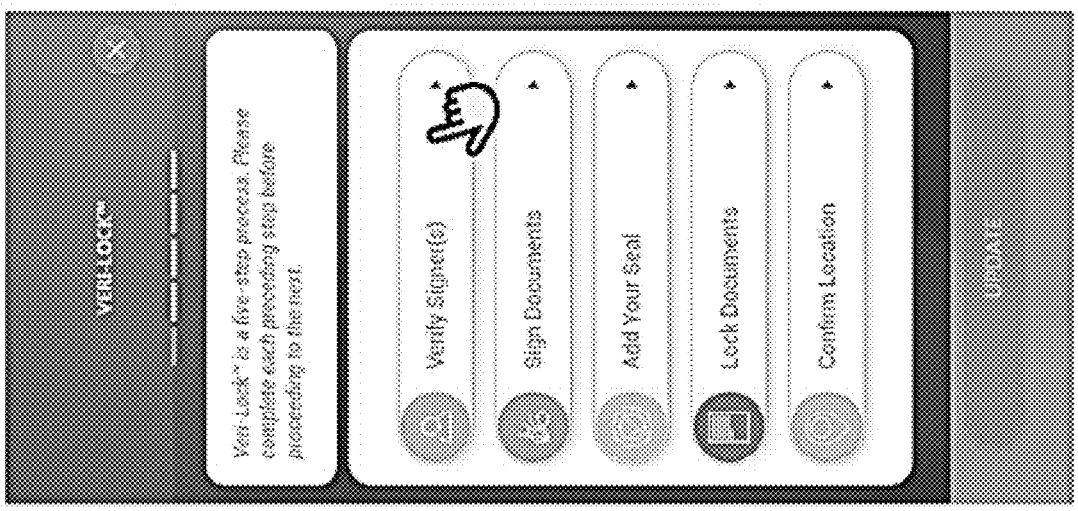
Figure 43:
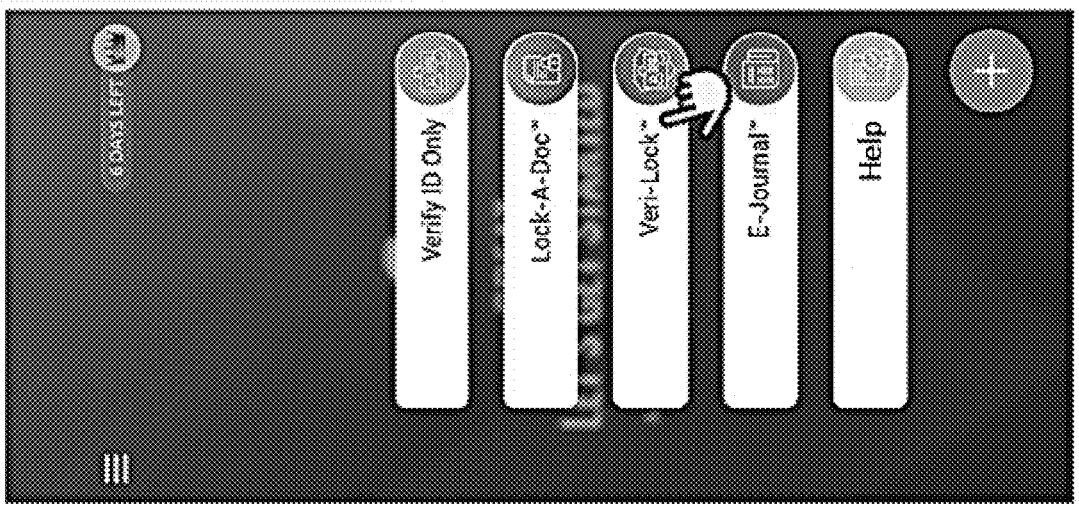
Figure 43:
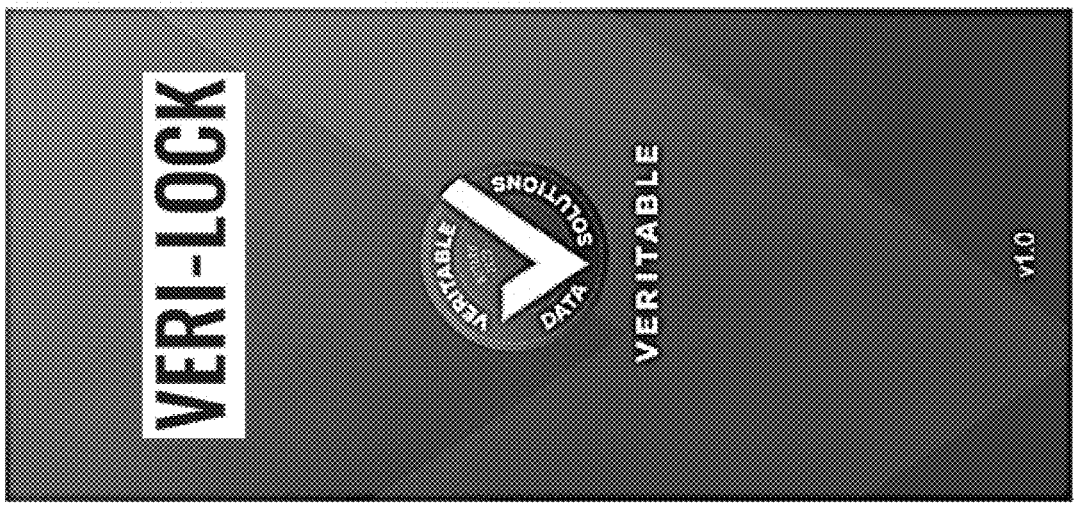
Figure 44:
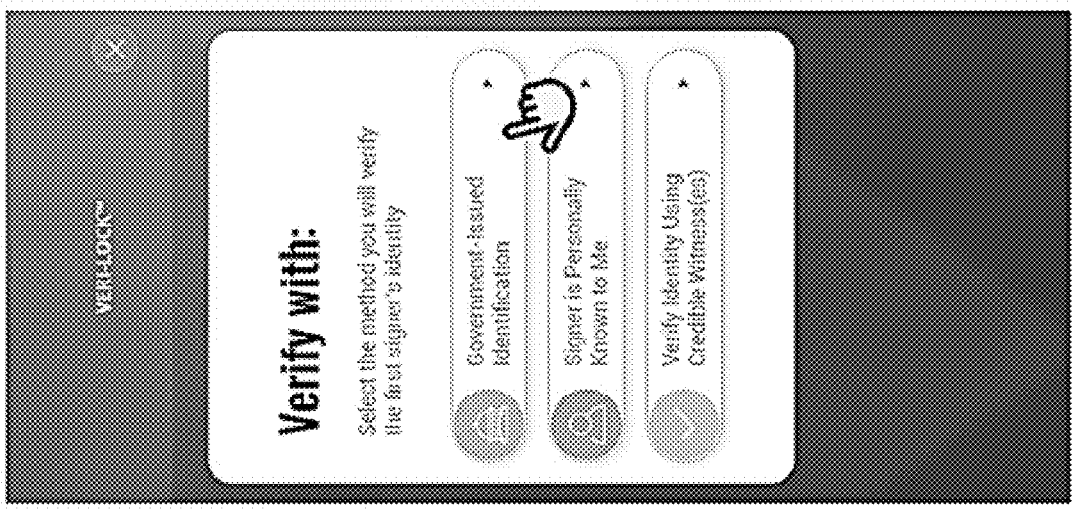
Figure 44:
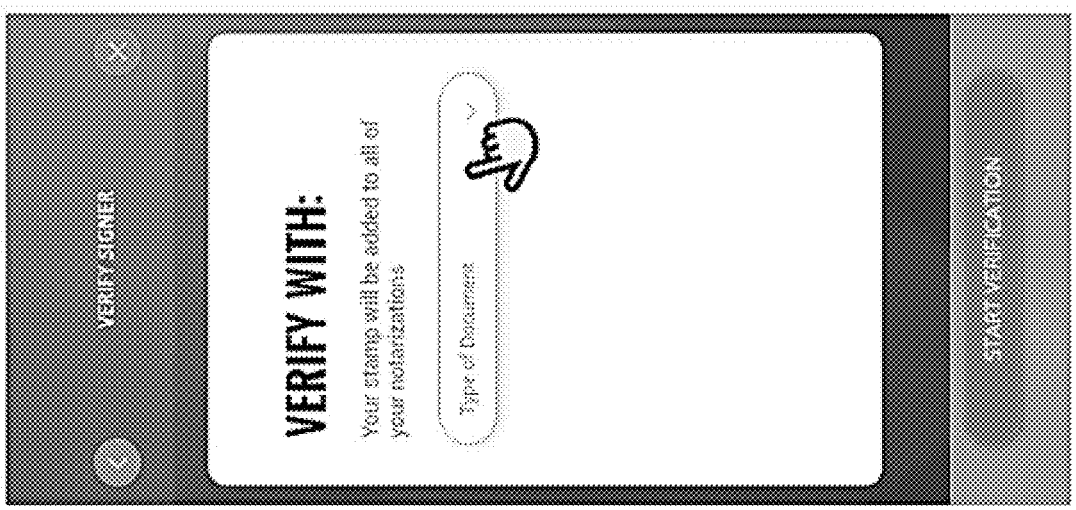
Figure 44:
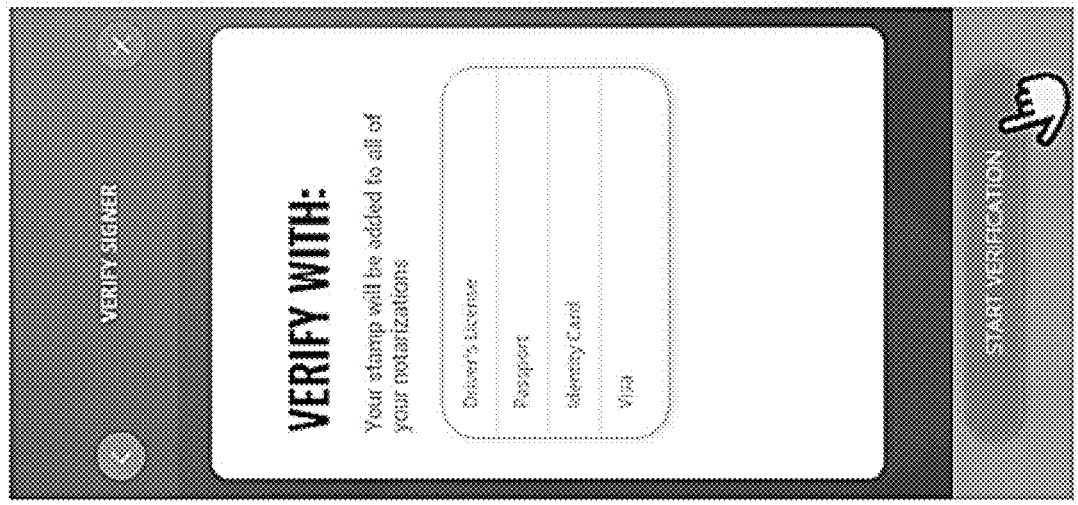
Figure 45:
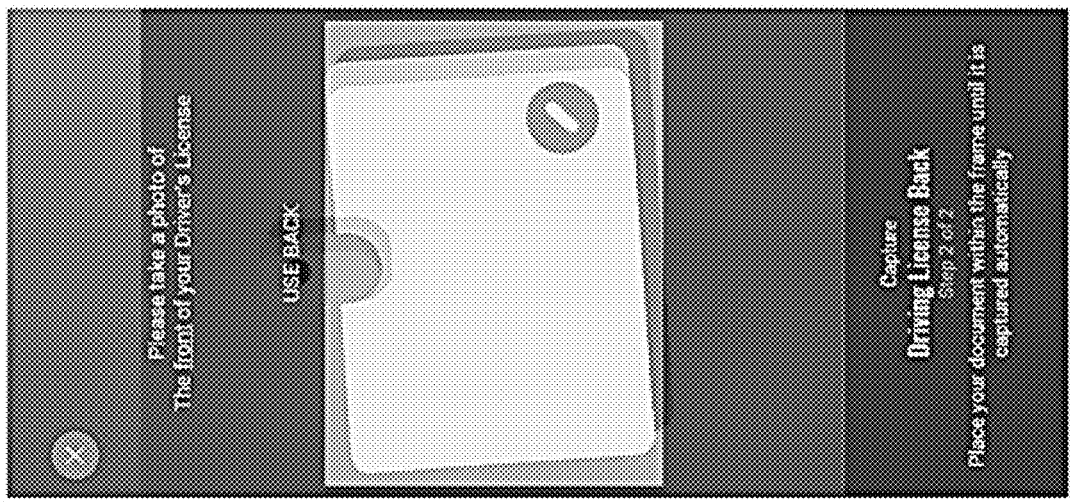
Figure 45:
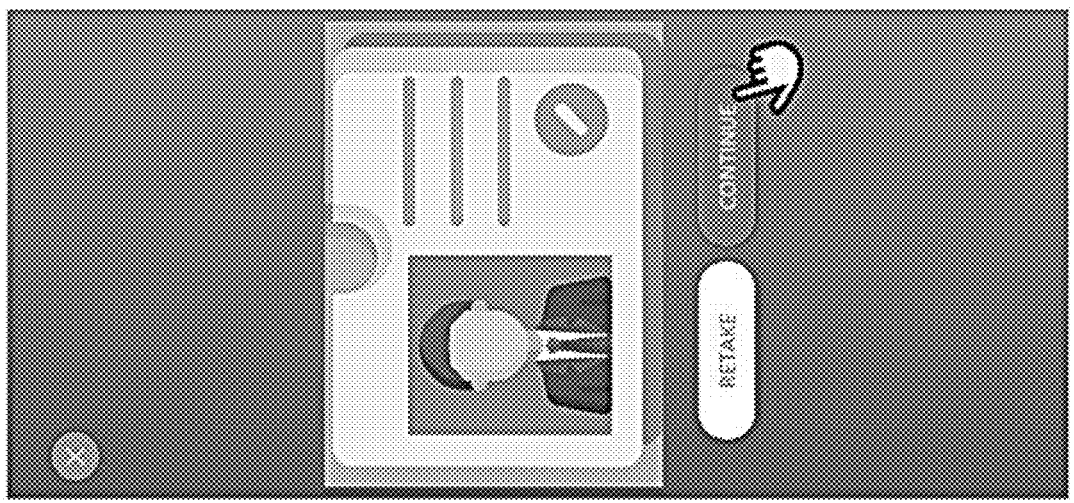
Figure 45:
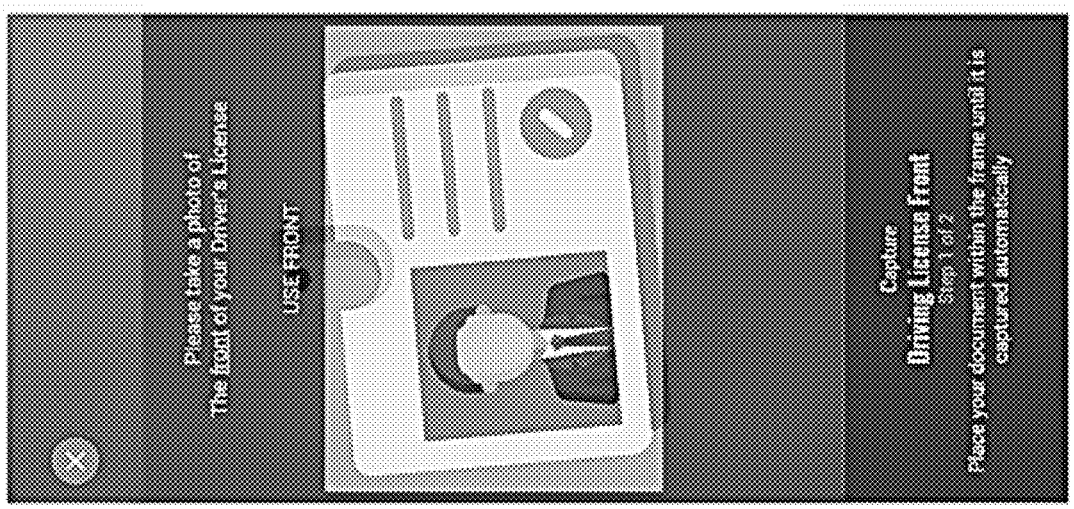
Figure 46:
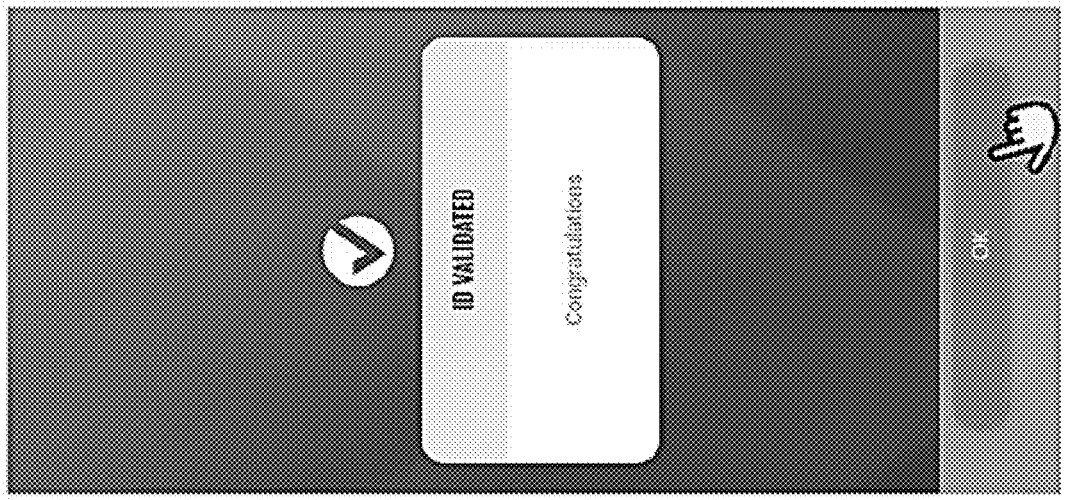
Figure 46:
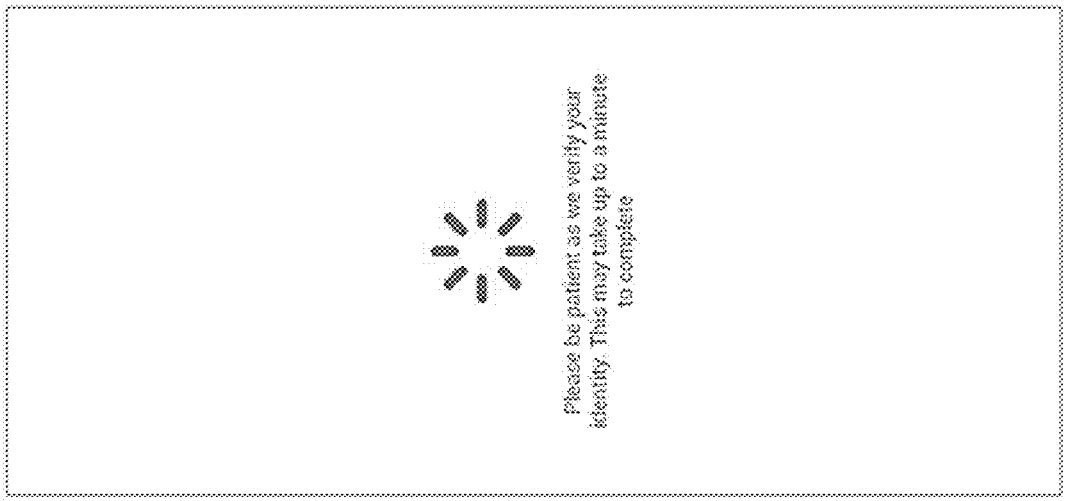
Figure 46:
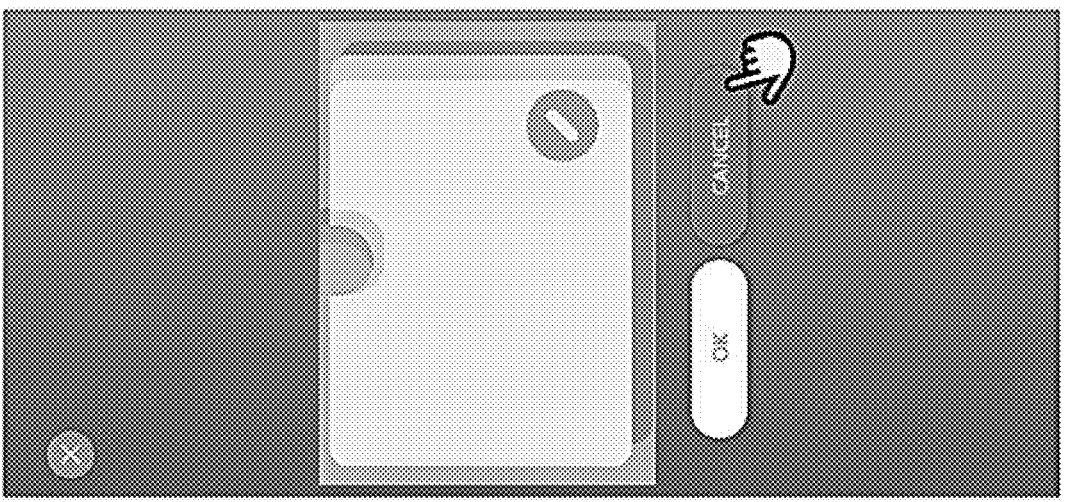
Figure 47:
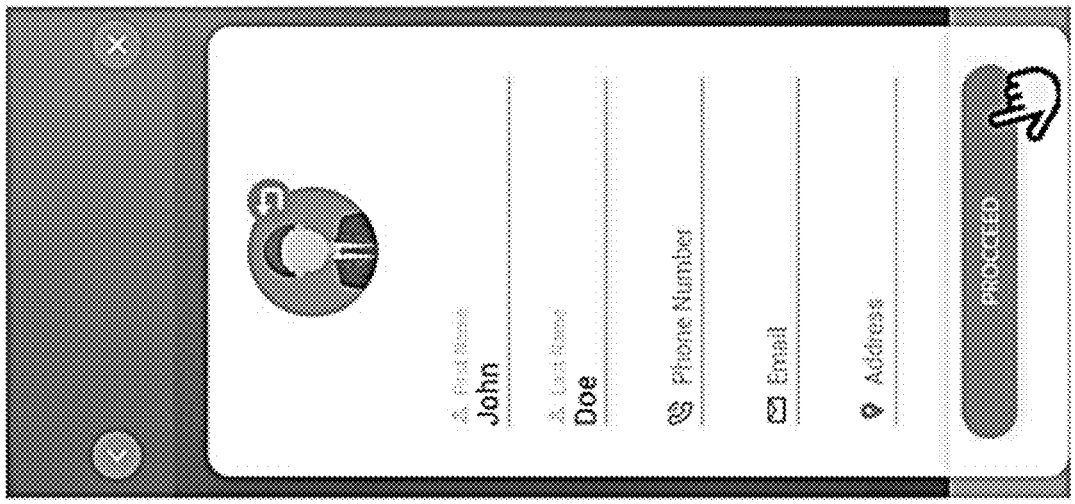
Figure 47:
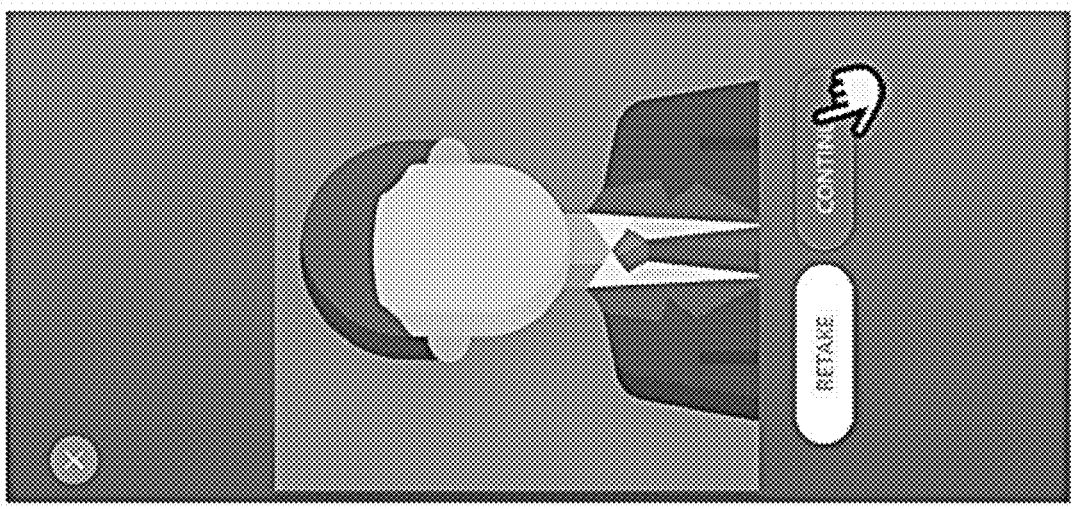
Figure 47:
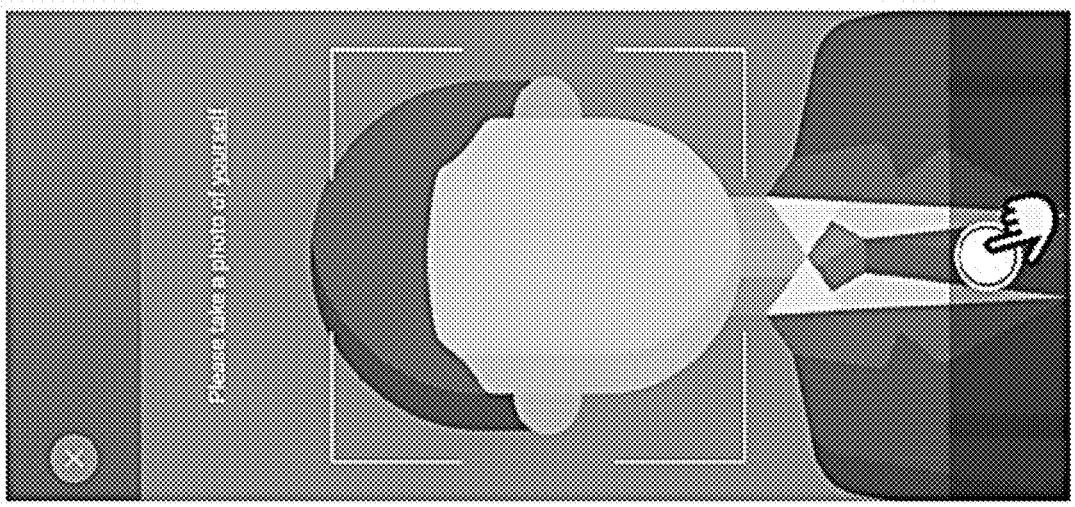
Figure 48:
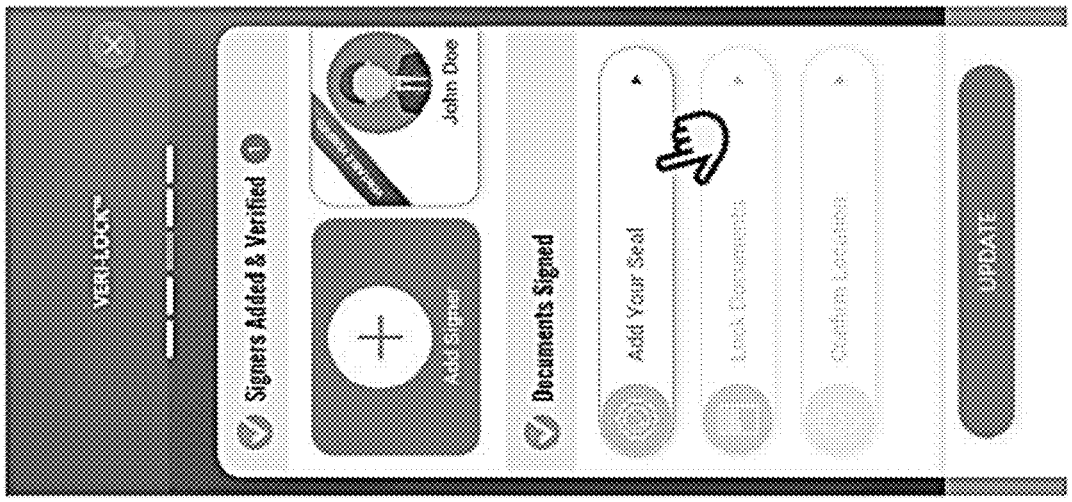
Figure 48:
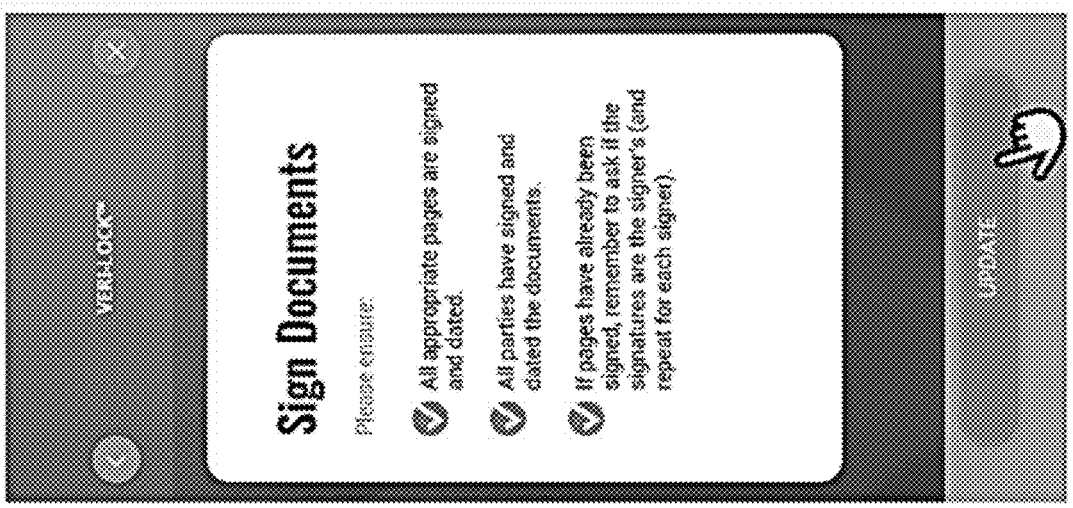
Figure 48:
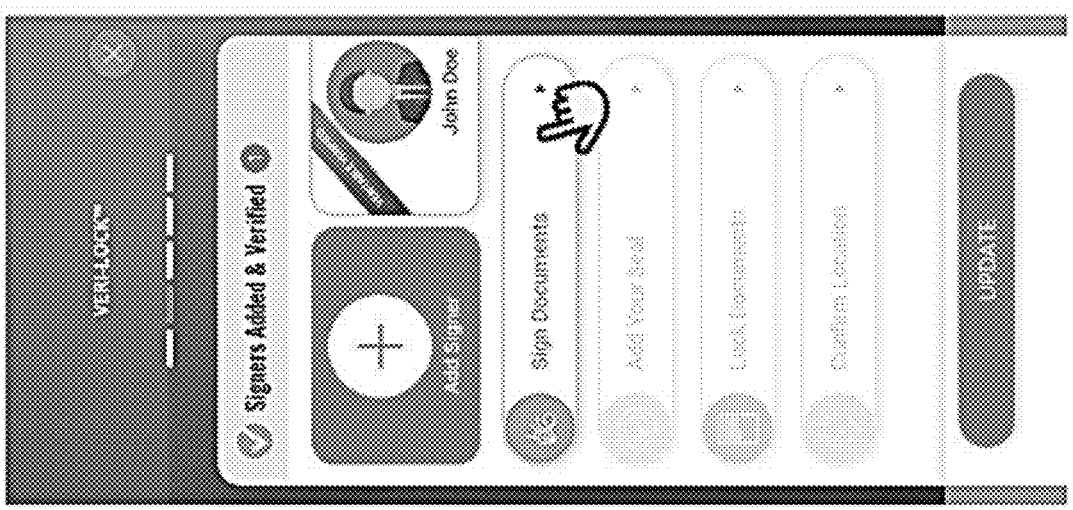
Figure 49:
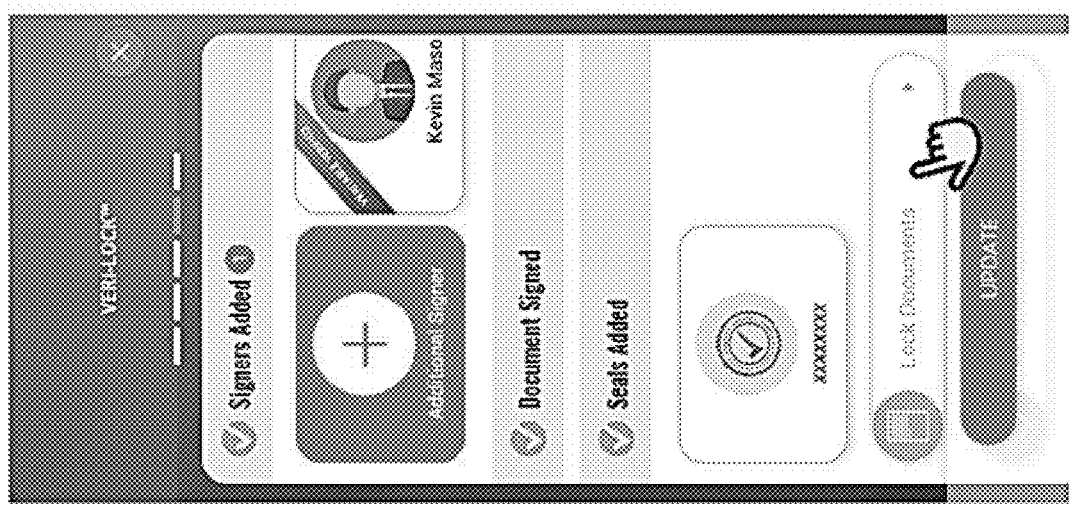
Figure 49:
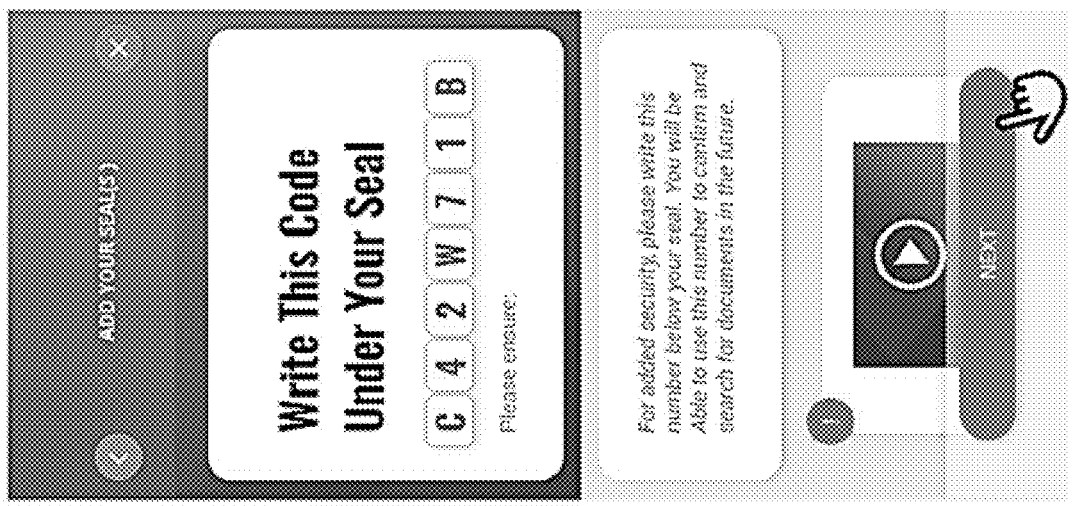
Figure 49:
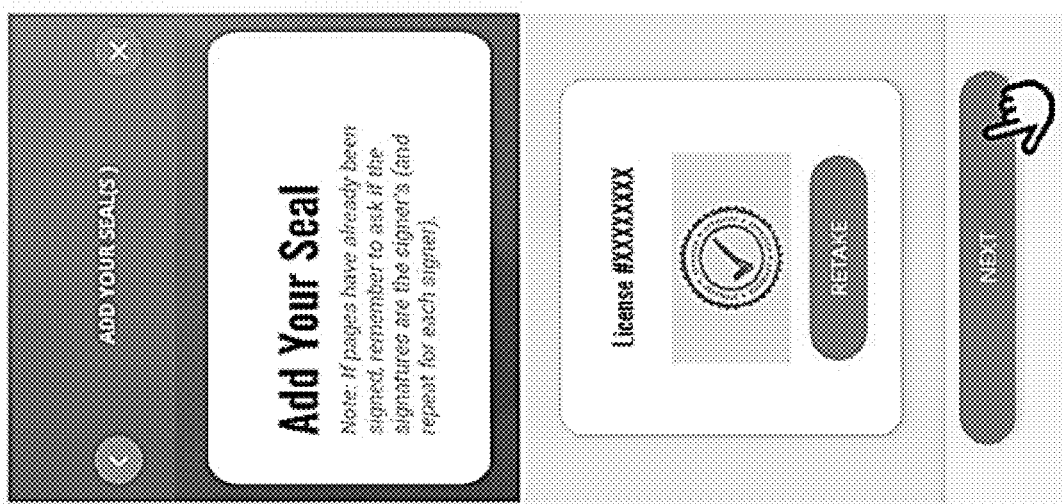
Figure 50:
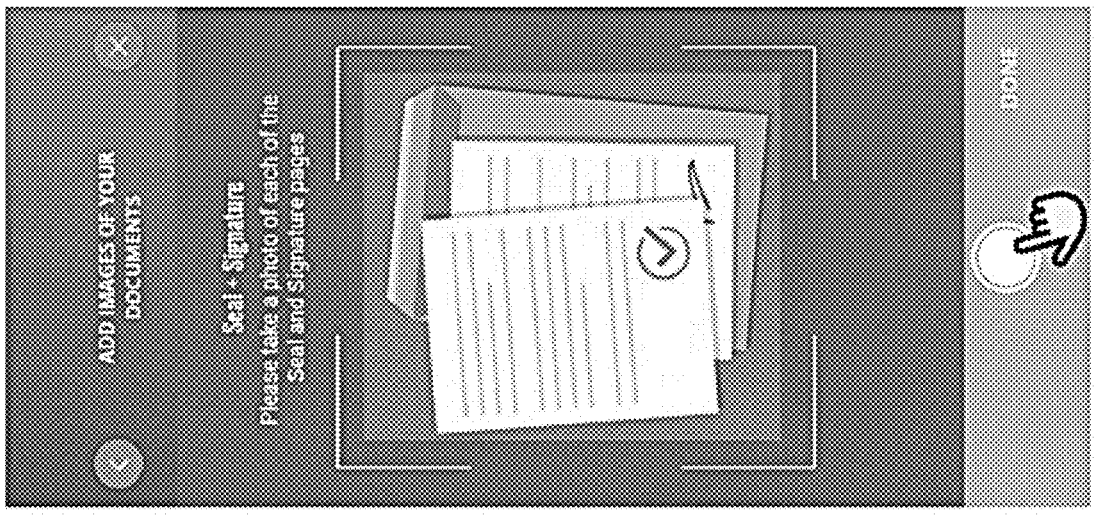
Figure 50:
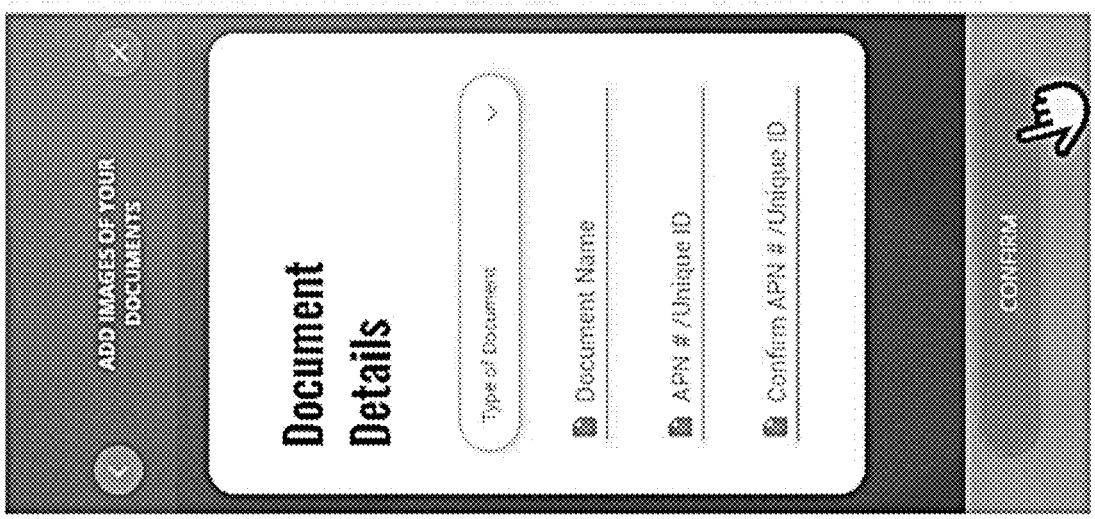
Figure 50:
Figure 51:
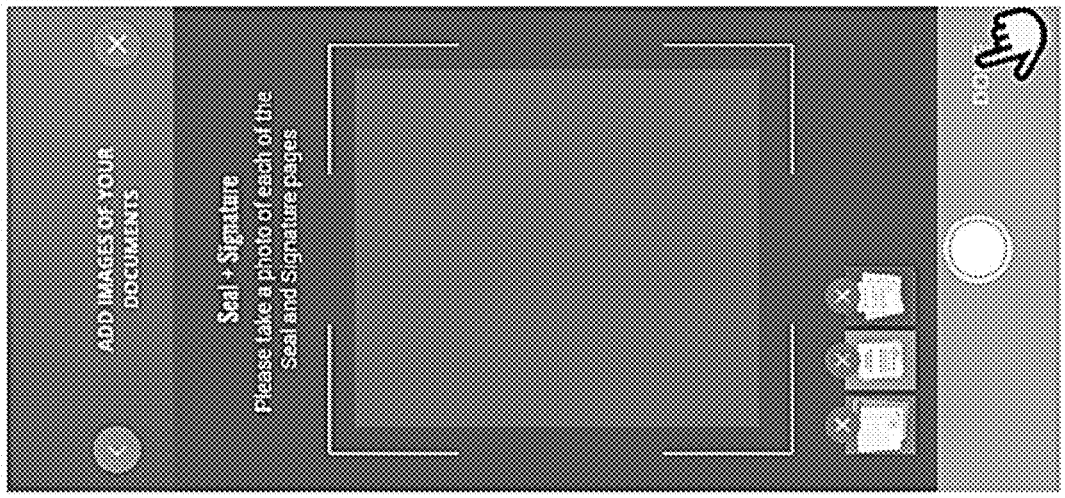
Figure 51:
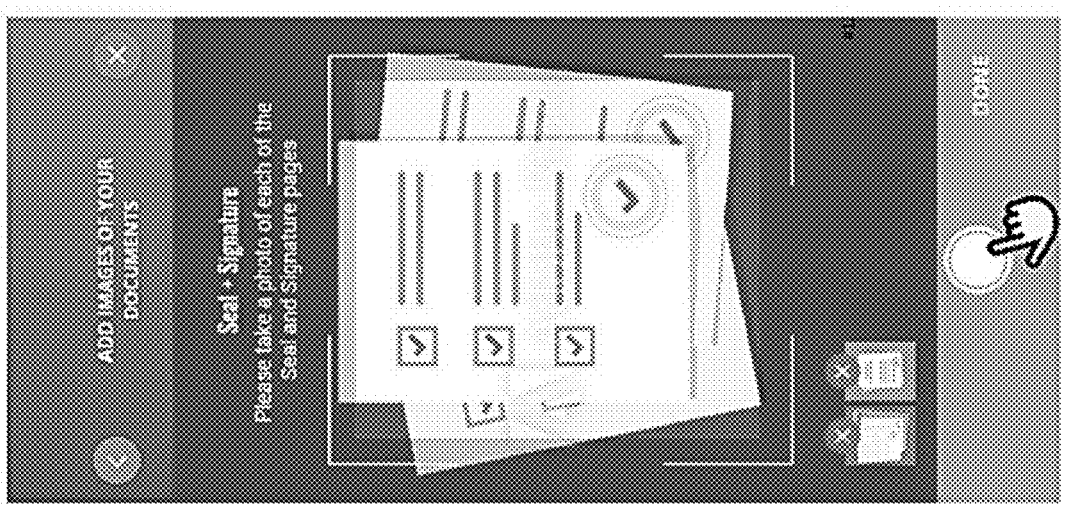
Figure 51:
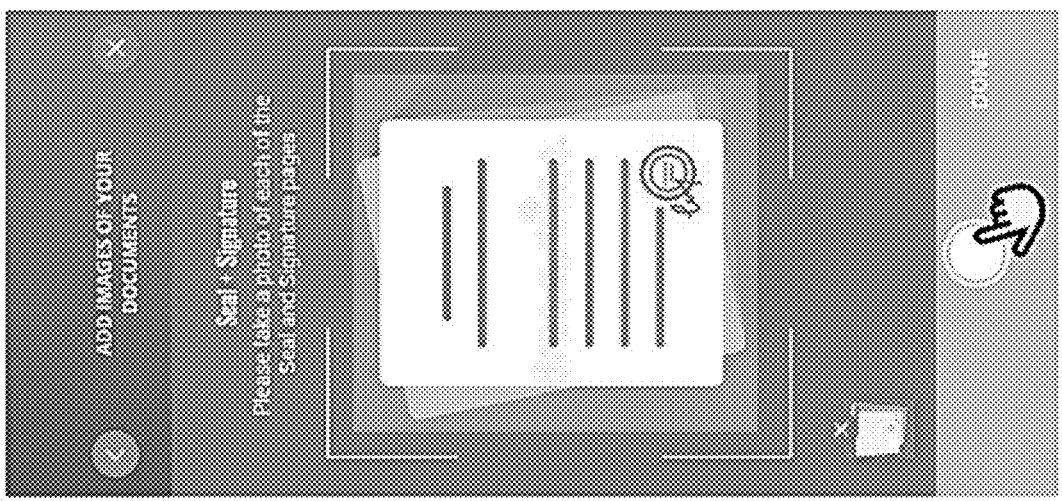
Figure 52:
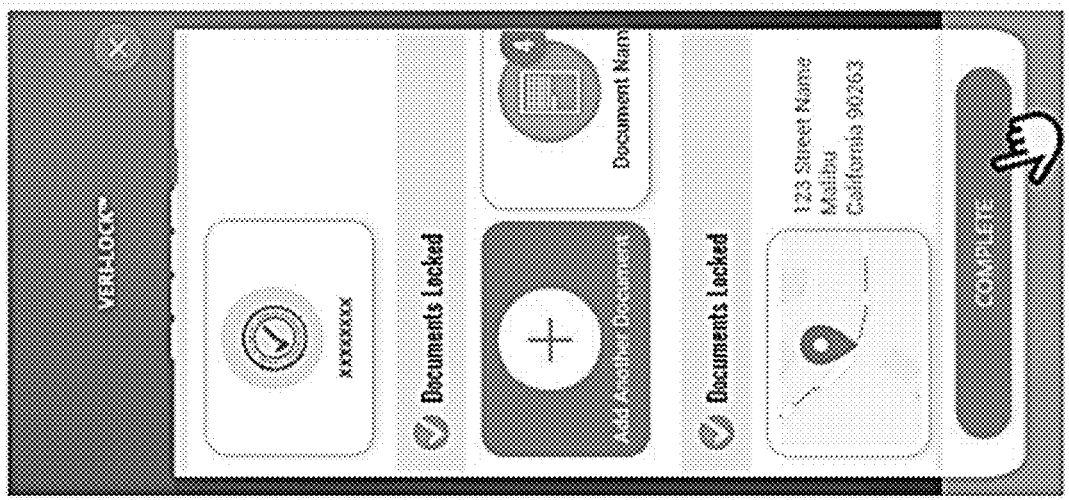
Figure 52:
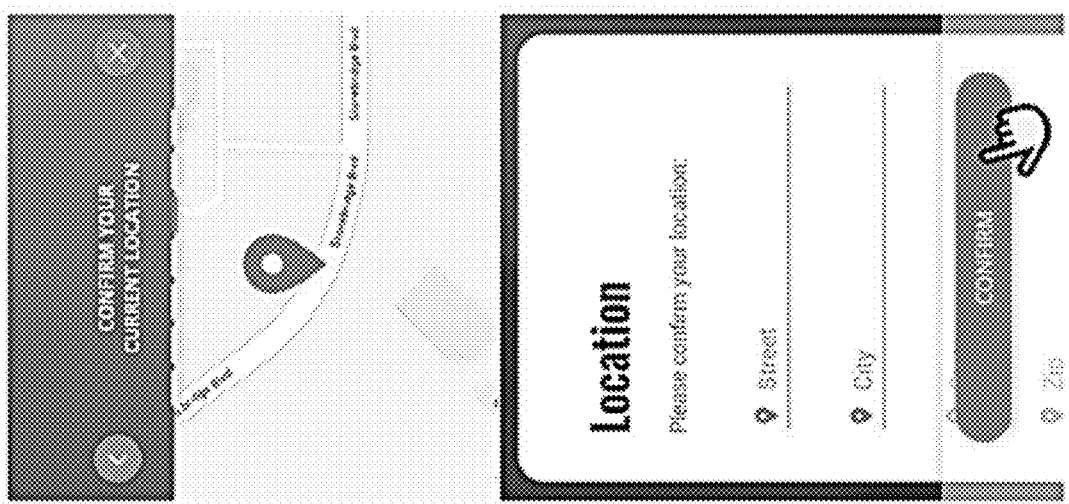
Figure 52:
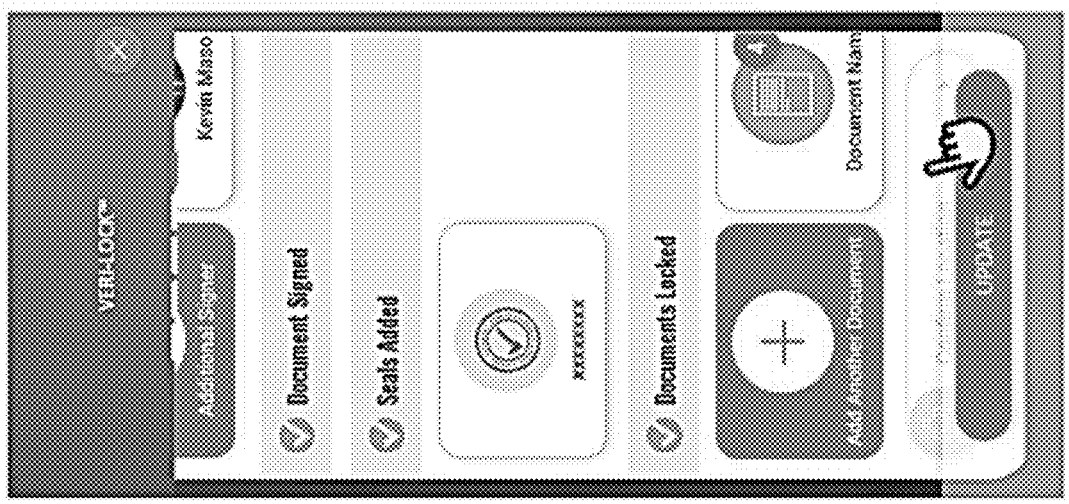

FIG. 43 shows steps for the veri-lock platform and associated information displayed during system execution that includes inputs for executing one or more aspects of the system according to some embodiments. FIG. 44 depicts steps for the veri-lock platform and associated information displayed during system execution that includes selecting a type of identifying document according to some embodiments. FIG. 45 illustrates steps for the veri-lock platform and associated information displayed during system execution that includes capturing and uploading an image of the identifying document according to some embodiments. FIG. 46 shows steps for the veri-lock platform and associated information displayed during system execution that includes verifying identifying document authenticity according to some embodiments. FIG. 47 illustrates steps for the veri-lock platform and associated information displayed during system execution that includes capturing an image of the user (e.g., notary, signer) according to some embodiments. FIG. 48 depicts steps for the veri-lock platform and associated information displayed during system execution that includes adding a seal to the document collection according to some embodiments. FIG. 49 shows steps for the veri-lock platform and associated information displayed during system execution that includes the system generating a unique hash code according to some embodiments. FIG. 50 illustrates steps for the veri-lock platform and associated information displayed during system execution that includes adding document images according to some embodiments. FIG. 51 shows steps for the veri-lock platform and associated information displayed during system execution that includes adding multiple documents according to some embodiments. FIG. 52 depicts steps for the veri-lock platform and associated information displayed during system execution that includes adding location data including an address and location on a map and/or capturing location metadata according to some embodiments.

Figure 53:
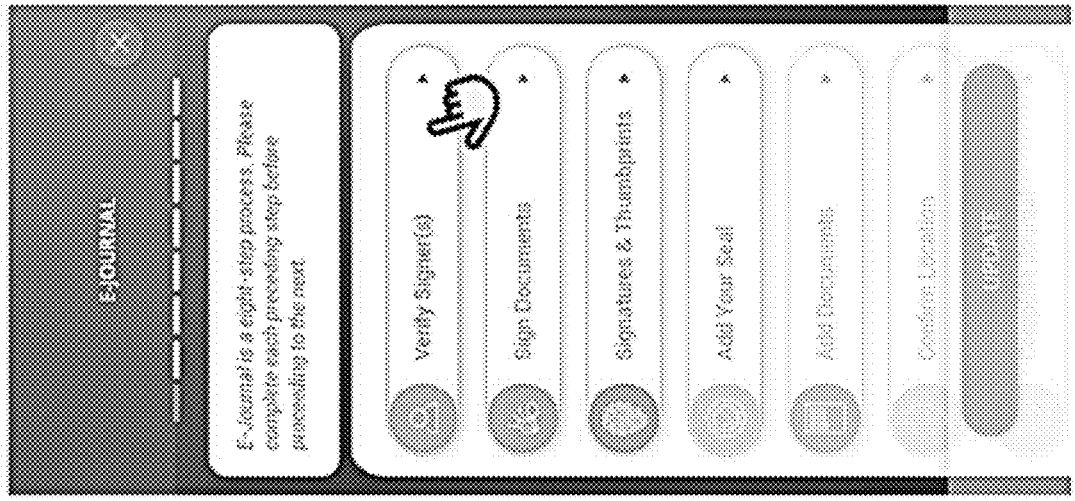
FIG. 53 illustrates steps for the signature entry platform (e-journal platform) and associated information displayed during system execution that includes initiation of one or more platform programs according to some embodiments.
Figure 53:
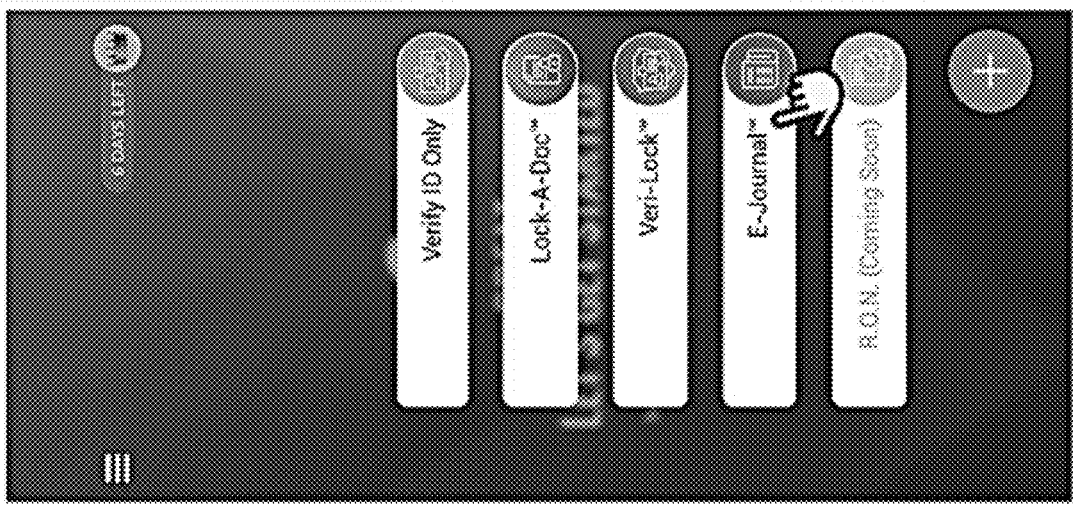
Figure 53:
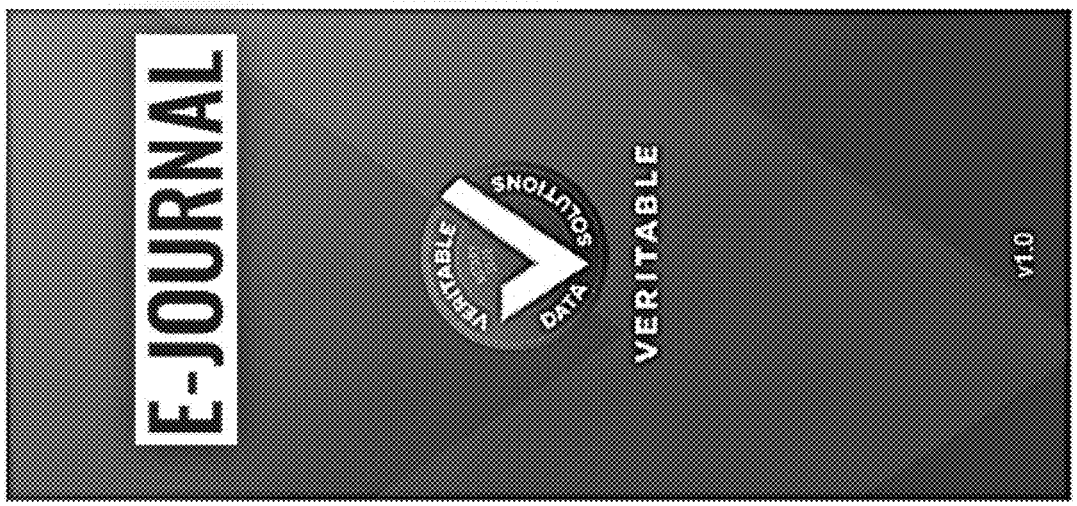
Figure 54:
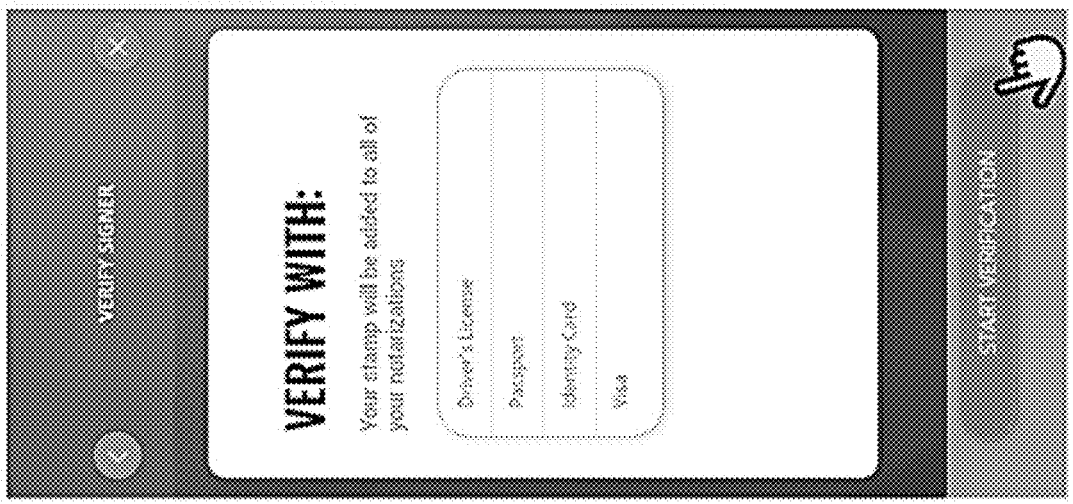
FIG. 54 depicts steps for the signature entry platform and associated information displayed during system execution that includes selecting an identification document according to some embodiments.
Figure 54:
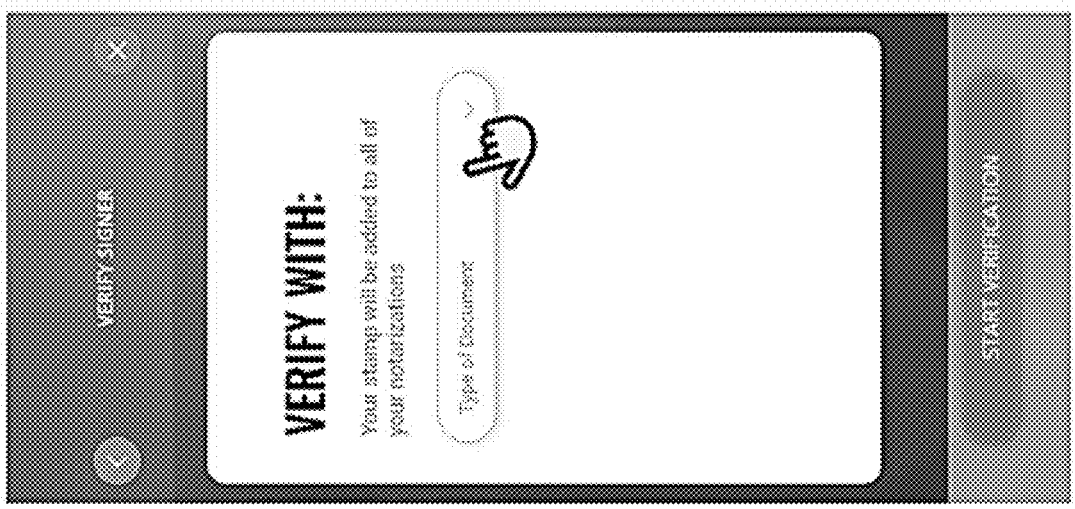
Figure 54:
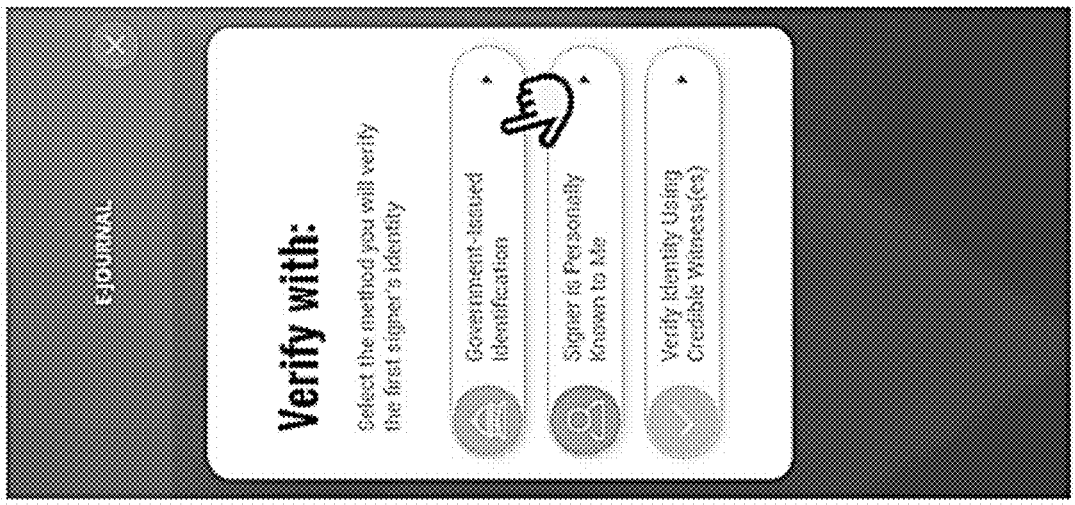
Figure 55:
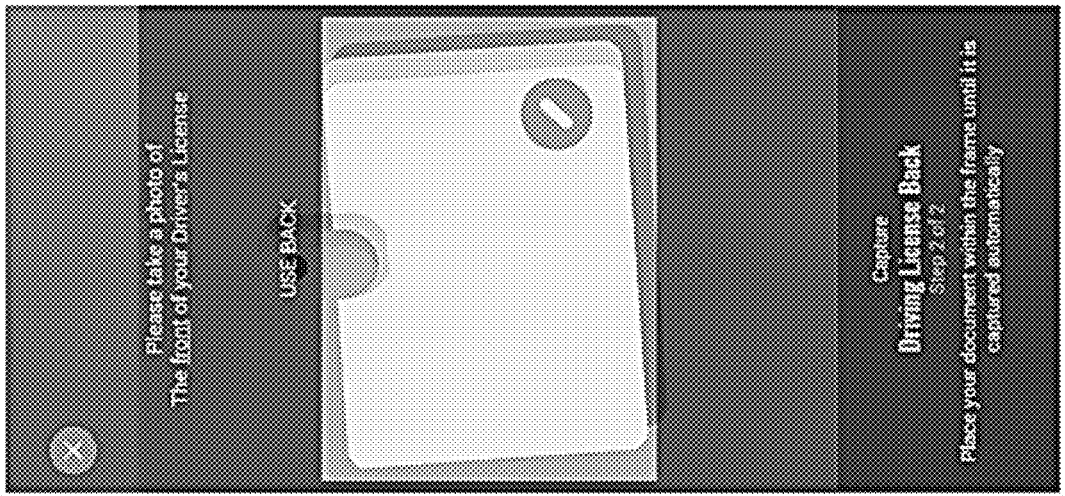
FIG. 55 illustrates steps for the signature entry platform and associated information displayed during system execution that includes capturing and uploading an image of the identification document according to some embodiments.
Figure 55:
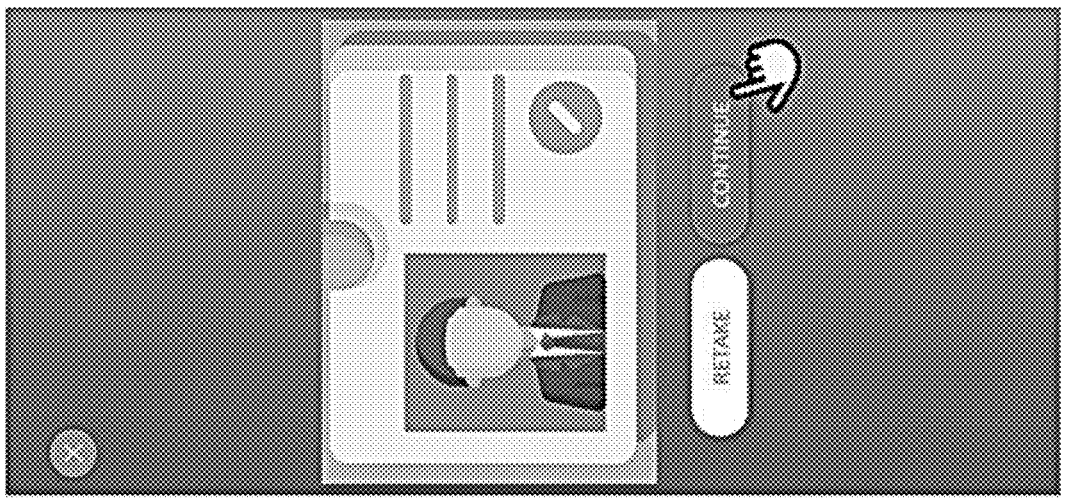
Figure 55:
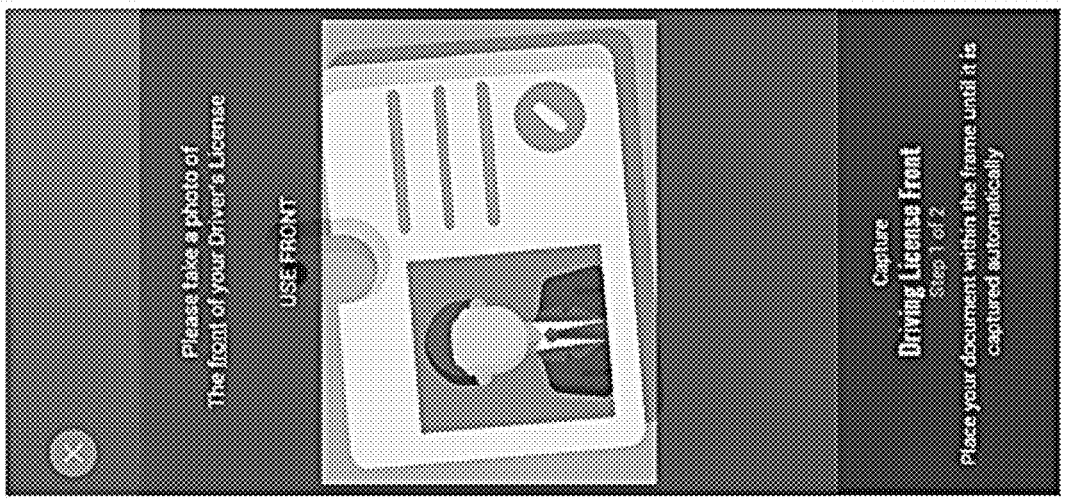
Figure 56:
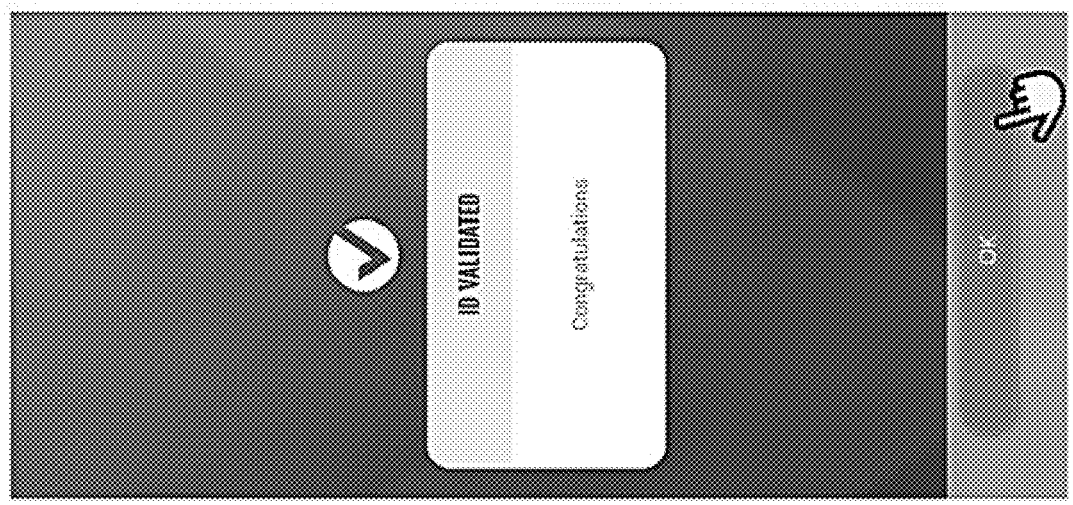
FIG. 56 shows steps for the signature entry platform and associated information displayed during system execution that includes verification of identification document authenticity according to some embodiments.
Figure 56:
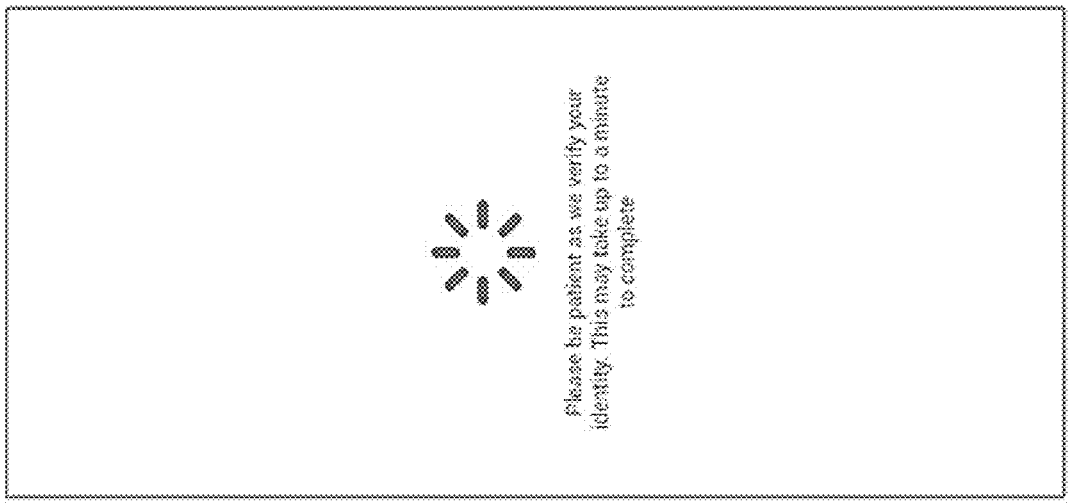
Figure 56:
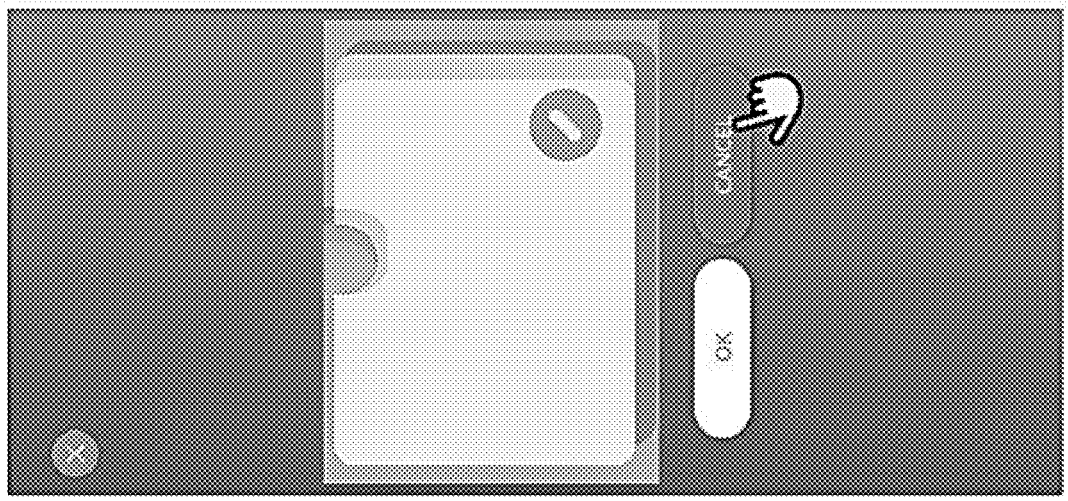
Figure 57:
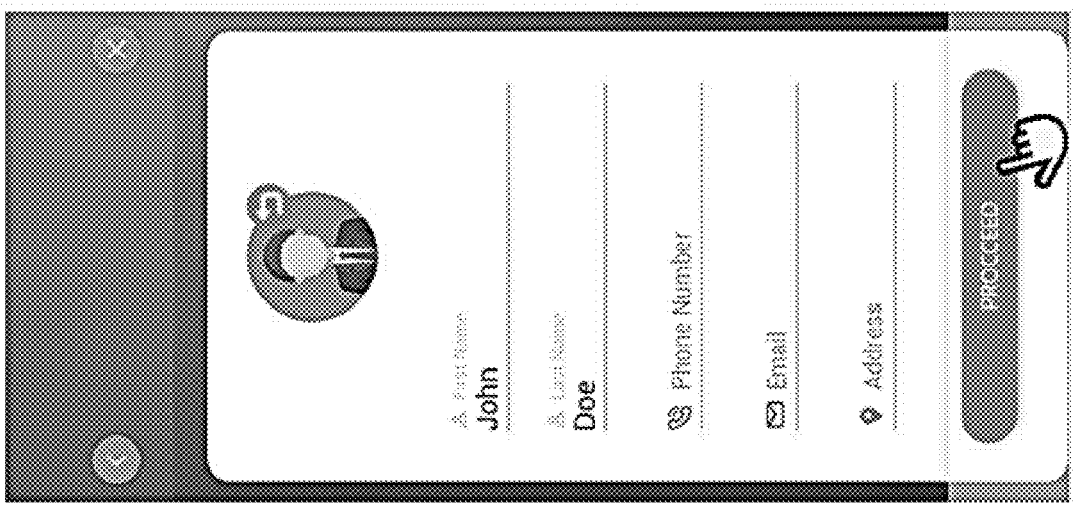
FIG. 57 illustrates steps for the signature entry platform and associated information displayed during system execution that includes capturing and uploading an image of the user according to some embodiments. In some embodiments, one or more forms of metadata described herein are captured, stored, and/or associated with each image uploaded to the system for storage on the blockchain.
Figure 57:
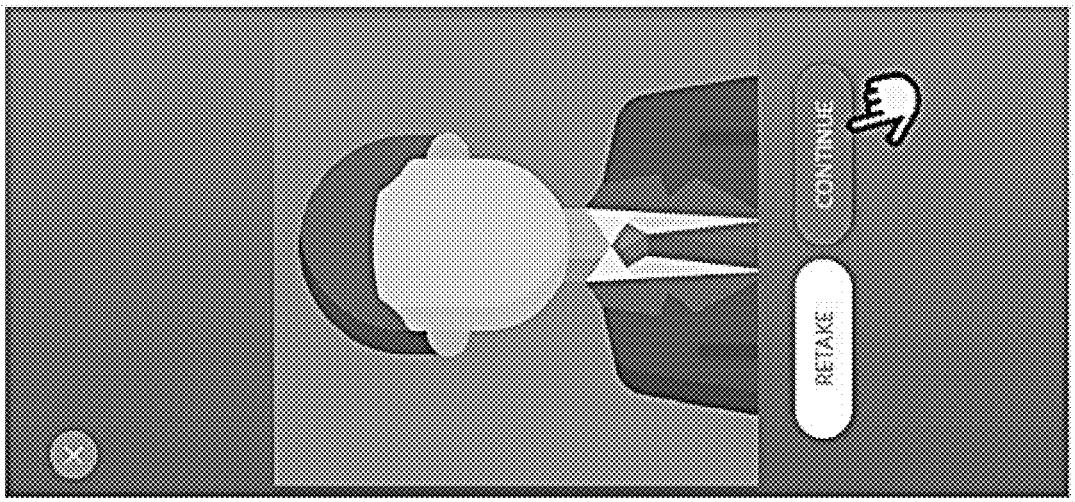
Figure 57:
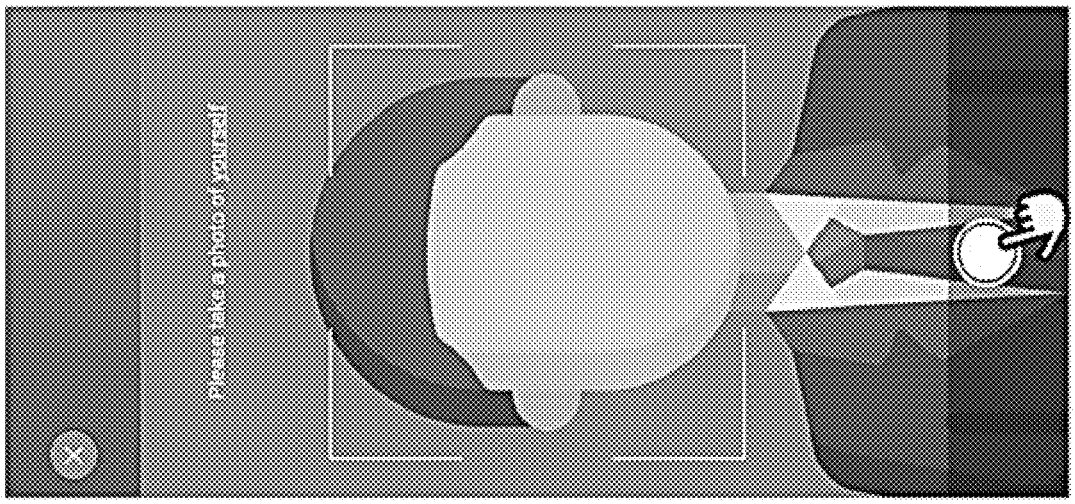
Figure 58:
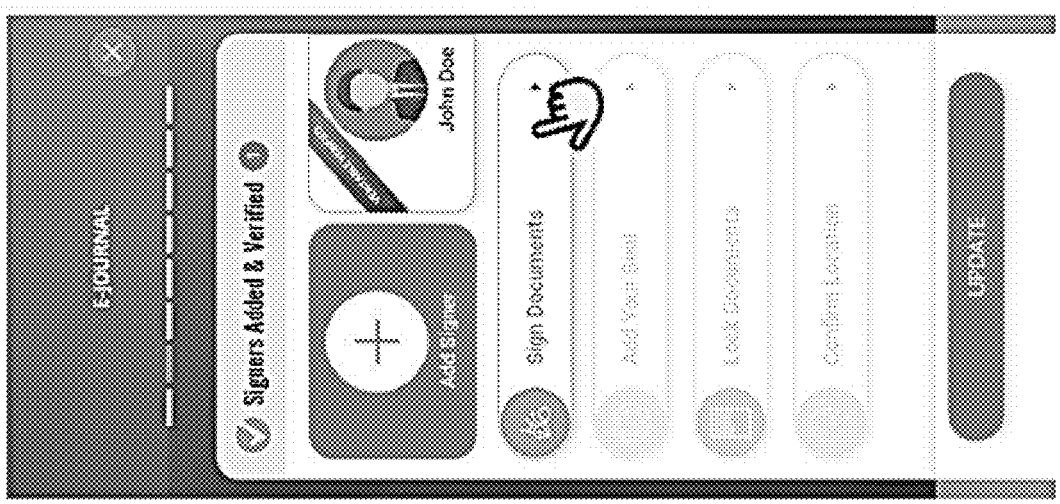
FIG. 58 depicts steps for the signature entry platform and associated information displayed during system execution that includes affirming liability information according to some embodiments.
Figure 58:
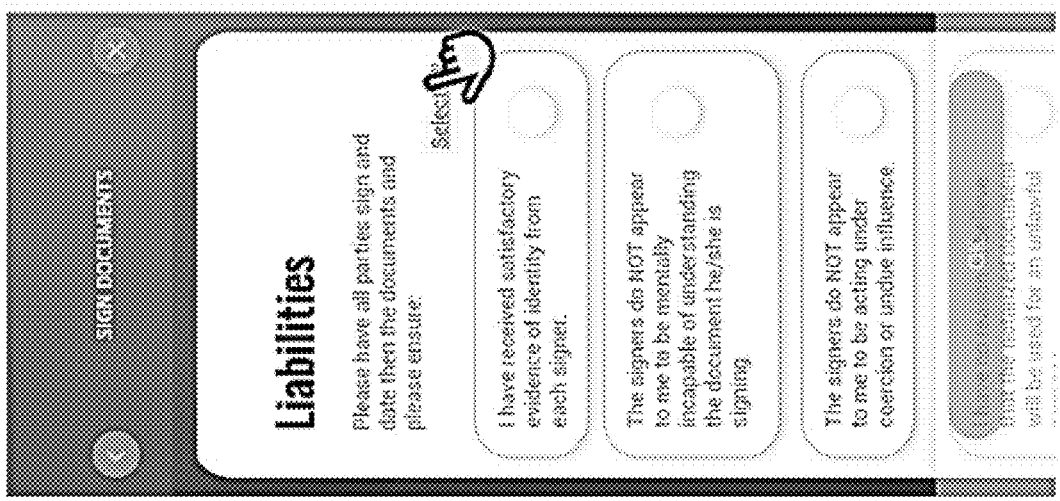
Figure 58:
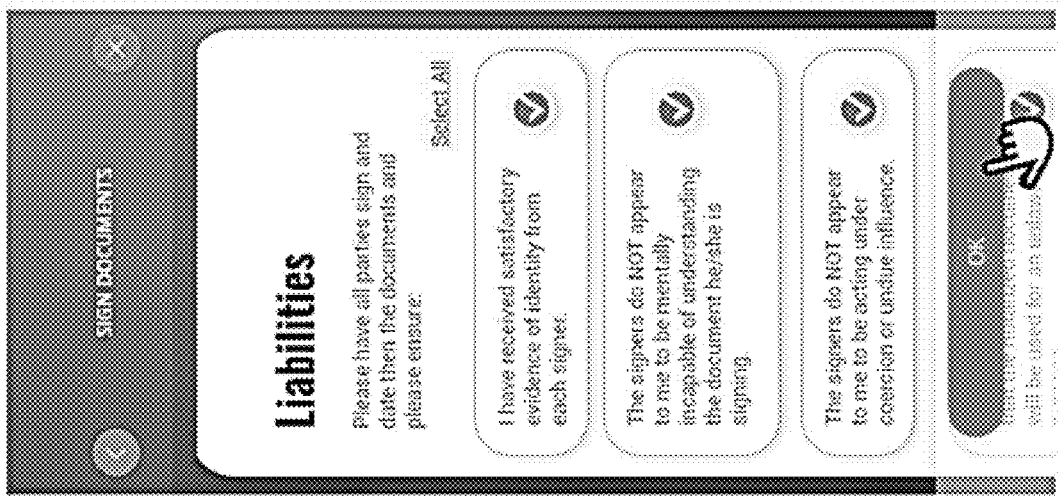
Figure 59:
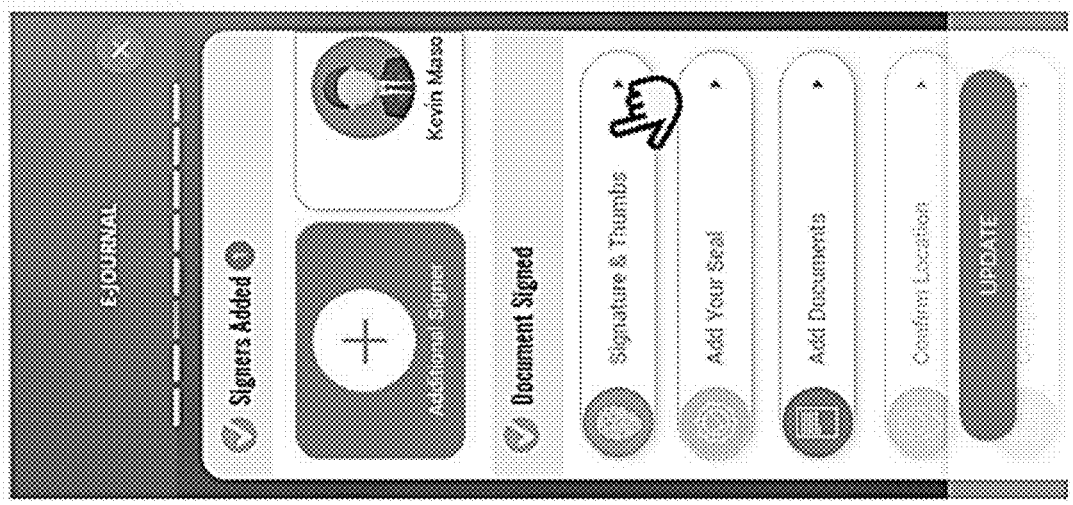
FIG. 59 shows steps for the signature entry platform and associated information displayed during system execution that includes instructions for signing documents according to some embodiments.
Figure 59:
Figure 59:
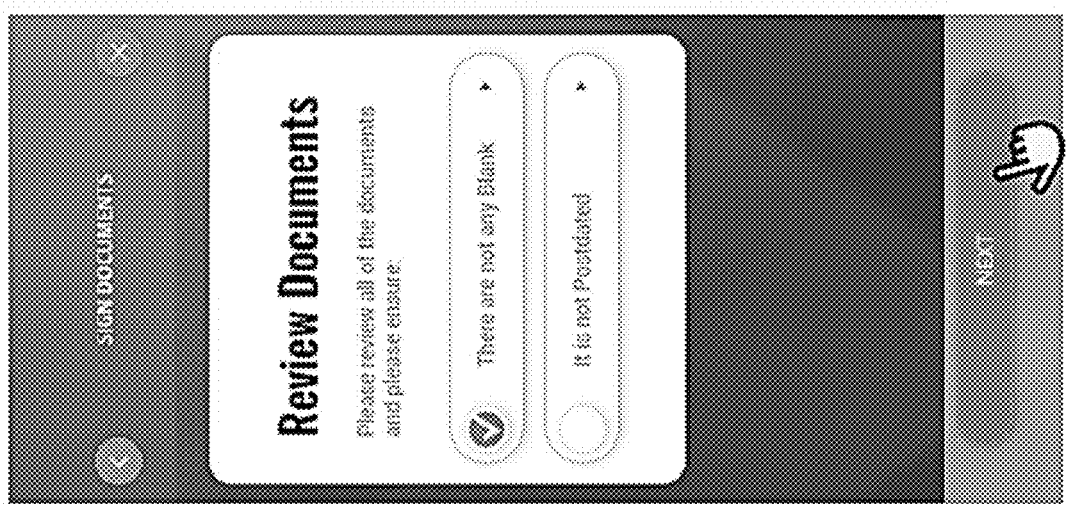
Figure 60:
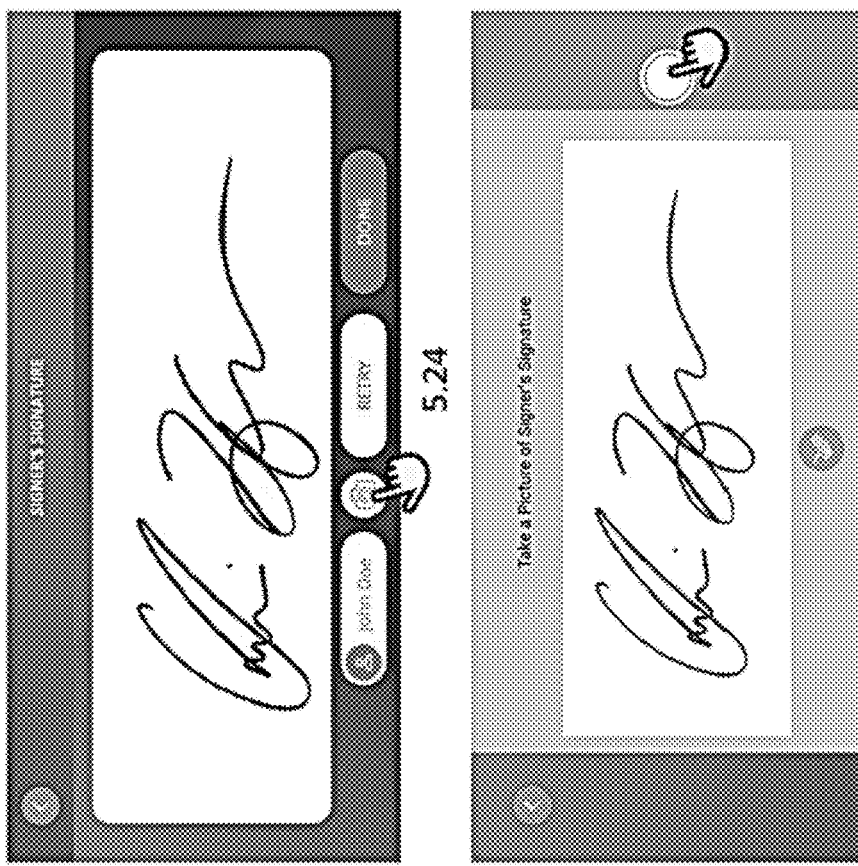
FIG. 60 shows steps for the signature entry platform and associated information displayed during system execution that includes adding a thumbprint and/or signature according to some embodiments.
Figure 60:
Figure 60:
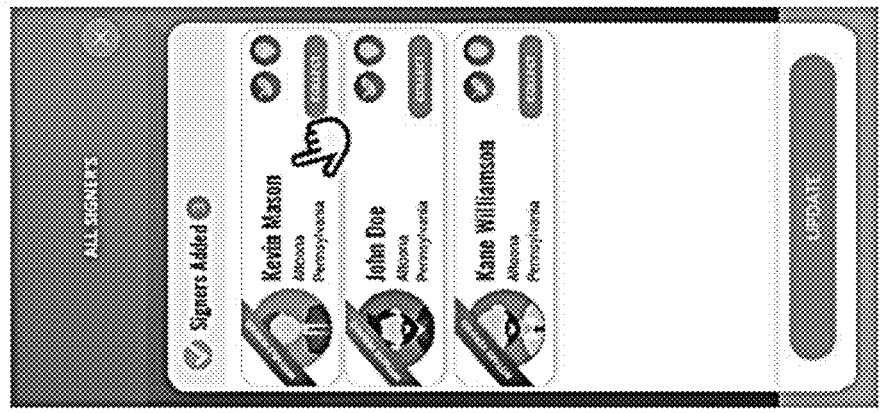

FIG. 53 illustrates steps for the signature entry platform (e-journal platform) and associated information displayed during system execution that includes initiation of one or more platform programs according to some embodiments. FIG. 54 depicts steps for the signature entry platform and associated information displayed during system execution that includes selecting an identification document according to some embodiments. FIG. 55 illustrates steps for the signature entry platform and associated information displayed during system execution that includes capturing and uploading an image of the identification document according to some embodiments. FIG. 56 shows steps for the signature entry platform and associated information displayed during system execution that includes verification of identification document authenticity according to some embodiments. FIG. 57 illustrates steps for the signature entry platform and associated information displayed during system execution that includes capturing and uploading an image of the user according to some embodiments. In some embodiments, one or more forms of metadata described herein are captured, stored, and/or associated with each image uploaded to the system for storage on the blockchain. FIG. 58 depicts steps for the signature entry platform and associated information displayed during system execution that includes affirming liability information according to some embodiments. FIG. 59 shows steps for the signature entry platform and associated information displayed during system execution that includes instructions for signing documents according to some embodiments. FIG. 60 shows steps for the signature entry platform and associated information displayed during system execution that includes adding a thumbprint and/or signature according to some embodiments.

Figure 61:
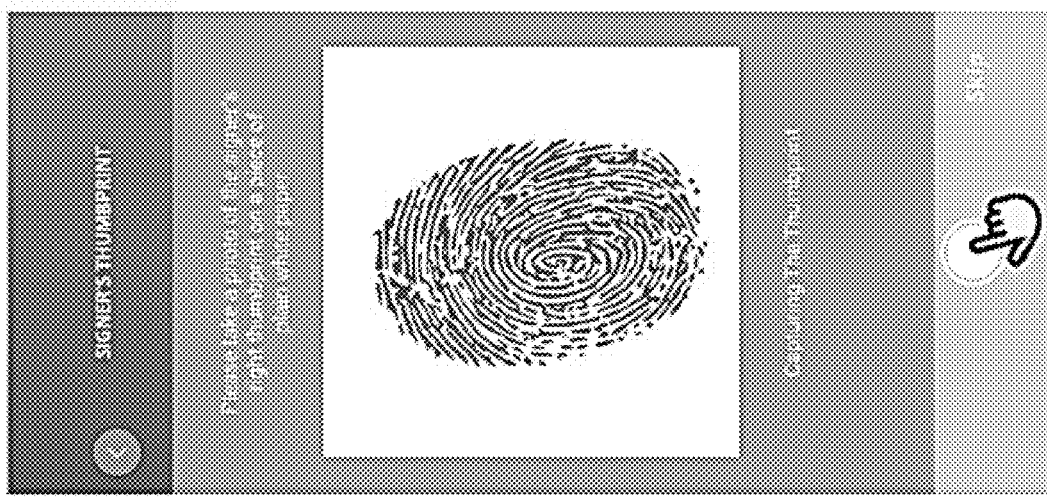
FIG. 61 illustrates steps for the signature entry platform and associated information displayed during system execution that includes confirming and/or adding a signature and/or thumbprint according to some embodiments.
Figure 61:
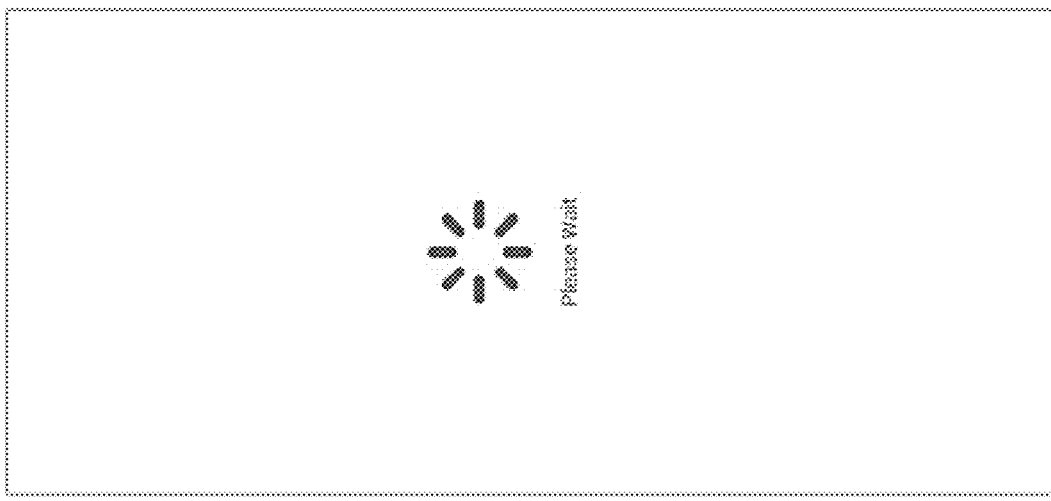
Figure 61:
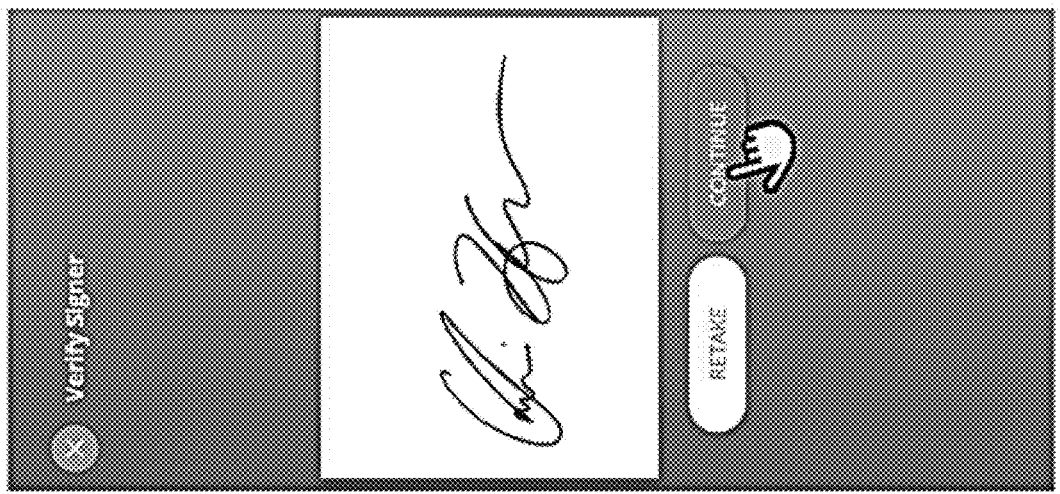
Figure 62:
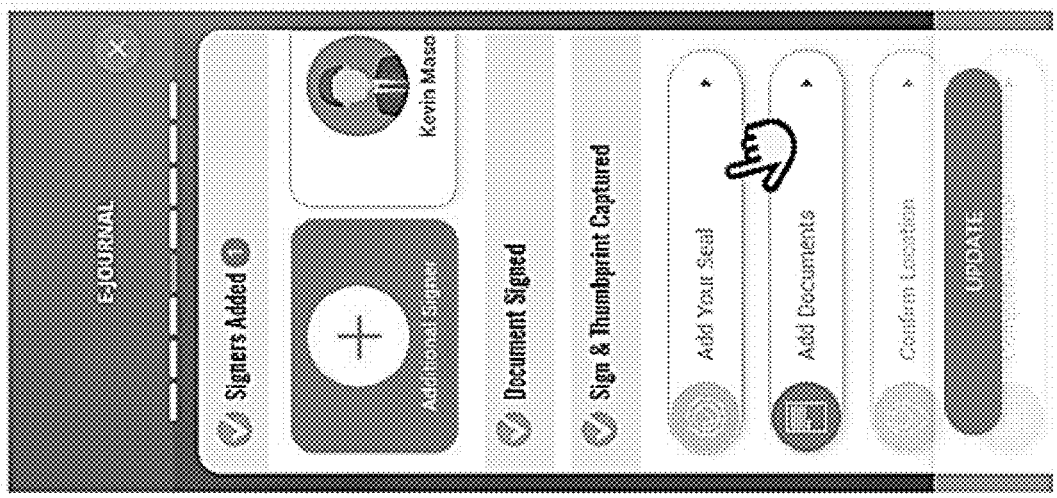
FIG. 62 depicts steps for the signature entry platform and associated information displayed during system execution that includes adding a seal according to some embodiments.
Figure 62:
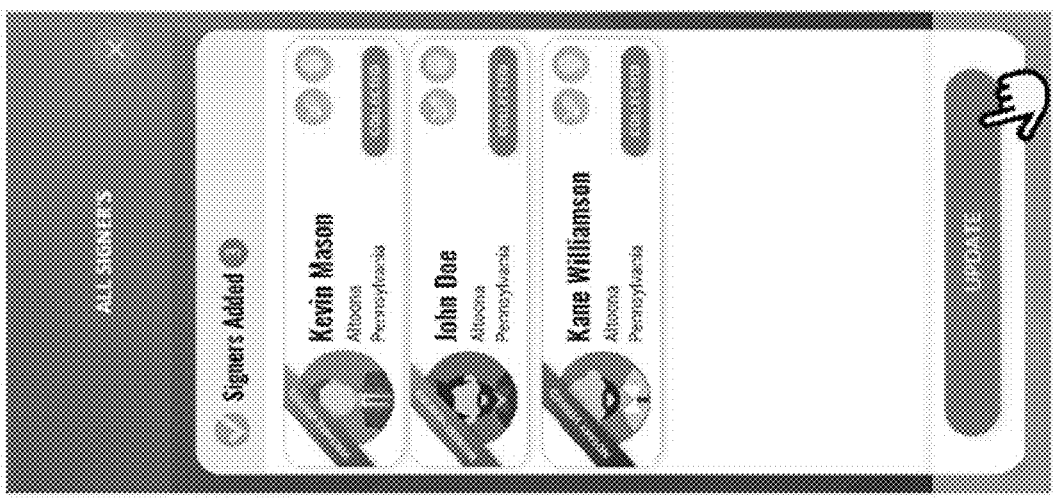
Figure 62:
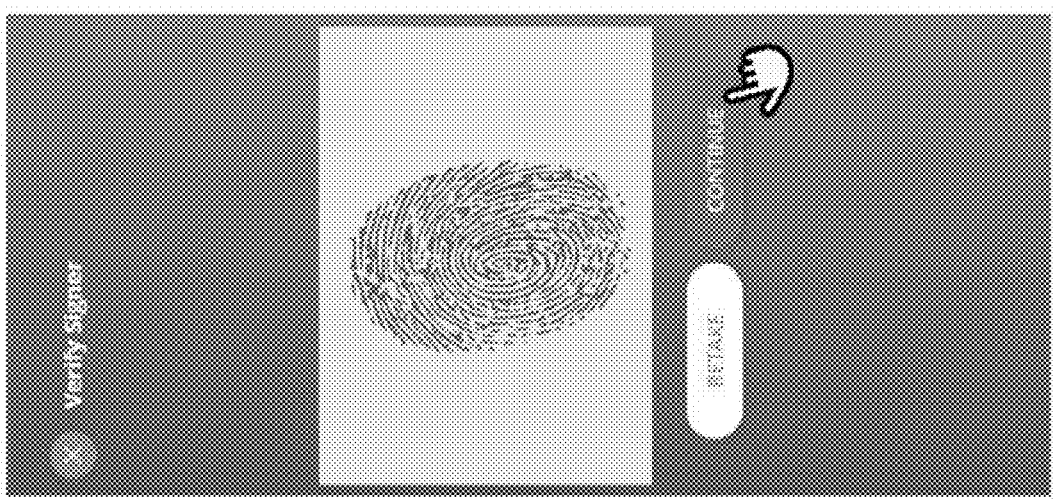
Figure 63:
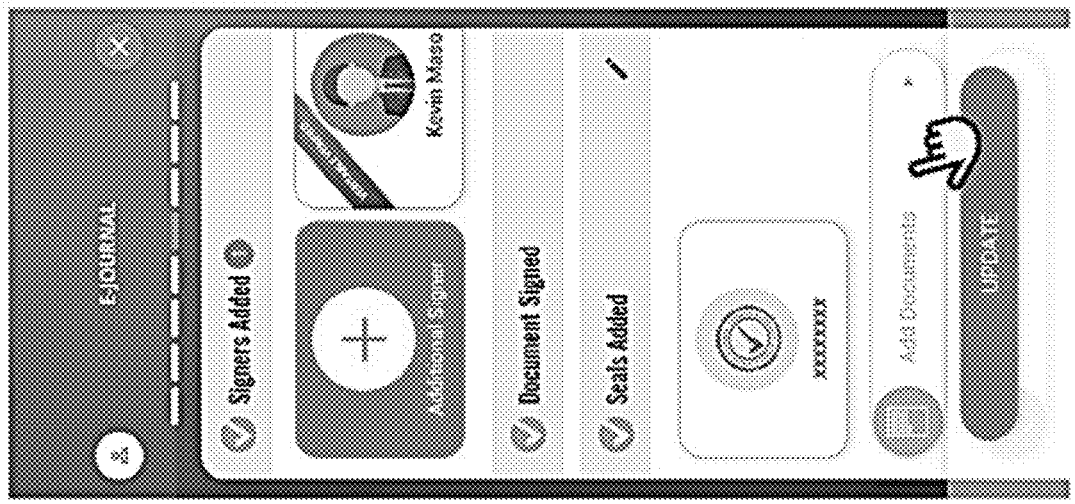
FIG. 63 illustrates steps for the signature entry platform and associated information displayed during system execution that includes the system generating a unique hash code according to some embodiments.
Figure 63:
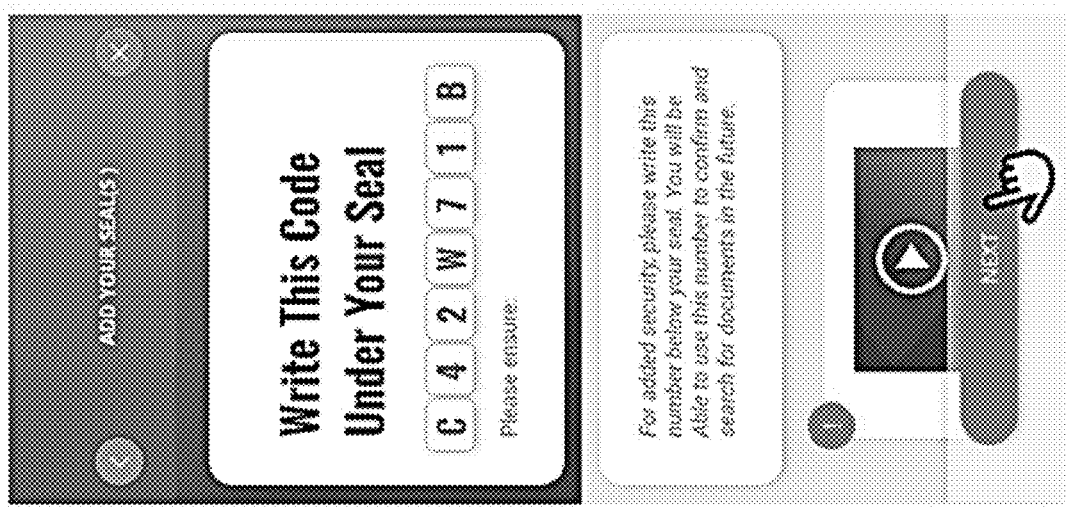
Figure 63:
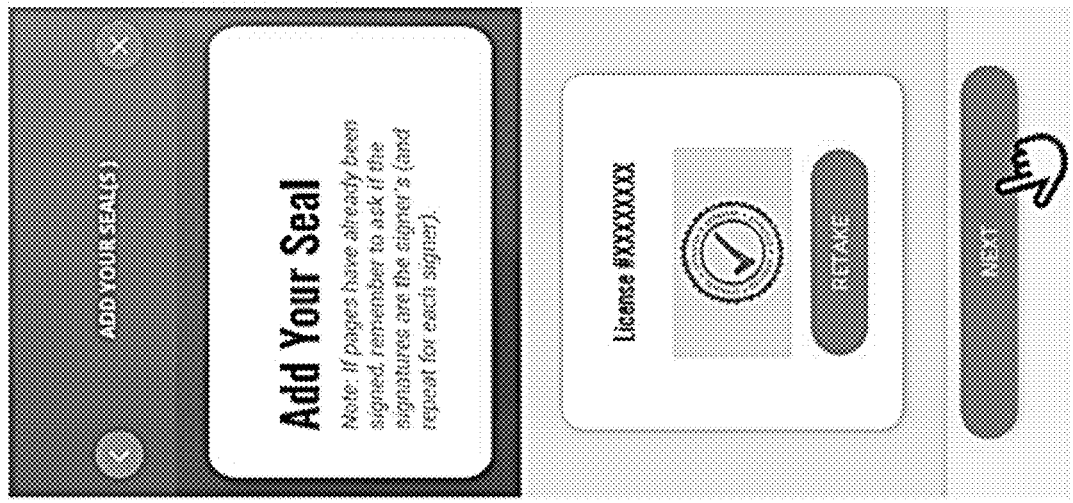
Figure 64:
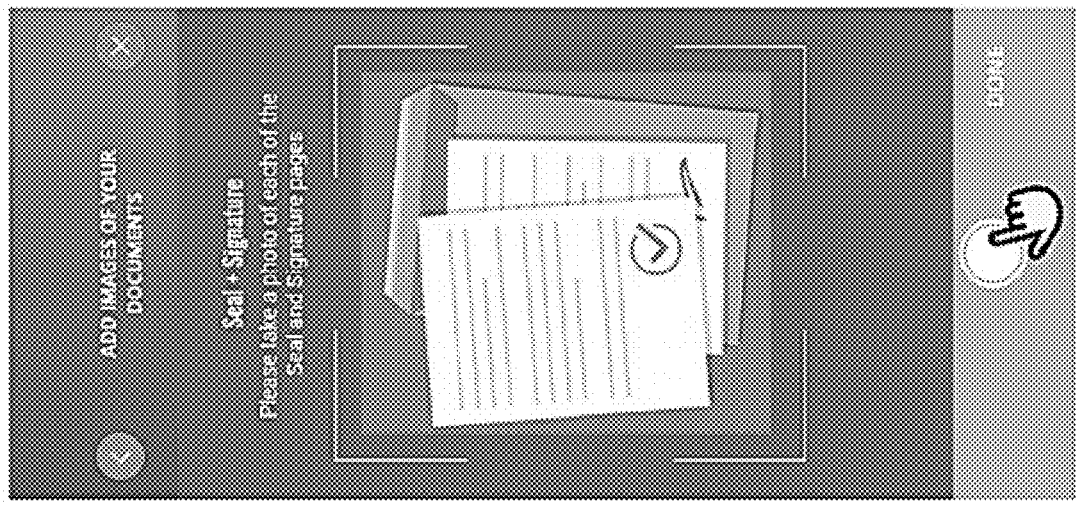
FIG. 64 shows steps for the signature entry platform and associated information displayed during system execution that includes instructions for adding documents according to some embodiments.
Figure 64:
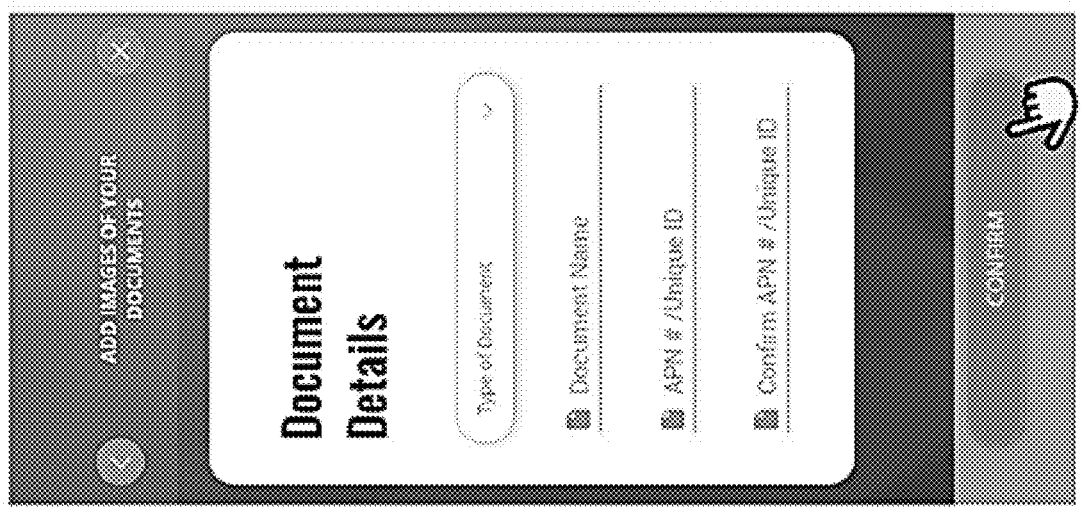
Figure 64:
Figure 65:
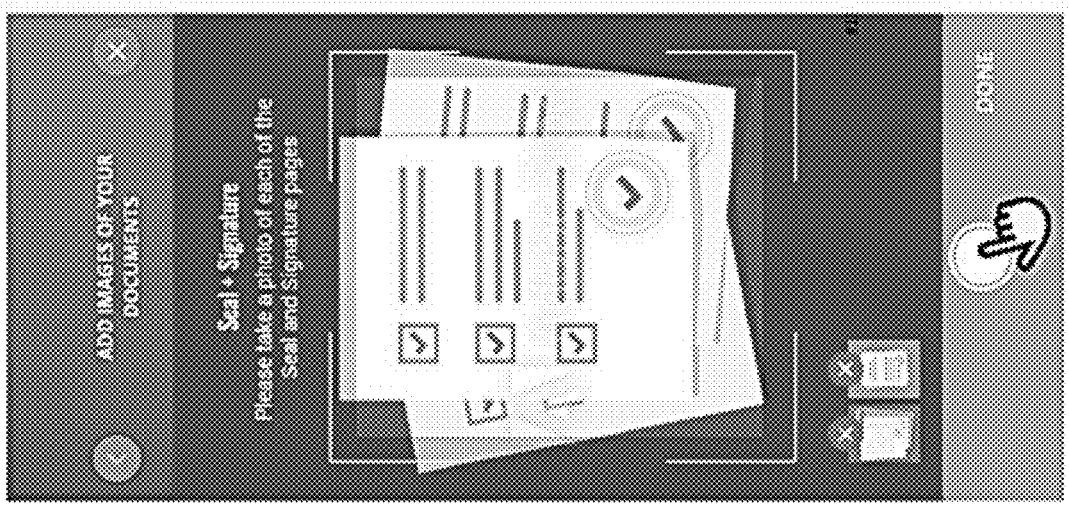
FIG. 65 shows steps for the signature entry platform and associated information displayed during system execution that includes instructions for how to capture document images according to some embodiments.
Figure 65:
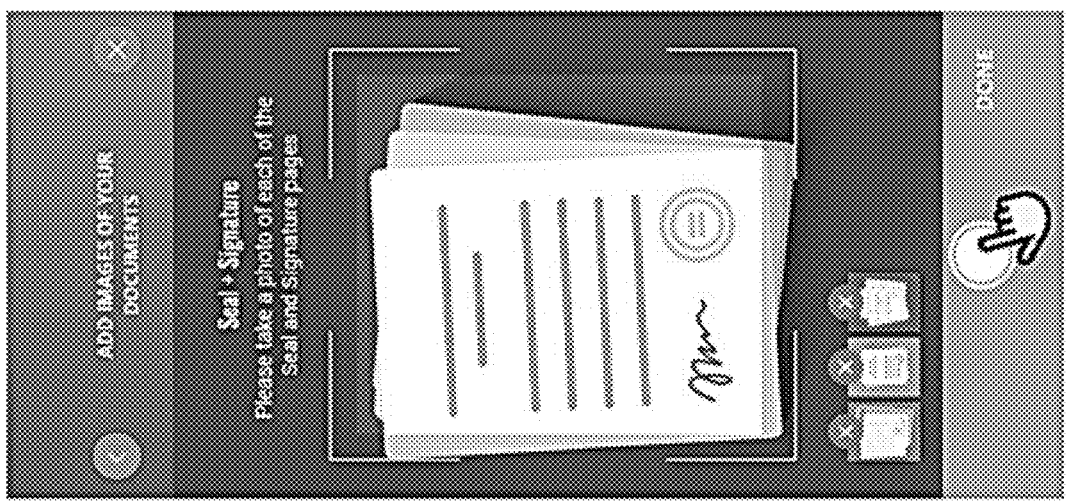
Figure 65:
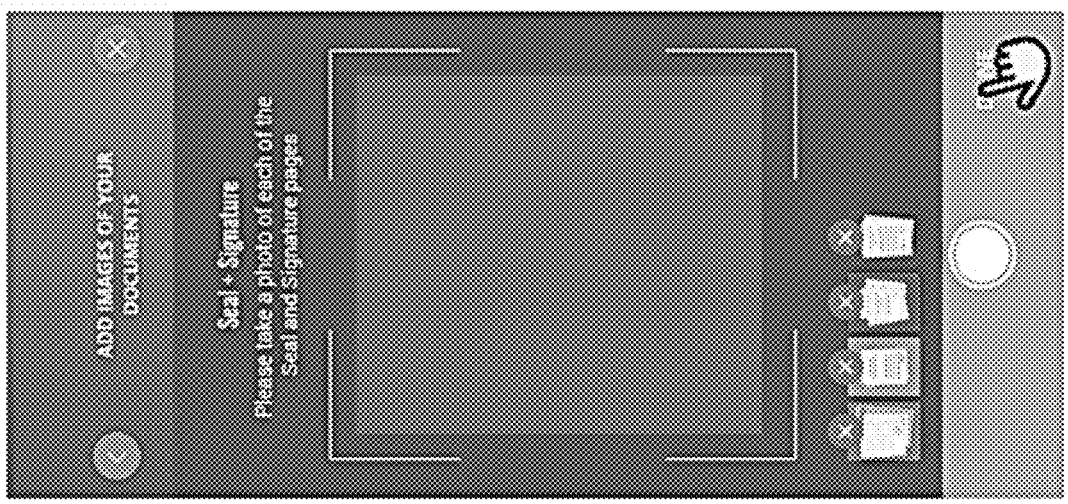
Figure 66:
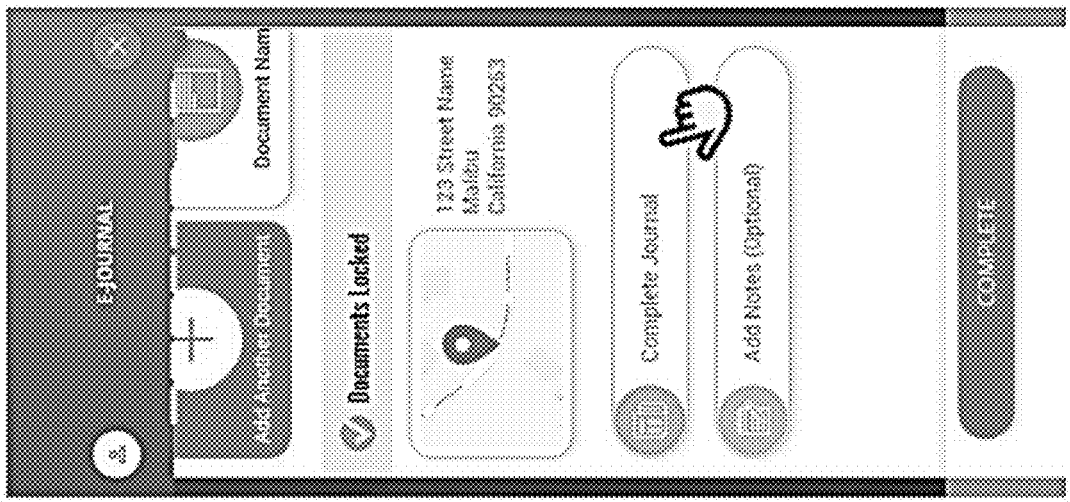
FIG. 66 depicts steps for the signature entry platform and associated information displayed during system execution that includes instructions for capturing location data according to some embodiments.
Figure 66:
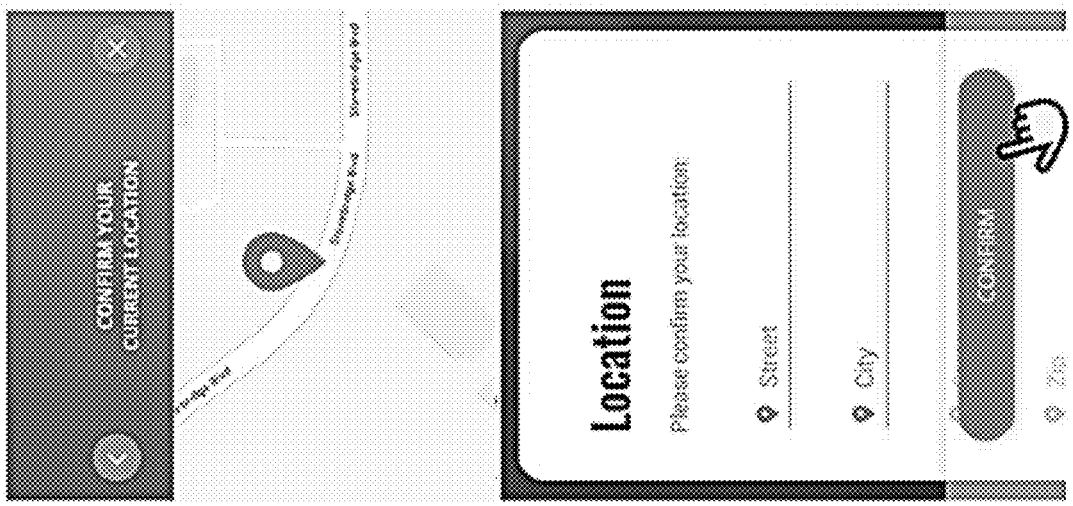
Figure 66:
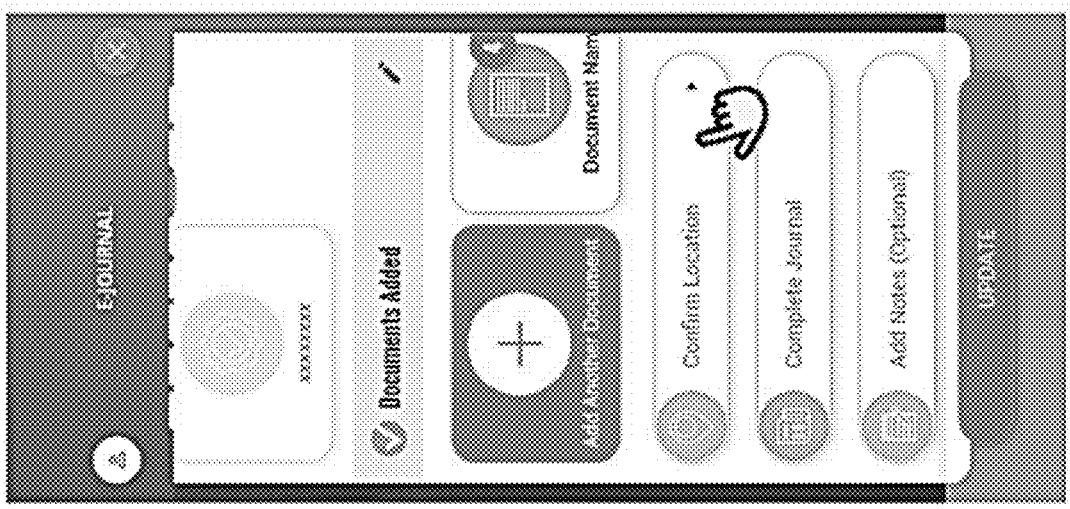
Figure 67:
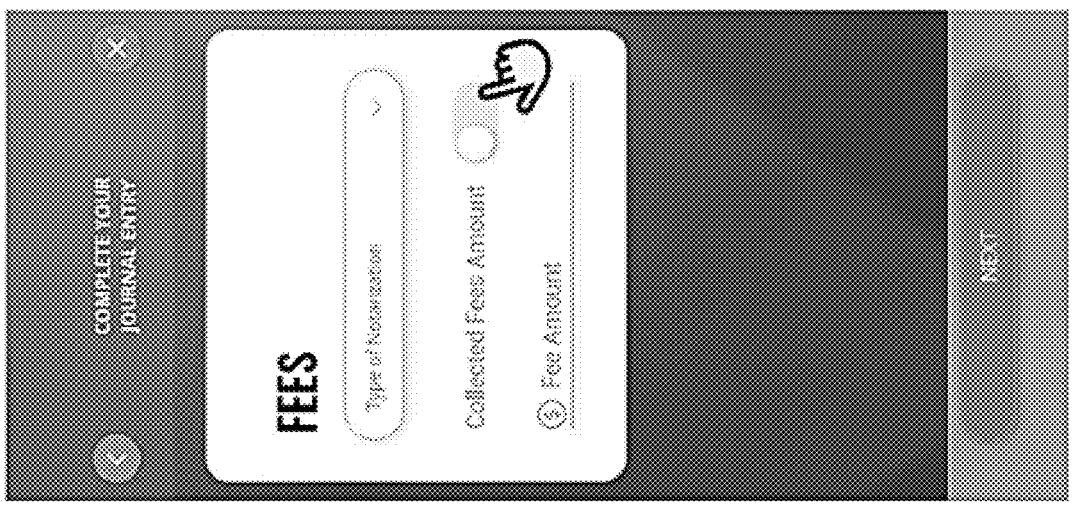
FIG. 67 depicts steps for the signature entry platform and associated information displayed during system execution that includes a fee collection program according to some embodiments.
Figure 67:
Figure 67:
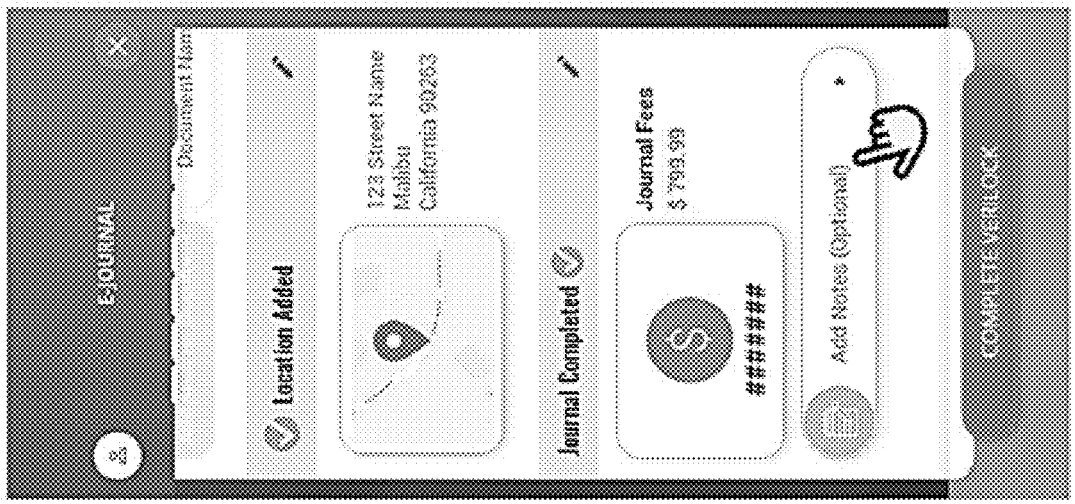
Figure 68:
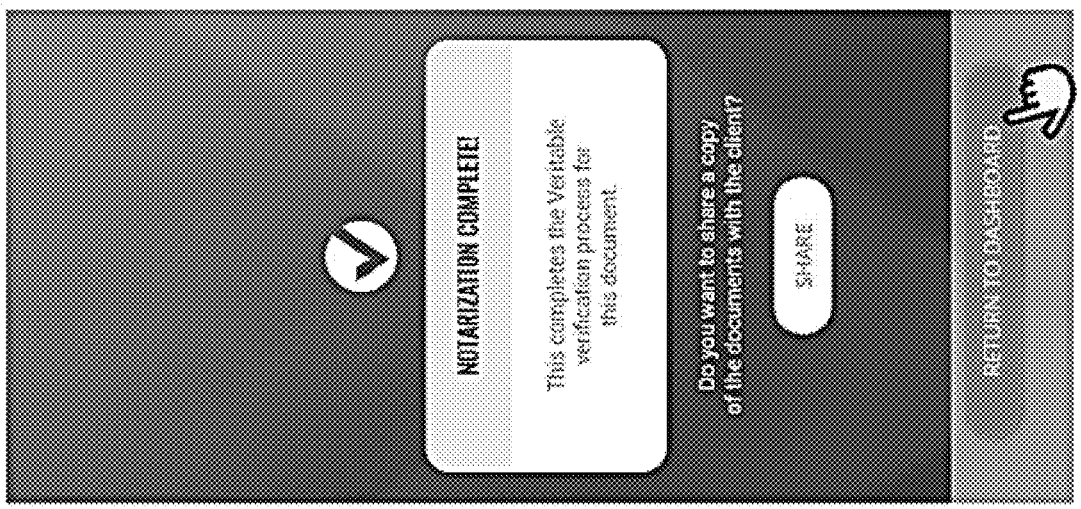
FIG. 68 illustrates steps for the signature entry platform and associated information displayed during system execution that includes adding notes and completing the e-journal entry according to some embodiments.
Figure 68:
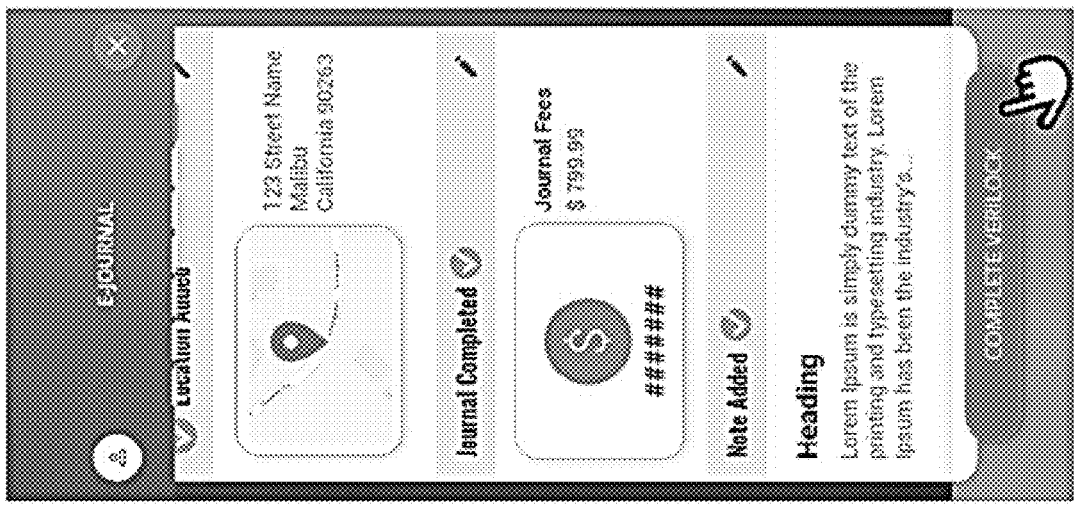
Figure 68:
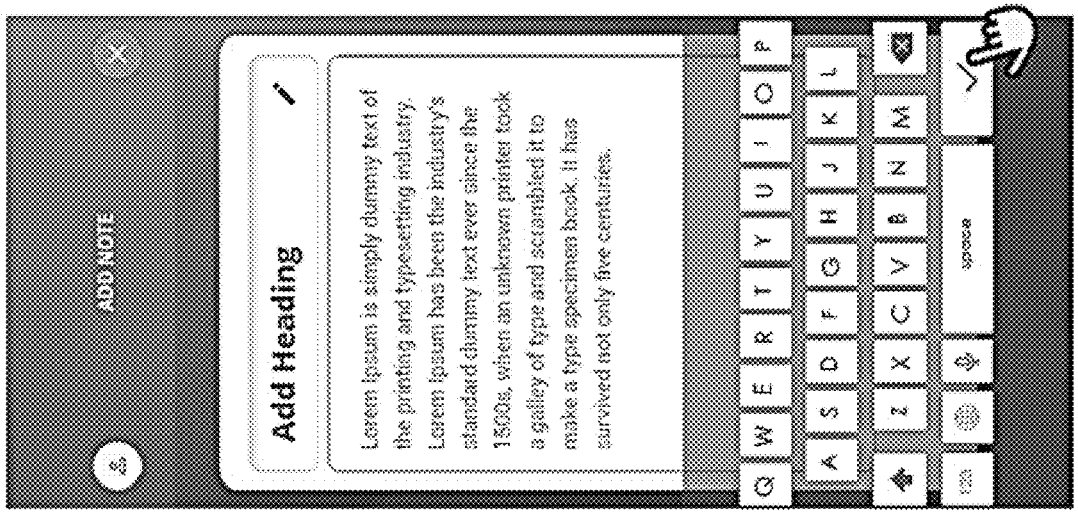
Figure 69:
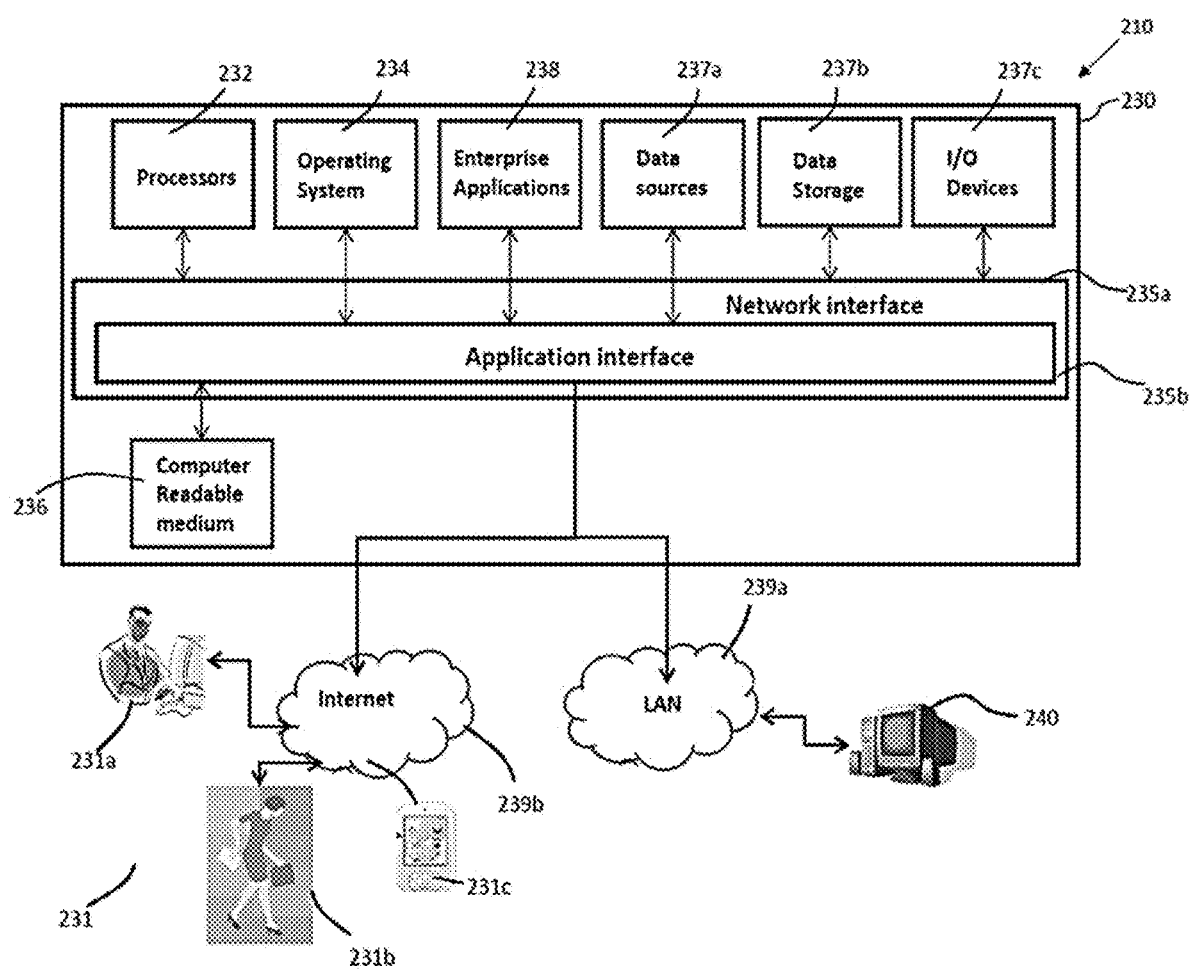
FIG. 69 illustrates a computer system enabling or comprising the systems and methods in accordance with some embodiments of the system.

FIG. 61 illustrates steps for the signature entry platform and associated information displayed during system execution that includes confirming and/or adding a signature and/or thumbprint according to some embodiments. FIG. 62 depicts steps for the signature entry platform and associated information displayed during system execution that includes adding a seal according to some embodiments. FIG. 63 illustrates steps for the signature entry platform and associated information displayed during system execution that includes the system generating a unique hash code according to some embodiments. FIG. 64 shows steps for the signature entry platform and associated information displayed during system execution that includes instructions for adding documents according to some embodiments. FIG. 65 shows steps for the signature entry platform and associated information displayed during system execution that includes instructions for how to capture document images according to some embodiments. FIG. 66 depicts steps for the signature entry platform and associated information displayed during system execution that includes instructions for capturing location data according to some embodiments. FIG. 67 depicts steps for the signature entry platform and associated information displayed during system execution that includes a fee collection program according to some embodiments. FIG. 68 illustrates steps for the signature entry platform and associated information displayed during system execution that includes adding notes and completing the e-journal entry according to some embodiments. FIG. 69 illustrates a computer system 210 enabling or comprising the systems and methods in accordance with some embodiments of the system. In some embodiments, the computer system 210 can operate and/or process computer-executable code of one or more software modules of the aforementioned system and method. Further, in some embodiments, the computer system 210 can operate and/or display information within one or more graphical user interfaces (e.g., HMIs) integrated with or coupled to the system.

In some embodiments, the computer system 210 can comprise at least one processor 232. In some embodiments, the at least one processor 232 can reside in, or coupled to, one or more conventional server platforms (not shown). In some embodiments, the computer system 210 can include a network interface 235*a* and an application interface 235*b* coupled to the least one processor 232 capable of processing at least one operating system 234. Further, in some embodiments, the interfaces 235*a*, 235*b* coupled to at least one processor 232 can be configured to process one or more of the software modules (e.g., such as enterprise applications 238). In some embodiments, the software application modules 238 can include server-based software, and can operate to host at least one user account and/or at least one client account, and operate to transfer data between one or more of these accounts using the at least one processor 232.

With the above embodiments in mind, it is understood that the system can employ various computer-implemented operations involving data stored in computer systems. Moreover, the above-described databases and models described throughout this disclosure can store analytical models and other data on computer-readable storage media within the computer system 210 and on computer-readable storage media coupled to the computer system 210 according to various embodiments. In addition, in some embodiments, the above-described applications of the system can be stored on computer-readable storage media within the computer system 210 and on computer-readable storage media coupled to the computer system 210. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 210 can comprise at least one computer readable medium 236 coupled to at least one of at least one data source 237*a*, at least one data storage 237*b*, and/or at least one input/output 237*c*. In some embodiments, the computer system 210 can be embodied as computer readable code on a computer readable medium 236. In some embodiments, the computer readable medium 236 can be any data storage that can store data, which can thereafter be read by a computer (such as computer 240). In some embodiments, the computer readable medium 236 can be any physical or material medium that can be used to tangibly store the desired information or data or instructions and which can be accessed by a computer 240 or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 236 can transmit or carry instructions to a remote computer 240 and/or at least one user 231, including a router, private or public network, or other transmission or channel, both wired and wireless. In some embodiments, the software application modules 238 can be configured to send and receive data from a database (e.g., from a computer readable medium 236 including data sources 237*a* and data storage 237*b* that can comprise a database), and data can be received by the software application modules 238 from at least one other source. In some embodiments, at least one of the software application modules 238 can be configured within the computer system 210 to output data to at least one user 231 via at least one graphical user interface rendered on at least one digital display.

In some embodiments, the computer readable medium 236 can be distributed over a conventional computer network via the network interface 235*a* where the system embodied by the computer readable code can be stored and executed in a distributed fashion. For example, in some embodiments, one or more components of the computer system 210 can be coupled to send and/or receive data through a local area network ("LAN") 239*a* and/or an internet coupled network 239*b* (e.g., such as a wireless internet). In some embodiments, the networks 239*a*, 239*b* can include wide area networks ("WAN"), direct connections (e.g., through a universal serial bus port), or other forms of computer-readable media 236, or any combination thereof.

In some embodiments, components of the networks 239*a*, 239*b* can include any number of personal computers 240 which include for example desktop computers, and/or laptop computers, or any fixed, generally non-mobile internet appliances coupled through the LAN 239*a*. For example, some embodiments include one or more of personal computers 240, databases 241, and/or servers 242 coupled through the LAN 239*a* that can be configured for any type of user including an administrator. Some embodiments can include one or more personal computers 240 coupled through network 239*b*. In some embodiments, one or more components of the computer system 210 can be coupled to send or receive data through an internet network (e.g., such as network 239*b*). For example, some embodiments include at least one user 231*a*, 231*b*, is coupled wirelessly and accessing one or more software modules of the system including at least one enterprise application 238 via an input and output ("I/O") 237*c*. In some embodiments, the computer system 210 can enable at least one user 231*a*, 231*b*, to be coupled to access enterprise applications 238 via an I/O 237*c* through LAN 239*a*. In some embodiments, the user 231 can comprise a user 231*a* coupled to the computer system 210 using a desktop computer, and/or laptop computers, or any fixed, generally non-mobile internet appliances coupled through the internet 239*b*. In some embodiments, the user can comprise a mobile user 231*b* coupled to the computer system 210. In some embodiments, the user 231*b* can connect using any mobile computing 231*c* to wireless coupled to the computer system 210, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of identity verification by providing an improved method to track authenticated documents which prevents fraud saving consumers millions in loses. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the additional meaning to the following terms:

"Substantially" and "approximately" when used in conjunction with a value encompass a difference of 5% or less of the same unit and/or scale of that being measured. In some embodiments, "substantially" and "approximately" are defined as presented in the specification in accordance with some embodiments.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

The use of and/or, in terms of "A and/or B," means one option could be "A and B" and another option could be "A or B." Such an interpretation is consistent with the USPTO Patent Trial and Appeals Board ruling in ex parte Gross, where the Board established that "and/or" means element A alone, element B alone, or elements A and B together.

As used herein, some embodiments recited with term "can" or "may" or derivations there of (e.g., the system display can show X) is for descriptive purposes only and is understood to be synonymous with "configured to" (e.g., the system display is configured to show X) for defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

The previous detailed description is to be read with reference to the figures, in which like elements in different figures have like reference numerals. The figures, which are not necessarily to scale, depict some embodiments and are not intended to limit the scope of embodiments of the system.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for recording document transactions comprising:
    a camera,
    a computer network,
    a graphical user interface (GUI),
    an identification verification platform,
    a unique code generator, and
    one or more computers comprising one or more processors and one or more non-transitory computer readable media, the one or more non-transitory computer readable media comprising instructions stored thereon that when executed by the one or more processors configured the one or more computers to:
    generate, by the one or more processors, the GUI;
    display, on the GUI, one or more inputs for the identification verification platform;
    generate, by the unique code generator, a unique code configured to enable a user to access an image of a document on a blockchain;
    display, on the GUI, the unique code;
    receive, by the one or more processors, the image of the document from the camera;
    associate, by the one or more processors, the unique code with the image;
    add, by the one or more processors, the image to a block on the blockchain;
    wherein the system is configured to enable the user to view the image on the blockchain by entering the unique code into an input on the GUI;
    wherein the system is configured to instruct the user to add the unique code to one or more physical document faces; and
    wherein the system is configured to recognize and/or verify the unique code added to the one or more physical document faces from analysis of the image by the one or more processors.

2. The system of claim 1,
    wherein the identification verification platform is configured to receive one or more images of one or more identification documents;
    wherein the system is configured to receive one or more manual entries of identification data associated with the one or more identification documents; and
    wherein the system is configured to associate the unique code with the one or more images and/or the one or more manual entries.

3. The system of claim 2,
    wherein the system is configured to enable the user to modify and/or manually input the identification data associated with the one or more identification documents into one or more manual inputs on the GUI.

4. The system of claim 3,
    wherein the one or more manual inputs comprise one or more of first name, last name, email, and address.

5. The system of claim 2,
    wherein the system is configured to verify an authenticity of the one or more identification documents.

6. The system of claim 1,
wherein the system is configured to record document authenticity verification metadata associated with a document authenticity verification;
wherein the system is configured to associate the unique code with the document authenticity verification metadata.

7. A system for recording notary transactions comprising:
a camera,
a computer network,
a graphical user interface (GUI),
a unique code generator, and
one or more computers comprising one or more processors and one or more non-transitory computer readable media, the one or more non-transitory computer readable media comprising instructions stored thereon that when executed by the one or more processors configured the one or more computers to:
generate, by the one or more processors, the graphical user interface (GUI);
display, on the GUI, one or more inputs for an identification verification platform and/or a document verification platform on the GUI;
generate, by the unique code generator, a unique code configured to identify one or more documents on a blockchain;
display, on the GUI, the unique code;
receive, by the one or more processors, one or more images of the one or more documents from the camera;
associate, by the one or more processors, the unique code with the one or more images; and
add, by the one or more processors, the one or more images to a block on the blockchain;
wherein the system is configured to enable a user to view the one or more images on the blockchain by entering the unique code into an input on the GUI; and
wherein the one or more documents comprise a physical document that requires a signature;
wherein the system is configured to instruct the user to add the unique code to one or more physical document faces; and
wherein the system is configured to recognize and/or verify the unique code added to the one or more physical document faces from analysis of the one or more images by the one or more processors.

8. The system of claim 7,
wherein the identification verification platform is configured to receive one or more document images of one or more identification documents;
wherein the system is configured to receive one or more manual entries of identification data associated with the one or more identification documents; and
wherein the system is configured to associate the unique hash code with the one or more images and/or with the one or more manual entries.

9. The system of claim 8,
wherein the document verification platform is configured to enable the user to capture one or more party images of parties associated with the one or more documents.

10. The system of claim 9,
wherein the system is configured to capture metadata associated with at least one images of the one or more documents uploaded to the system;
wherein the metadata includes one or more of: time, date, and/or location; and
wherein the system is configured to associate the metadata with the unique code.

11. A system for attaching documents to a blockchain comprising:
one or more computers comprising one or more processors and one or more non-transitory computer readable media, the one or more non-transitory computer readable media comprising instructions stored thereon that when executed by the one or more processors configured the one or more computers to:
generate, by the one or more processors, a graphical user interface;
wherein at least one display of the graphical user interface includes options for uploading one or more identification documents;
wherein the at least one display of the graphical user interface includes options for uploading one or more physical documents;
wherein the at least one display comprises inputs to enable a user to capture images of the one or more identification documents and/or the one or more physical documents;
wherein the at least one display of the graphical user interface includes a unique code configured to identify the one or more identification documents and/or the one or more physical documents on a blockchain;
wherein the at least one display of the graphical user interface includes instructions for the user to add the unique code to a face of the one or more identification documents before uploading;
wherein the system is configured to recognize and/or verify the unique code added to the one or more identification documents faces from analysis of the images by the one or more processors;
wherein the system is configured to add the one or more identification documents and/or the one or more physical documents to the blockchain.

12. The system of claim 11,
wherein at the least one display of the graphical user interface is configured to enable the user to capture one or more images of parties involved in a transaction associated with the one or more identification documents and/or the one or more physical documents.

13. The system of claim 11,
wherein the at least one display of the graphical user interface is configured to enable the user to select a document type for an upload.

14. The system of claim 11,
wherein the at least one display of the graphical user interface is configured to enable the user to enter the unique code and/or confirm the unique code.

15. The system of claim 11,
wherein the at least one display of the graphical user interface is configured to enable the user to view the one or more identification documents and/or the one or more physical documents upon entry of the unique code into a display input.

16. The system of claim 13,
wherein the at least one display of the graphical user interface is configured to enable the user to capture location data;
wherein the location data comprises an address where the upload takes place; and
wherein the location data includes global positioning system (GPS) data.

* * * * *